US008159467B2

(12) United States Patent  
Gray et al.

(10) Patent No.: US 8,159,467 B2
(45) Date of Patent: Apr. 17, 2012

(54) MESHED TOUCHSCREEN PATTERN

(75) Inventors: Michael S. Gray, Cedar Park, TX (US); Patrick T. Gray, Cedar Park, TX (US); Sadao Yamamoto, Saitama (JP)

(73) Assignee: Wacom Co. Ltd., Kita Saitama-Gun, Saitama (JP)

( * ) Notice: Subject to any disclaimer, the term of this patent is extended or adjusted under 35 U.S.C. 154(b) by 511 days.

(21) Appl. No.: 12/407,661

(22) Filed: Mar. 19, 2009

(65) Prior Publication Data

US 2010/0045615 A1 Feb. 25, 2010

Related U.S. Application Data

(60) Provisional application No. 61/090,892, filed on Aug. 21, 2008, provisional application No. 61/092,914, filed on Aug. 29, 2008.

(51) Int. Cl.
*G06F 3/041* (2006.01)
(52) U.S. Cl. ........................................................ 345/173
(58) Field of Classification Search .................. None
See application file for complete search history.

(56) References Cited

U.S. PATENT DOCUMENTS

| | | | |
|---|---|---|---|
| 3,921,167 A | 11/1975 | Fox | |
| 3,971,013 A | 7/1976 | Challoner et al. | |
| 4,125,783 A | 11/1978 | Sefton | |
| 4,157,539 A | 6/1979 | Hunts et al. | |
| 4,221,975 A | 9/1980 | Ledniczki et al. | |
| 4,237,421 A | 12/1980 | Waldron | |
| 4,264,903 A | 4/1981 | Bigelow | |
| 4,288,786 A | 9/1981 | Ledniczki et al. | |
| 4,290,052 A | 9/1981 | Eichelberger et al. | |
| 4,293,987 A | 10/1981 | Gottbreht et al. | |
| 4,367,385 A | 1/1983 | Frame | |
| 4,394,643 A | 7/1983 | Williams | |
| 4,405,918 A | 9/1983 | Wall et al. | |
| 4,413,252 A | 11/1983 | Tyler et al. | |
| 4,550,221 A | 10/1985 | Mabusth | |
| 4,561,002 A | 12/1985 | Chiu | |
| 4,571,454 A * | 2/1986 | Tamaru et al. | 178/18.06 |
| 4,639,720 A | 1/1987 | Rympalski et al. | |
| 4,728,931 A | 3/1988 | Linder et al. | |
| 4,743,895 A | 5/1988 | Alexander | |
| 5,078,220 A | 1/1992 | Briefer | |
| 5,087,825 A | 2/1992 | Ingraham | |
| 5,113,041 A * | 5/1992 | Blonder et al. | 345/173 |
| 5,153,572 A | 10/1992 | Caldwell et al. | |
| 5,189,417 A | 2/1993 | Caldwell et al. | |

(Continued)

*Primary Examiner* — Peter Vincent Agustin
*Assistant Examiner* — Mark Fischer
(74) *Attorney, Agent, or Firm* — Garlick & Markison; Shayne X. Short; Holly L. Rudnick

(57) ABSTRACT

Meshed touchscreen pattern. A conductive pattern implemented within a touchscreen (e.g., using indium tin oxide (ITO) such as may be deposited on a substrate composed of polyester or some other material) provides paths for signals traveling through the touchscreen. By monitoring these signal in accordance with some means (e.g., cross point detection, zone detection, etc.) an estimate may be made as to a location of user's interaction with the touchscreen (e.g., finger or stylus touching of the touchscreen). The conductive pattern includes a number of conductors aligned in various directions (e.g., row and column conductors) across the touchscreen, and they are separated by a dielectric layer (e.g., air, $SiO_2$, or any other desirable dielectric layer). The conductors include a great deal of interlacing and meshing as achieved by spurs, extensions, and/or protrusions (e.g., of any desired shape) extending from one conductor into an adjacent conductor within the conductive pattern.

43 Claims, 35 Drawing Sheets

U.S. PATENT DOCUMENTS

| | | | |
|---|---|---|---|
| 5,305,017 A | 4/1994 | Gerpheide | |
| 5,508,700 A | 4/1996 | Taylor et al. | |
| 5,526,294 A | 6/1996 | Ono et al. | |
| 5,565,658 A | 10/1996 | Gerpheide et al. | |
| 5,572,205 A | 11/1996 | Caldwell et al. | |
| 5,760,715 A | 6/1998 | Senk et al. | |
| 5,869,790 A * | 2/1999 | Shigetaka et al. | 178/18.03 |
| 5,933,102 A | 8/1999 | Miller et al. | |
| 5,945,980 A | 8/1999 | Moissev et al. | |
| 6,147,680 A * | 11/2000 | Tareev | 345/173 |
| 6,184,872 B1 * | 2/2001 | Matsufusa et al. | 345/173 |
| 6,188,391 B1 | 2/2001 | Seely et al. | |
| 6,239,788 B1 | 5/2001 | Nohno et al. | |
| 6,297,811 B1 * | 10/2001 | Kent et al. | 345/173 |
| 7,609,178 B2 * | 10/2009 | Son et al. | 341/33 |
| 2006/0066581 A1 * | 3/2006 | Lyon et al. | 345/173 |
| 2007/0062739 A1 * | 3/2007 | Philipp et al. | 178/18.06 |
| 2007/0279395 A1 * | 12/2007 | Philipp et al. | 345/173 |
| 2009/0219257 A1 * | 9/2009 | Frey et al. | 345/173 |
| 2010/0007626 A1 * | 1/2010 | Lai | 345/174 |

* cited by examiner

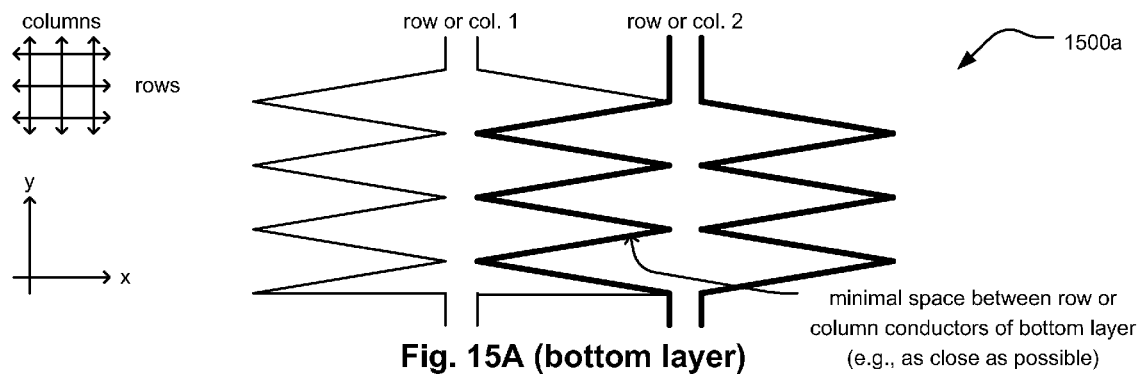
Fig. 15A (bottom layer)
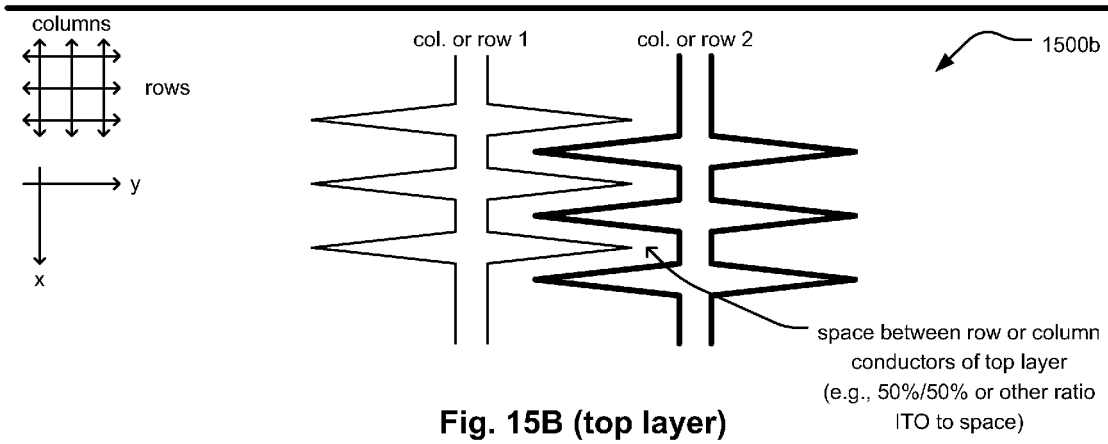
Fig. 15B (top layer)

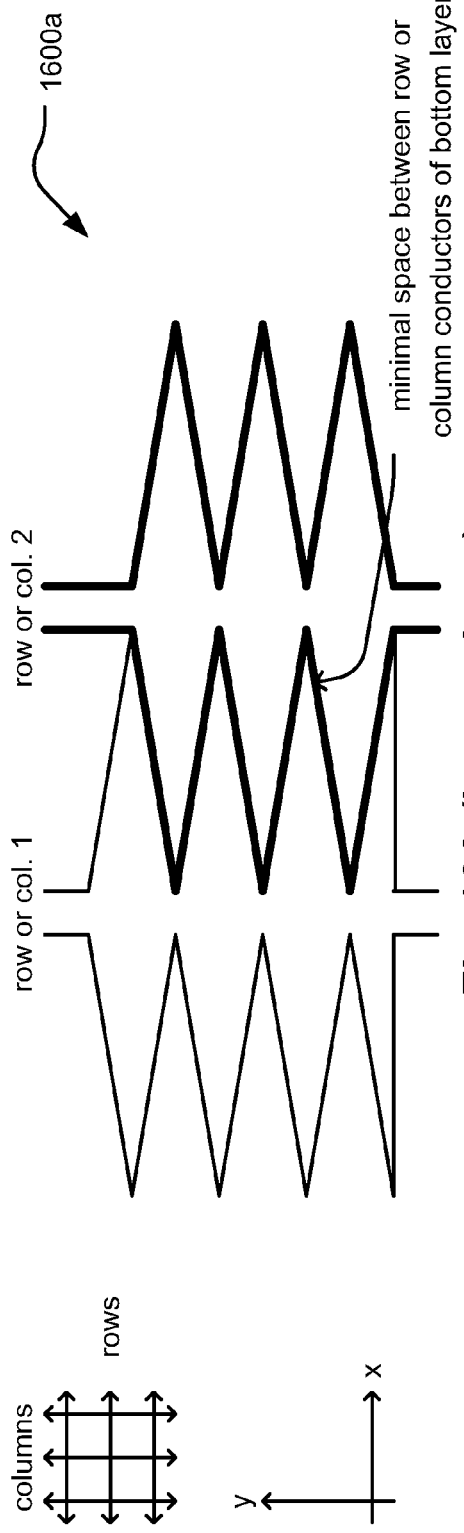
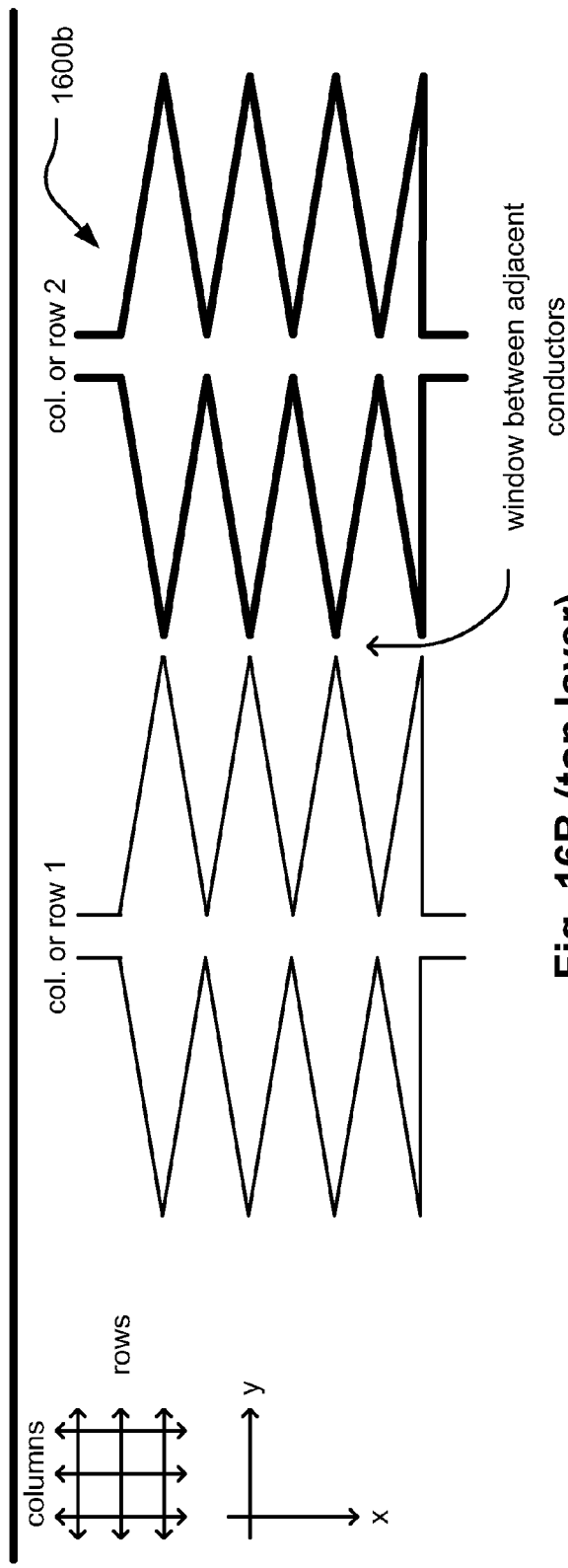

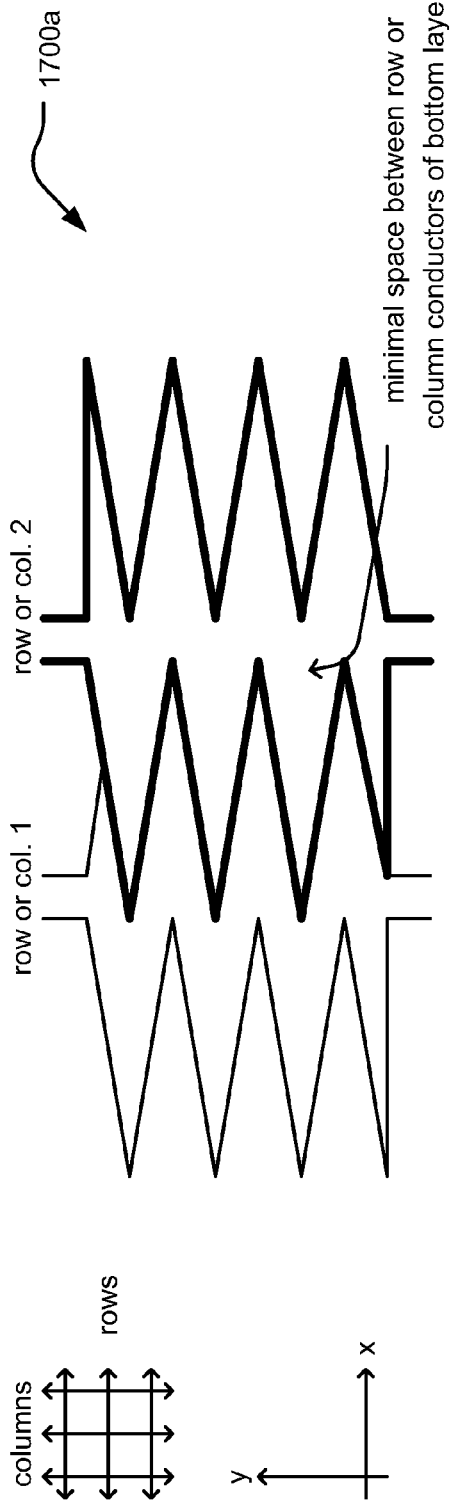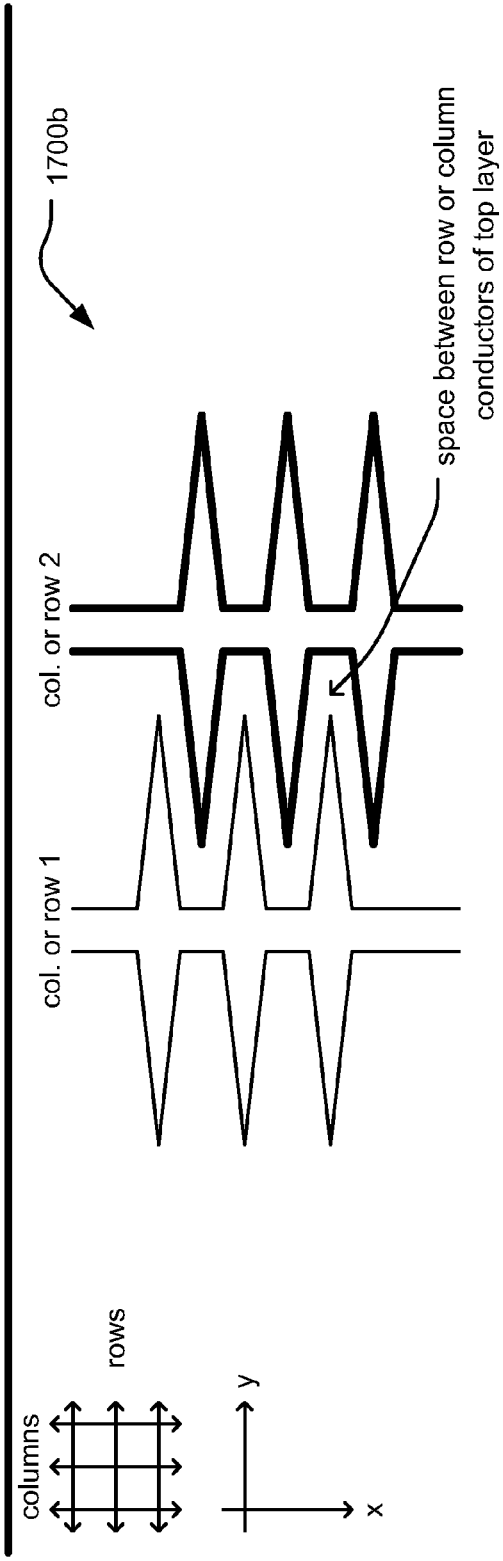
Fig. 17A (bottom layer)
Fig. 17B (top layer)

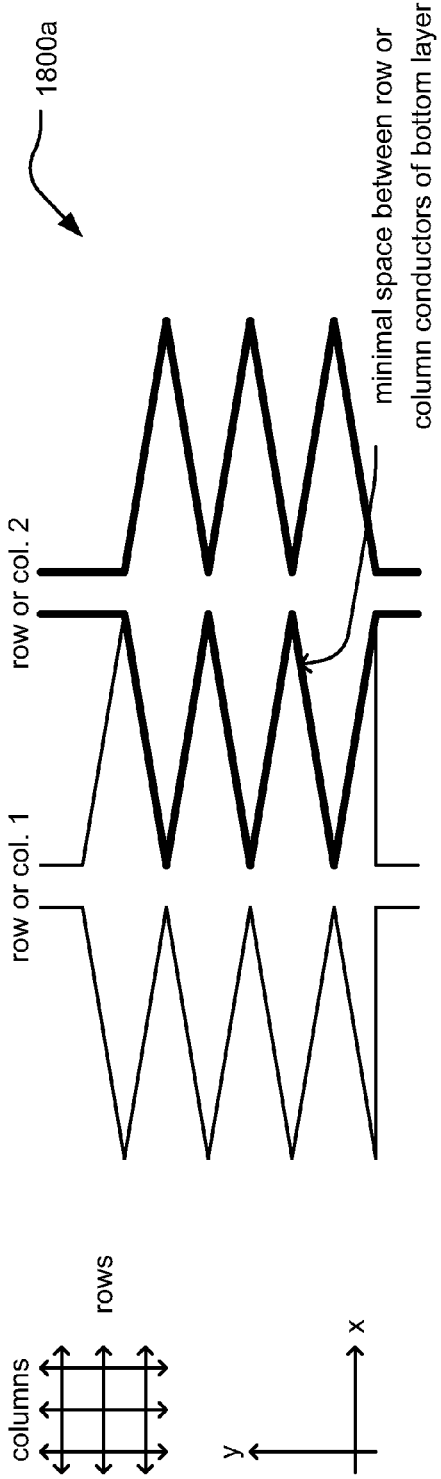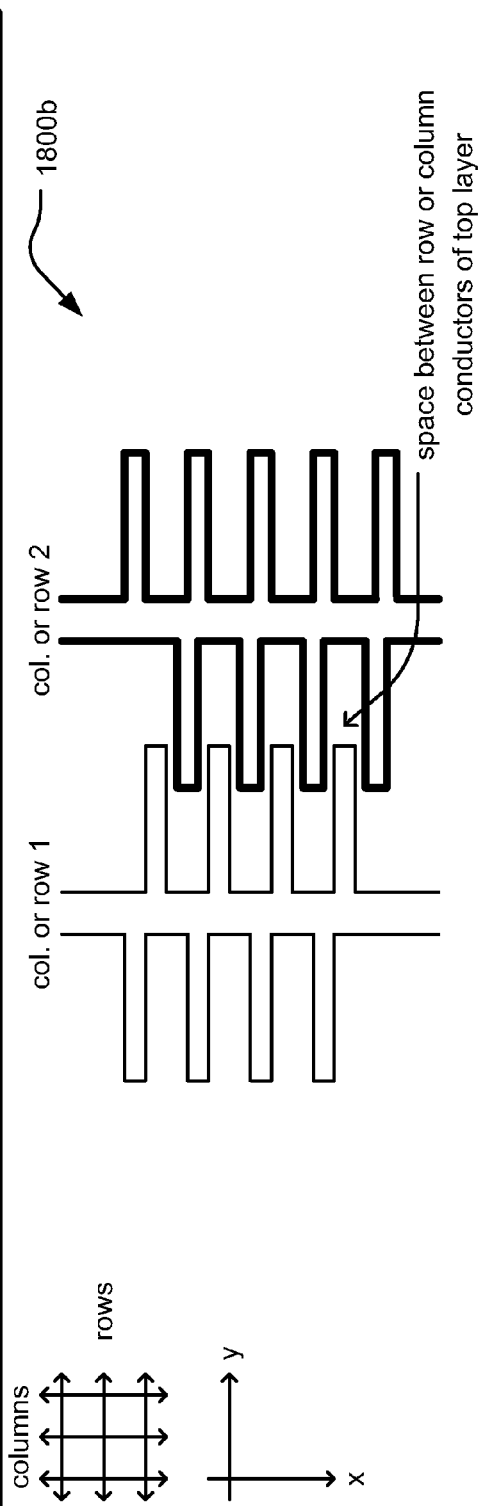

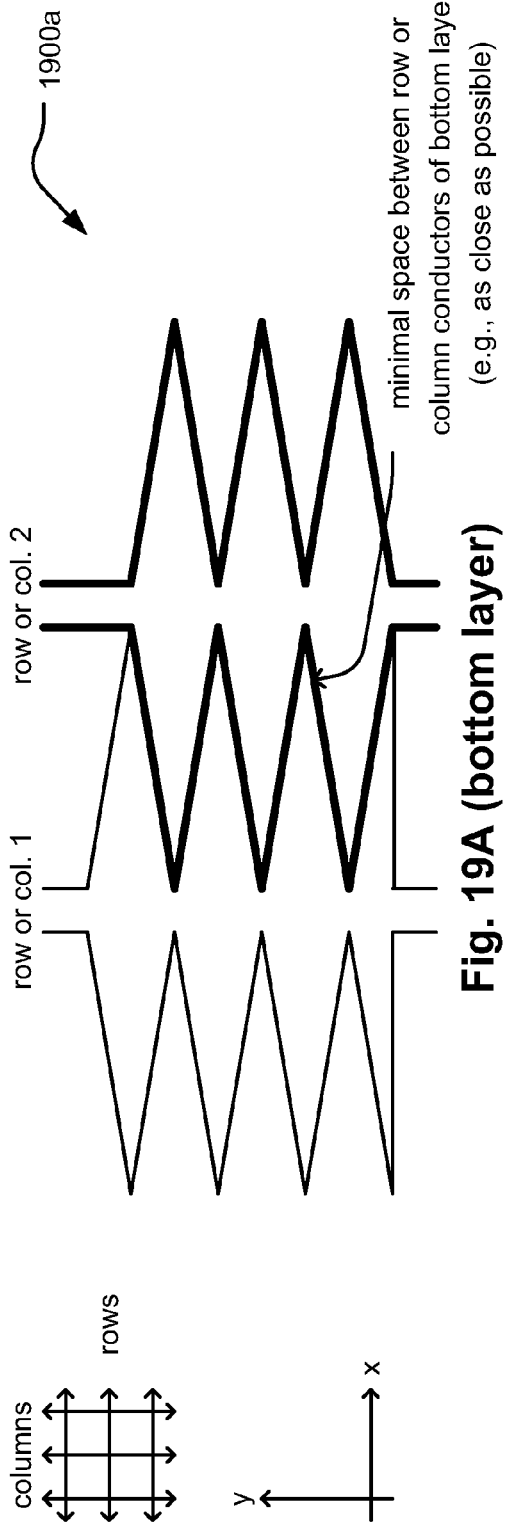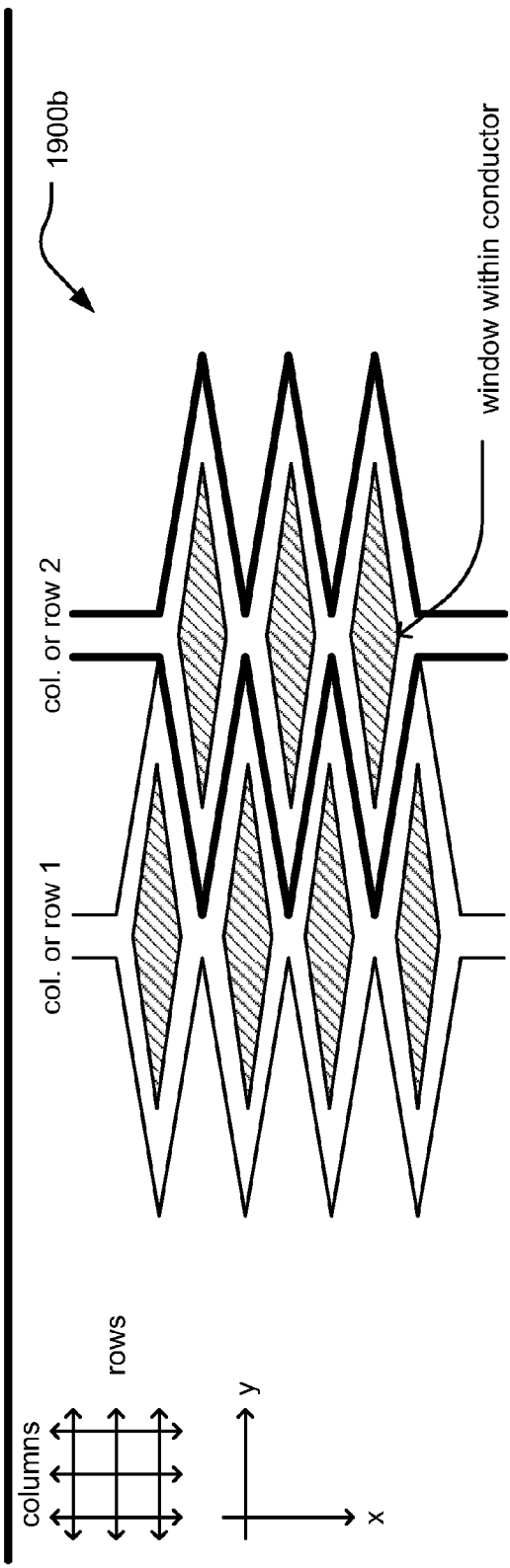

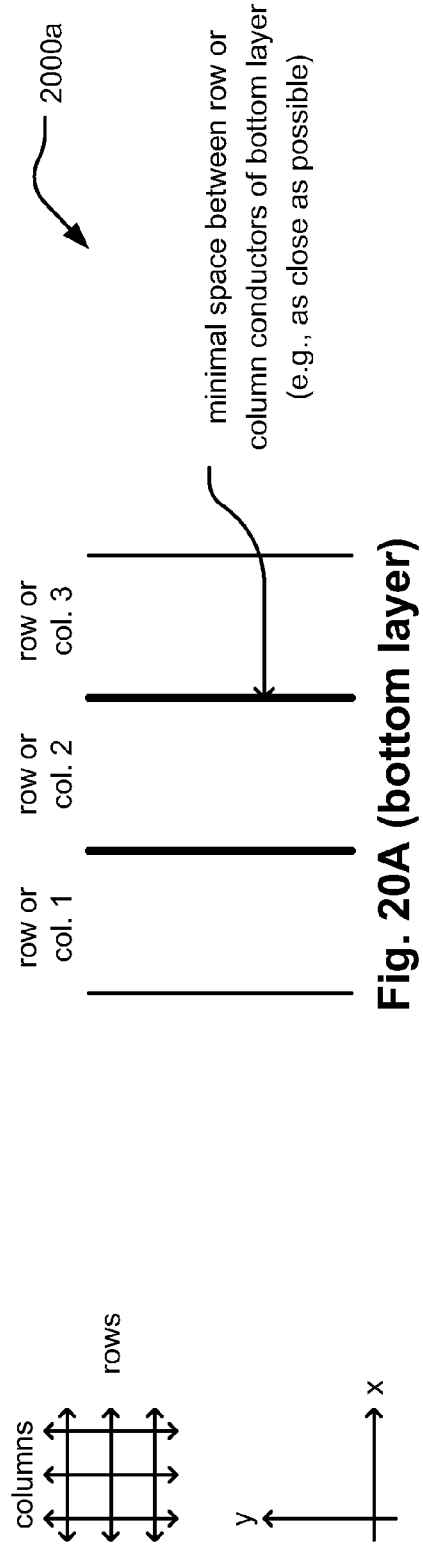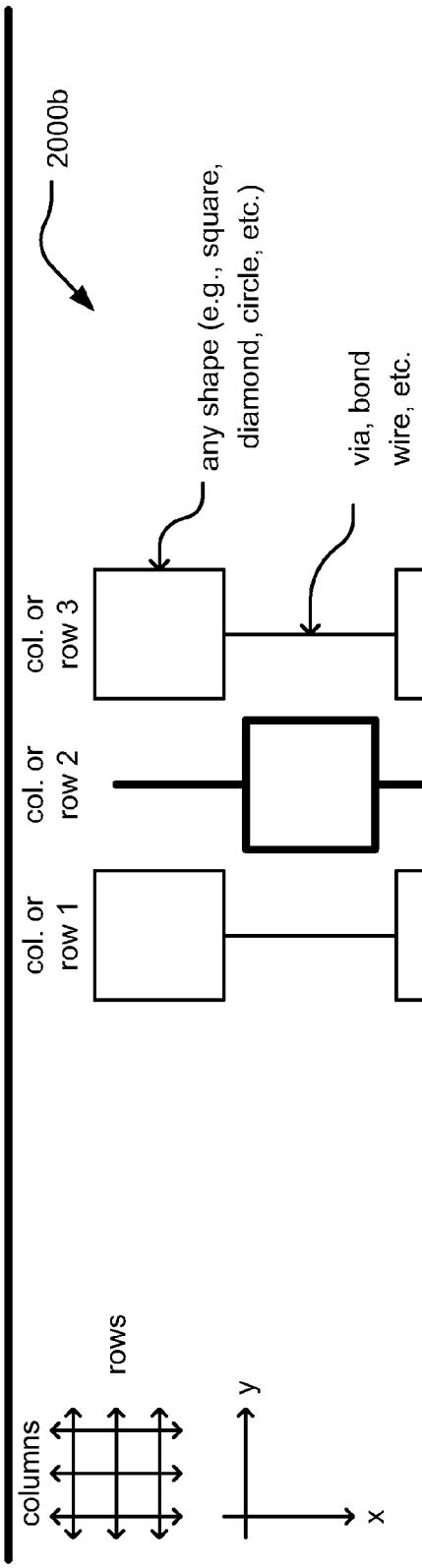

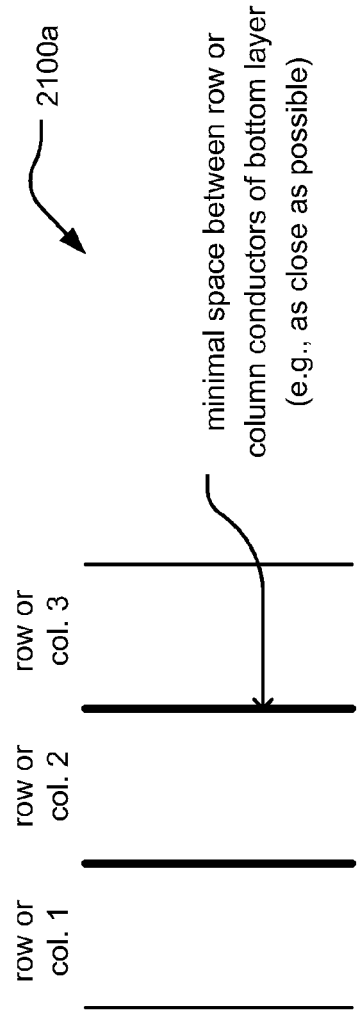
Fig. 21A (bottom layer)
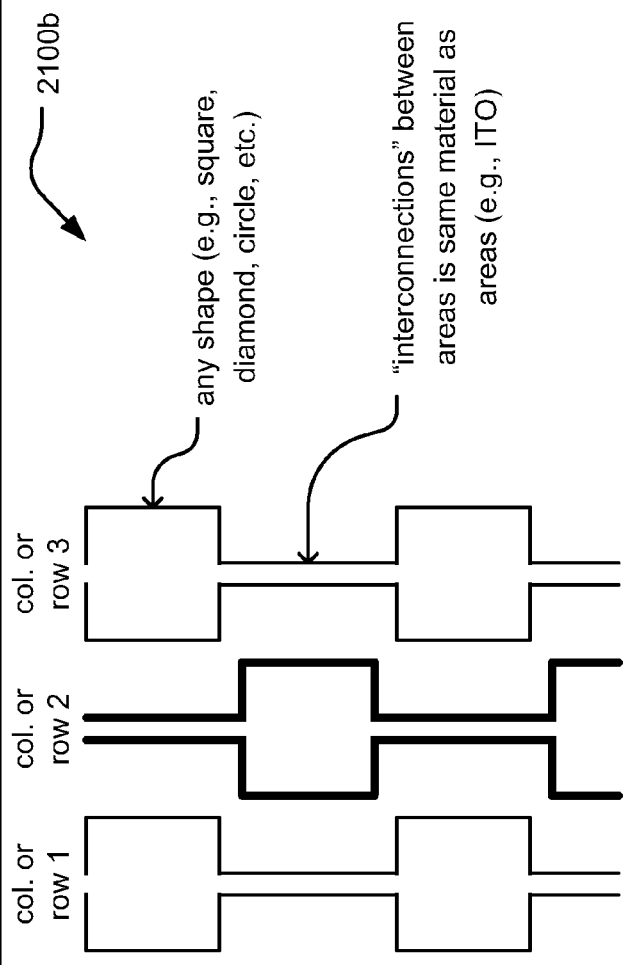
Fig. 21B (top layer)

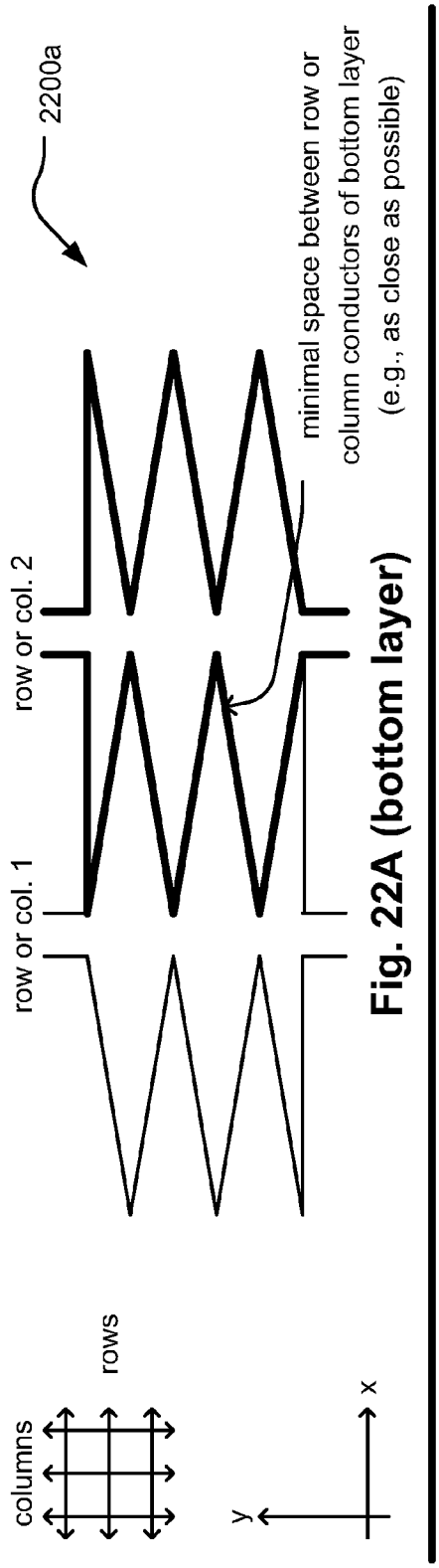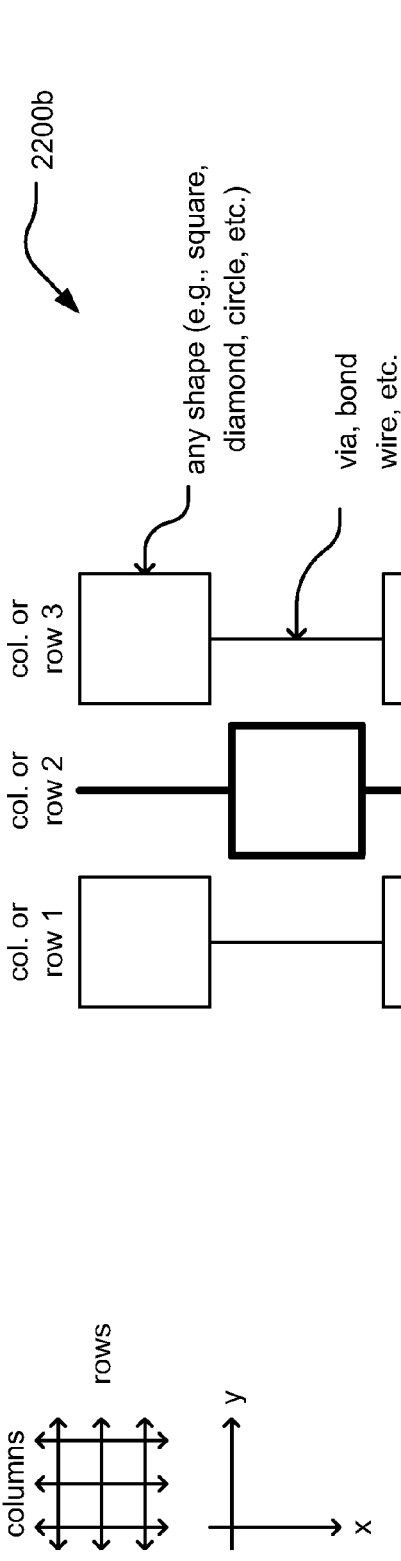

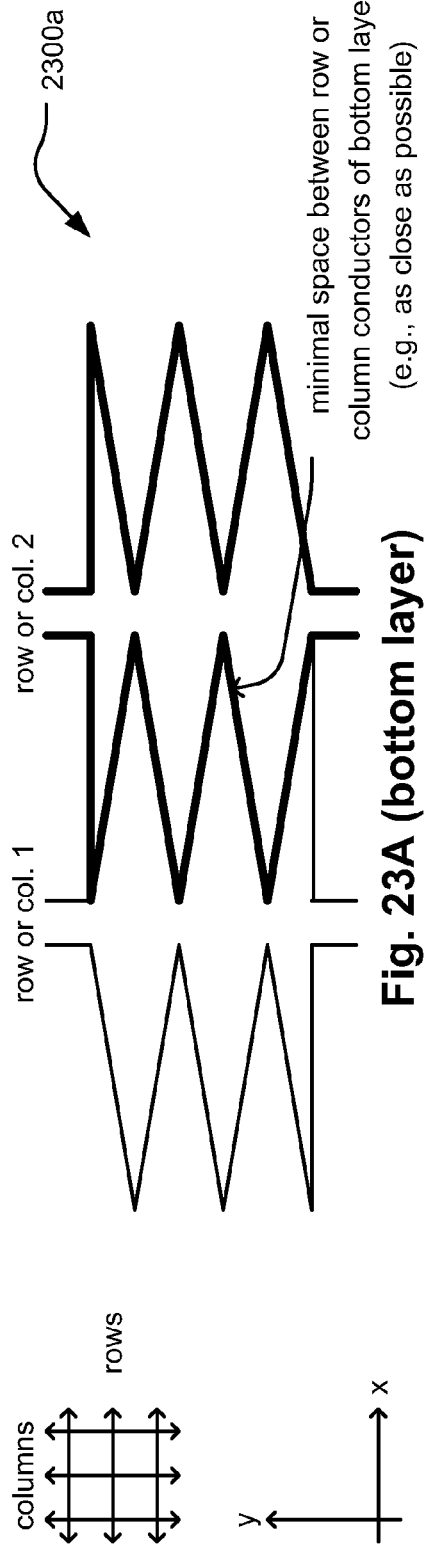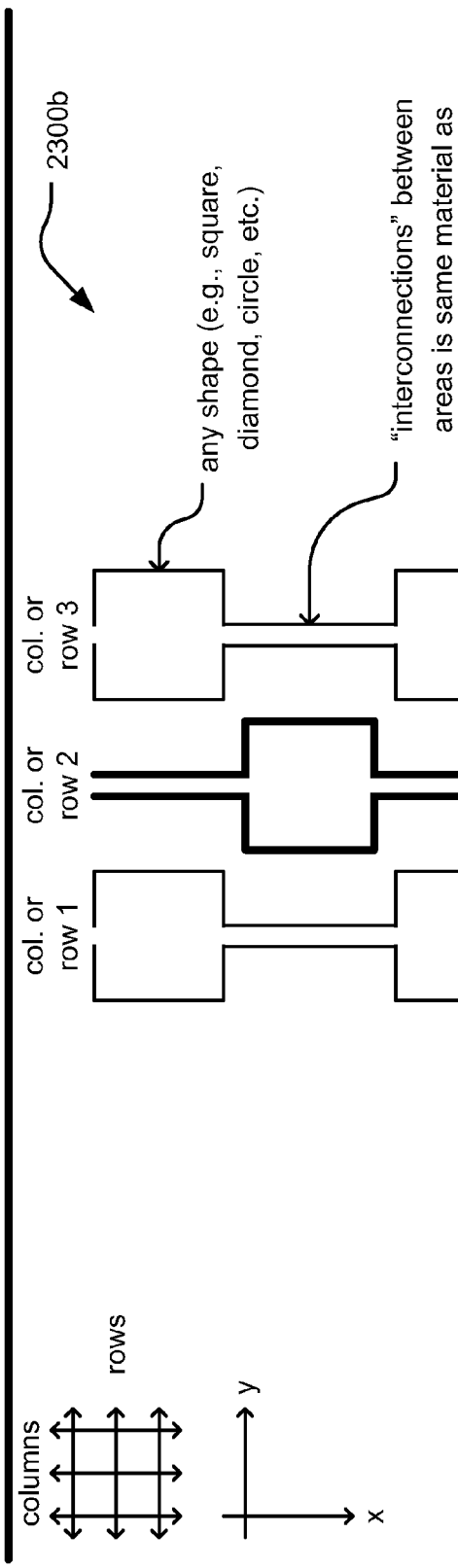
Fig. 23A (bottom layer)
Fig. 23B (top layer)

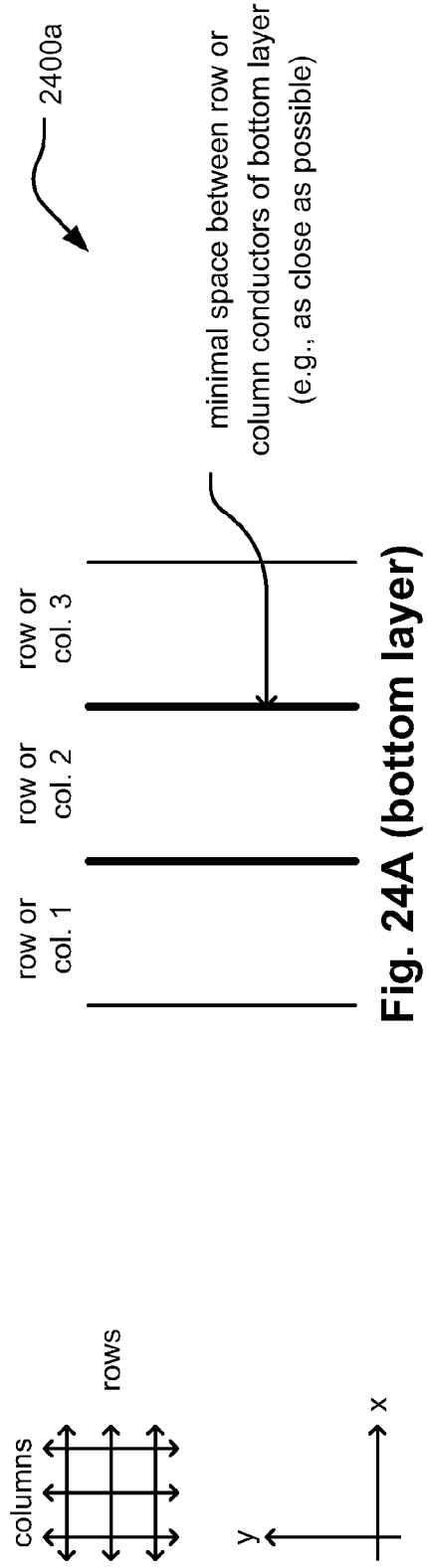
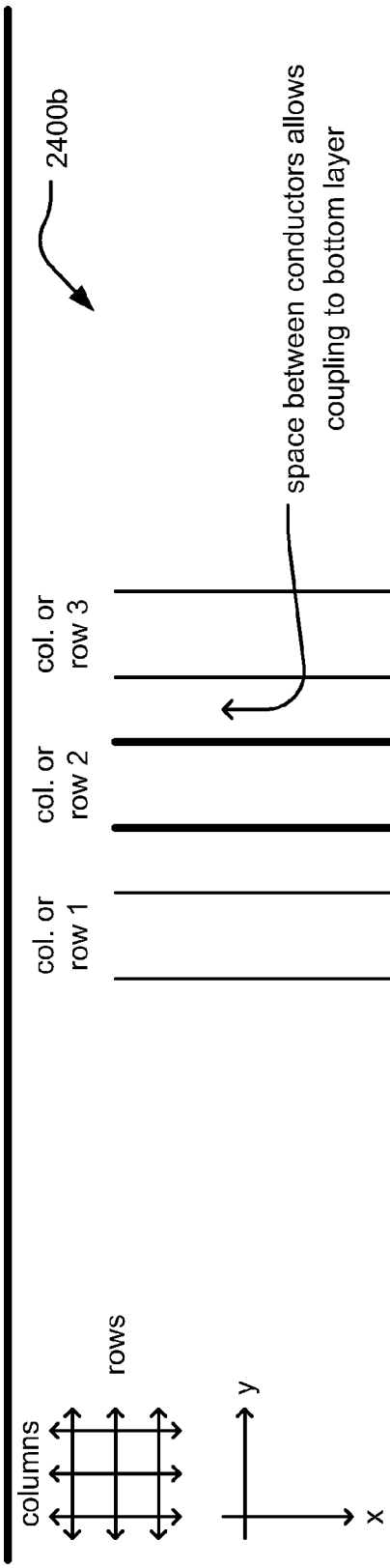

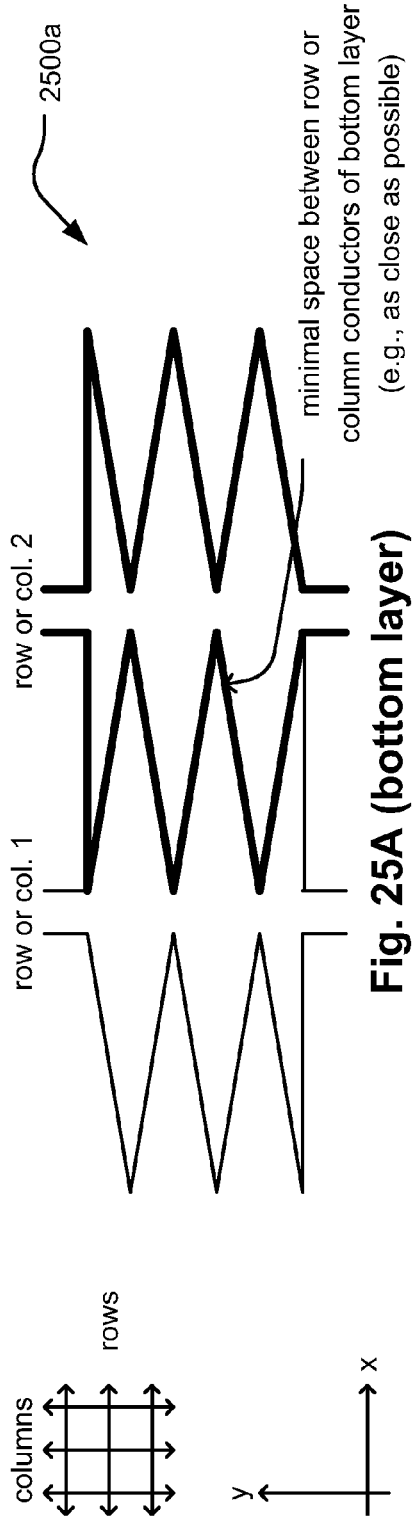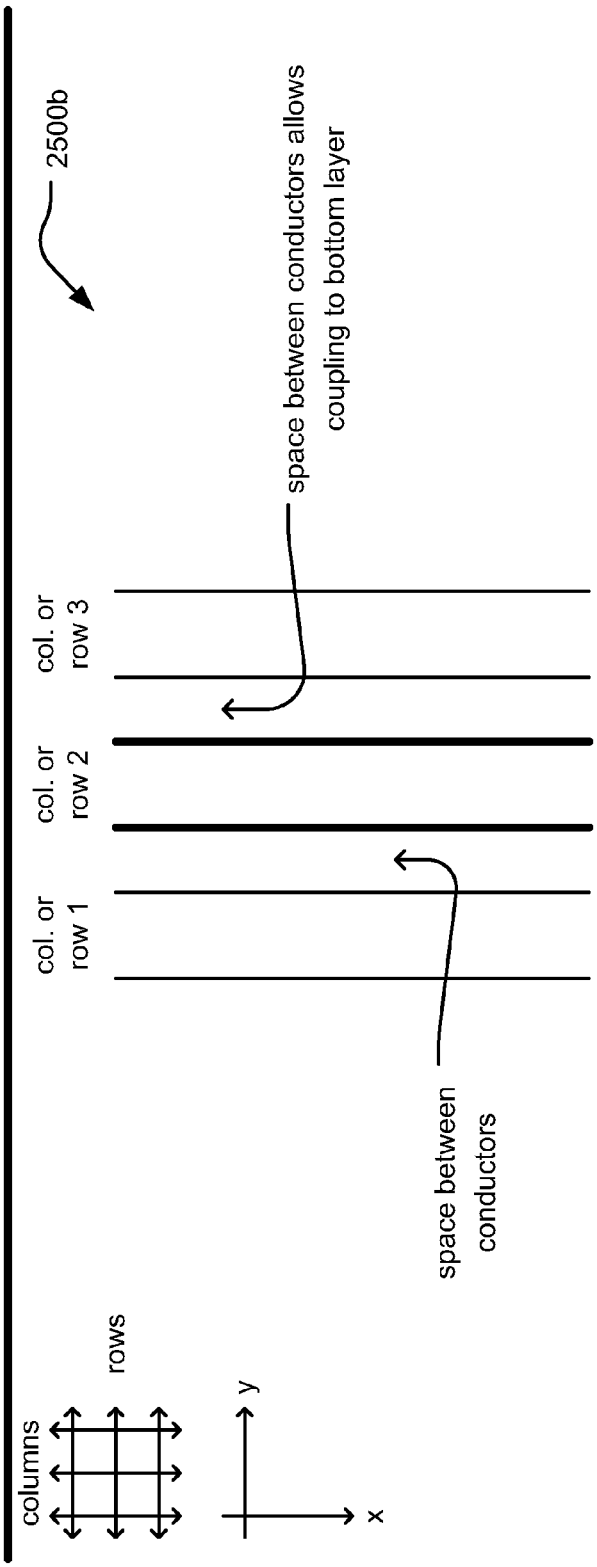

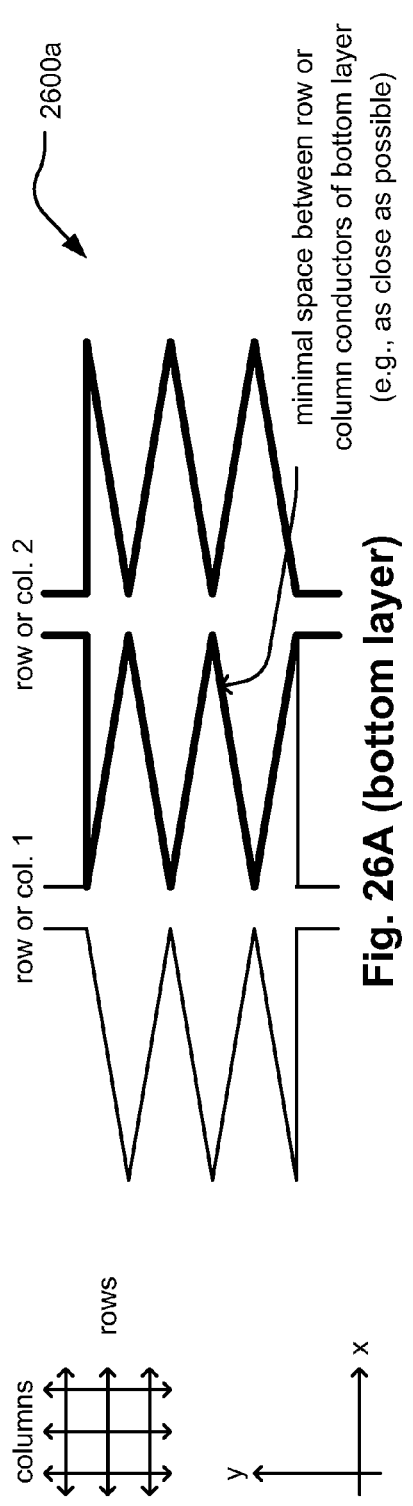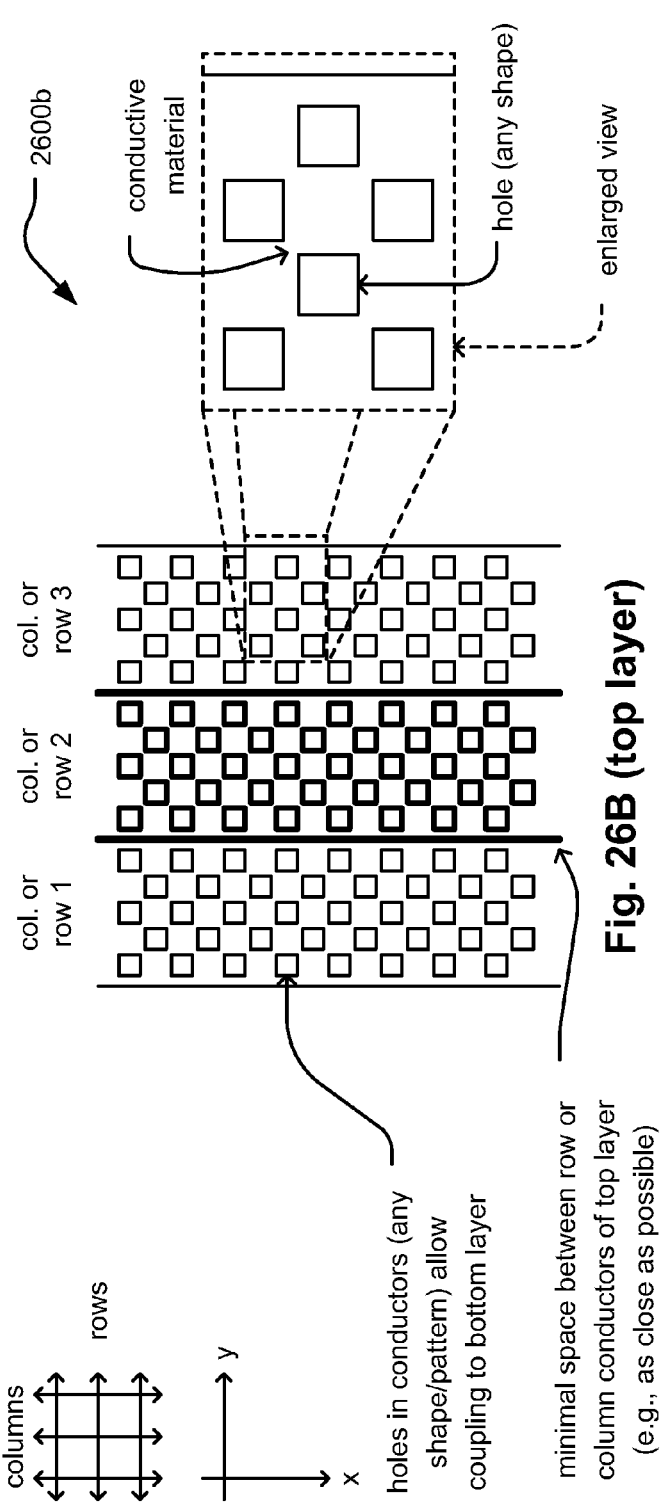

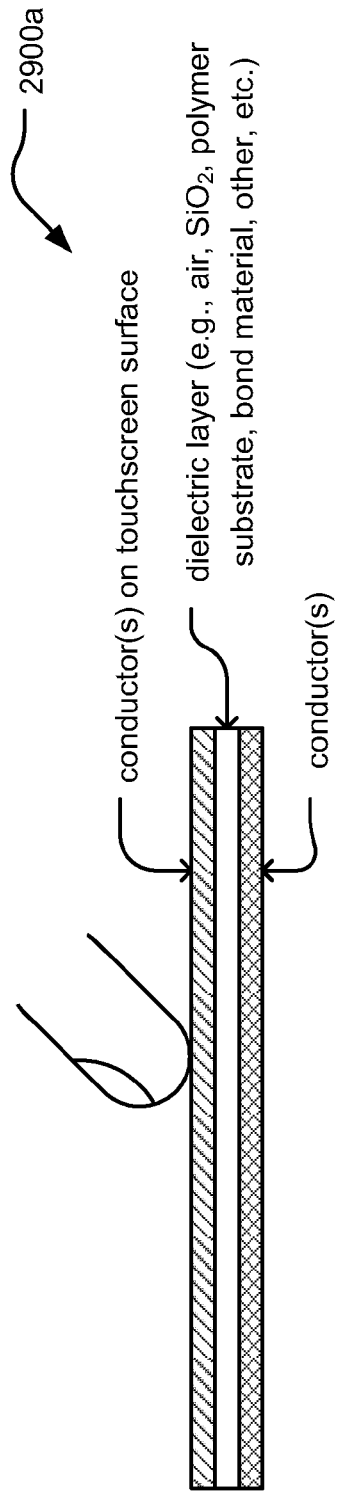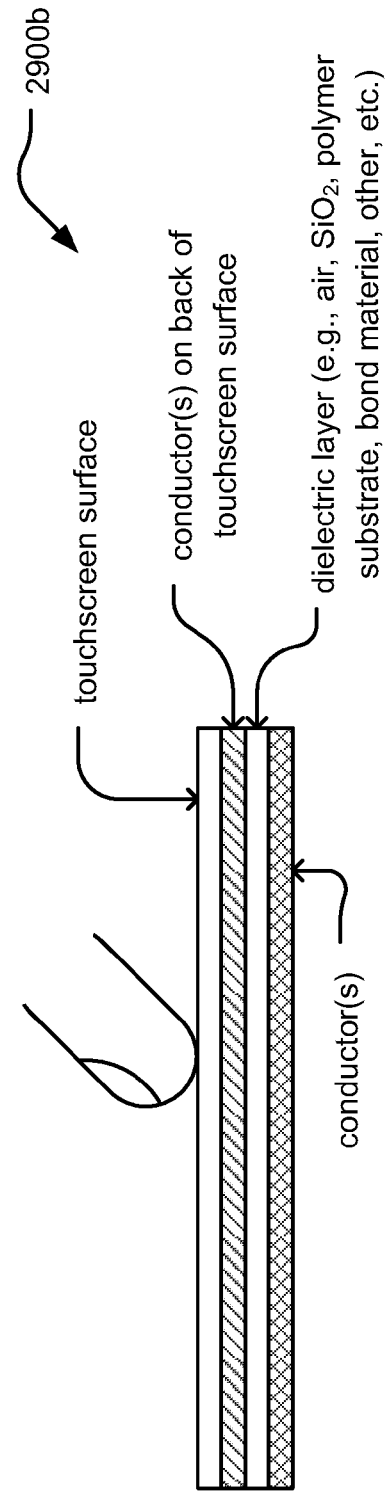
Fig. 29A
Fig. 29B

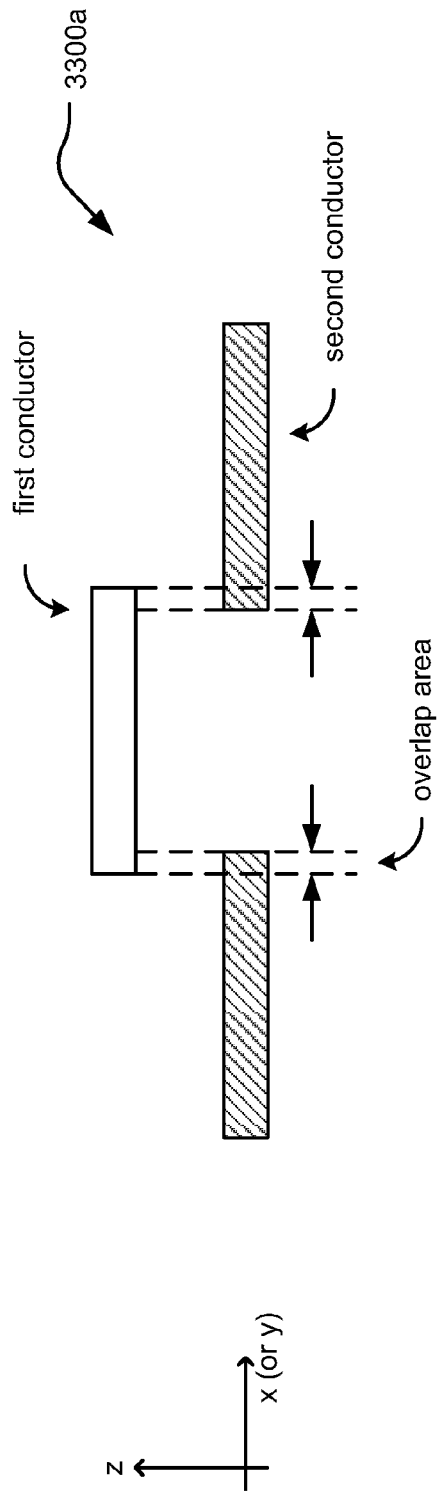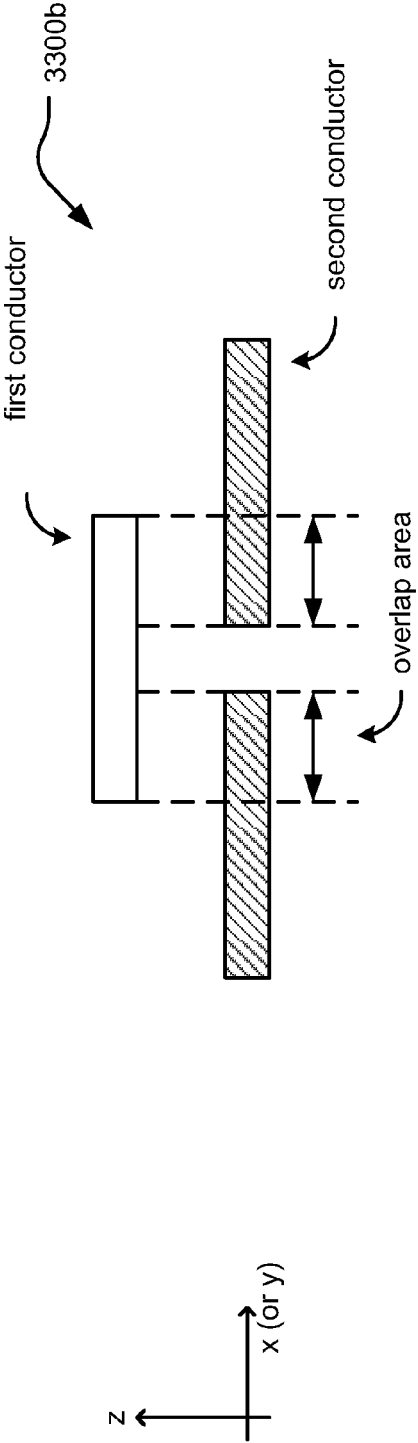

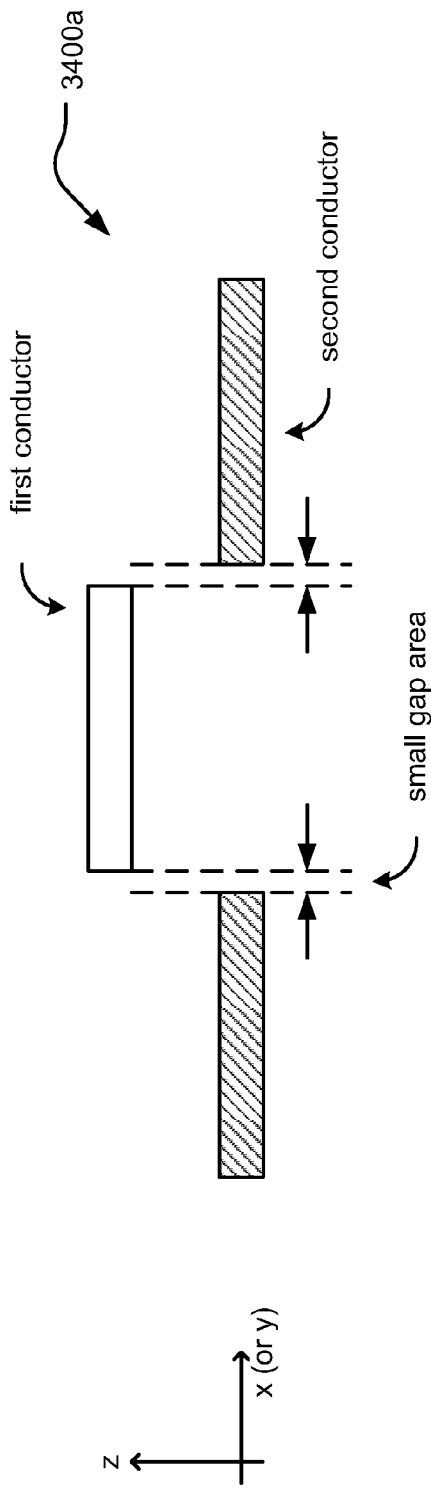
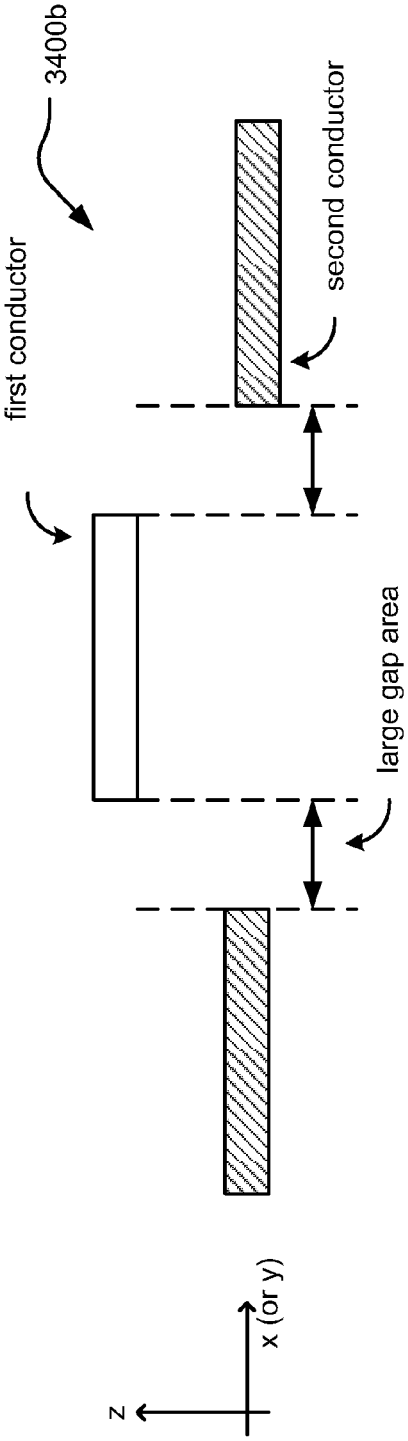

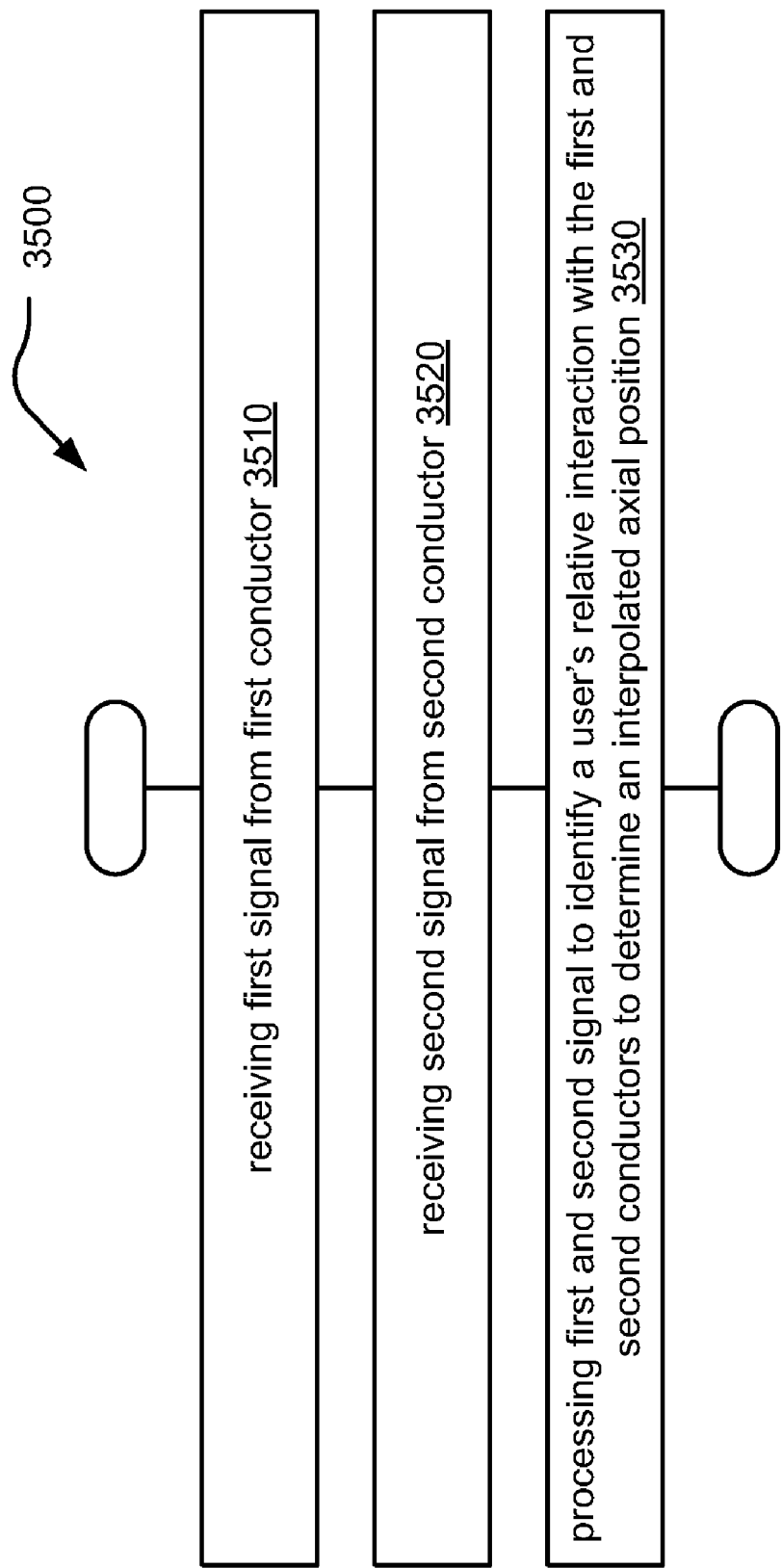

MESHED TOUCHSCREEN PATTERN

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:
1. U.S. Provisional Application Ser. No. 61/090,892, entitled "Extended touchscreen pattern,", filed Aug. 21, 2008, pending.
2. U.S. Provisional Application Ser. No. 61/092,914, entitled "Meshed touchscreen pattern,", filed Aug. 29, 2008, pending.

INCORPORATION BY REFERENCE

The following U.S. Utility patent application, being filed concurrently, is hereby incorporated herein by reference in its entirety and is made part of the present U.S. Utility patent application for all purposes:
U.S. Utility Application Ser. No. 12/407,646, entitled "Extended touchscreen pattern,", filed Mar. 19, 2009, pending.

BACKGROUND OF THE INVENTION

1. Technical Field of the Invention

The invention relates generally to devices that include a man to machine interface (MMI) implemented using a touchscreen; and, more particularly, it relates to conductive patterns employed within such touchscreens.

2. Description of Related Art

Touchscreen technology is relatively new in the world of displays for stationary and mobile devices. Traditionally, an underlying layer of lines that can sense a user's touch are arranged in a patterned manner and are monitored iteratively for a signal that suggests a coordinate of a point that is touched. Initial systems were designed to detect a single touch. A new emphasis, however, is to develop touchscreen technology that can accurately detect multiple simultaneous touches. Some current technology for multi-finger touch works by charging and discharging a voltage on a row or column of a conductor and measuring a change in the charge when touched. This technology includes detecting stray capacitance in the measurement.

One standard arrangement for the lines that detect touch is to use rows and columns of the sensing lines that include a series of diamond shaped areas connected end to end. The row and column lines are arranged so that the diamonds do not overlap each other, even if on different layers, and the rows and columns are placed so that they only overlap at the intersections of connection lines between the diamond shaped areas. The overlapping area of the intersection of the connection lines is kept very small to reduce capacitance and, therefore, the capacitive effects of the overlapped areas. The capacitive effects of the overlapped areas can be much larger than any other "noise" or "unusable signal" in the system. In addition, this caused additional problems as the narrow intersections cause high resistance along the conductor. Thus, prior art systems have minimized overlap by limiting overlap to that of the connection lines that couple the diamond shaped touch areas.

The original touchscreen devices were small thereby resulting in the number of lines used for sensing touch being manageable given the iterative manner in which such lines must be sensed. Traditionally, a cross point connection resulting from a touch resulted in a signal produced at a sensing line arranged horizontally would appear on a sensing line arranged vertically. Thus, if a touchscreen has 10 horizontal lines (rows) and 10 vertical lines (columns), 100 possible points have to be scanned to determine whether a touch occurred. For a small screen, the diamond shaped areas could be made small so that a finger might touch more than one diamond at a time to assist in the determination of the touch location.

As screens increase in size, however, the shaped areas for detecting touch tend to increase in size also to avoid or minimize an increase in a number of lines (vertical or horizontal) that must be monitored to detect a touch. For example, if a four inch square (e.g., 4"×4") monitor has twenty vertically arranged lines and 20 horizontally arranged lines, four hundred (400) possible touch locations require scanning on a repetitive basis (e.g., 50 times per second) for a cross point monitoring scheme. It is easy to see that if the screen size increases to a twelve inch square (e.g., 12"×12") area, and the arrangement of the lines and size of the shaped areas remains constant, the number of possible touch locations increases to 3600 because there would be 60 rows and 60 columns that require scanning. If these 3600 touch locations are scanned fifty times per second, 180,000 locations must be scanned per second.

Accordingly, designers have tended to increase, perhaps proportionally, the size of the shaped areas to match the increase in screen size so as to not increase the number of possible touch locations that require monitoring.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 15A and FIG. 15B illustrate embodiments of top and bottom conductive patterns, respectively, as employed in a touchscreen.

FIG. 16A and FIG. 16B illustrate alternative embodiments of top and bottom conductive patterns, respectively, as employed in a touchscreen.

FIG. 17A and FIG. 17B illustrate alternative embodiments of top and bottom conductive patterns, respectively, as employed in a touchscreen.

FIG. 18A and FIG. 18B illustrate alternative embodiments of top and bottom conductive patterns, respectively, as employed in a touchscreen.

FIG. 19A and FIG. 19B illustrate alternative embodiments of top and bottom conductive patterns, respectively, as employed in a touchscreen.

FIG. 20A and FIG. 20B illustrate alternative embodiments of top and bottom conductive patterns, respectively, as employed in a touchscreen.

FIG. 21A and FIG. 21B illustrate alternative embodiments of top and bottom conductive patterns, respectively, as employed in a touchscreen.

FIG. 22A and FIG. 22B illustrate alternative embodiments of top and bottom conductive patterns, respectively, as employed in a touchscreen.

FIG. 23A and FIG. 23B illustrate alternative embodiments of top and bottom conductive patterns, respectively, as employed in a touchscreen.

FIG. 24A and FIG. 24B illustrate alternative embodiments of top and bottom conductive patterns, respectively, as employed in a touchscreen.

FIG. 25A and FIG. 25B illustrate alternative embodiments of top and bottom conductive patterns, respectively, as employed in a touchscreen.

FIG. 26A and FIG. 26B illustrate alternative embodiments of top and bottom conductive patterns, respectively, as employed in a touchscreen.

FIG. 29A illustrates an embodiment of placement of conductive patterns within a touchscreen.

FIG. 29B illustrates an alternative embodiment of placement of conductive patterns within a touchscreen.

FIG. 33A and FIG. 33B illustrate embodiments of substantially complementary and substantially non-complementary overlap of conductors within a conductive pattern, respectively.

FIG. 34A and FIG. 34B illustrate alternative embodiments of substantially complementary and substantially non-complementary overlap of conductors within a conductive pattern, respectively.

FIG. 35 illustrates an embodiment of a method for determining an interpolated axial position.

DETAILED DESCRIPTION OF THE INVENTION

Figure 1:
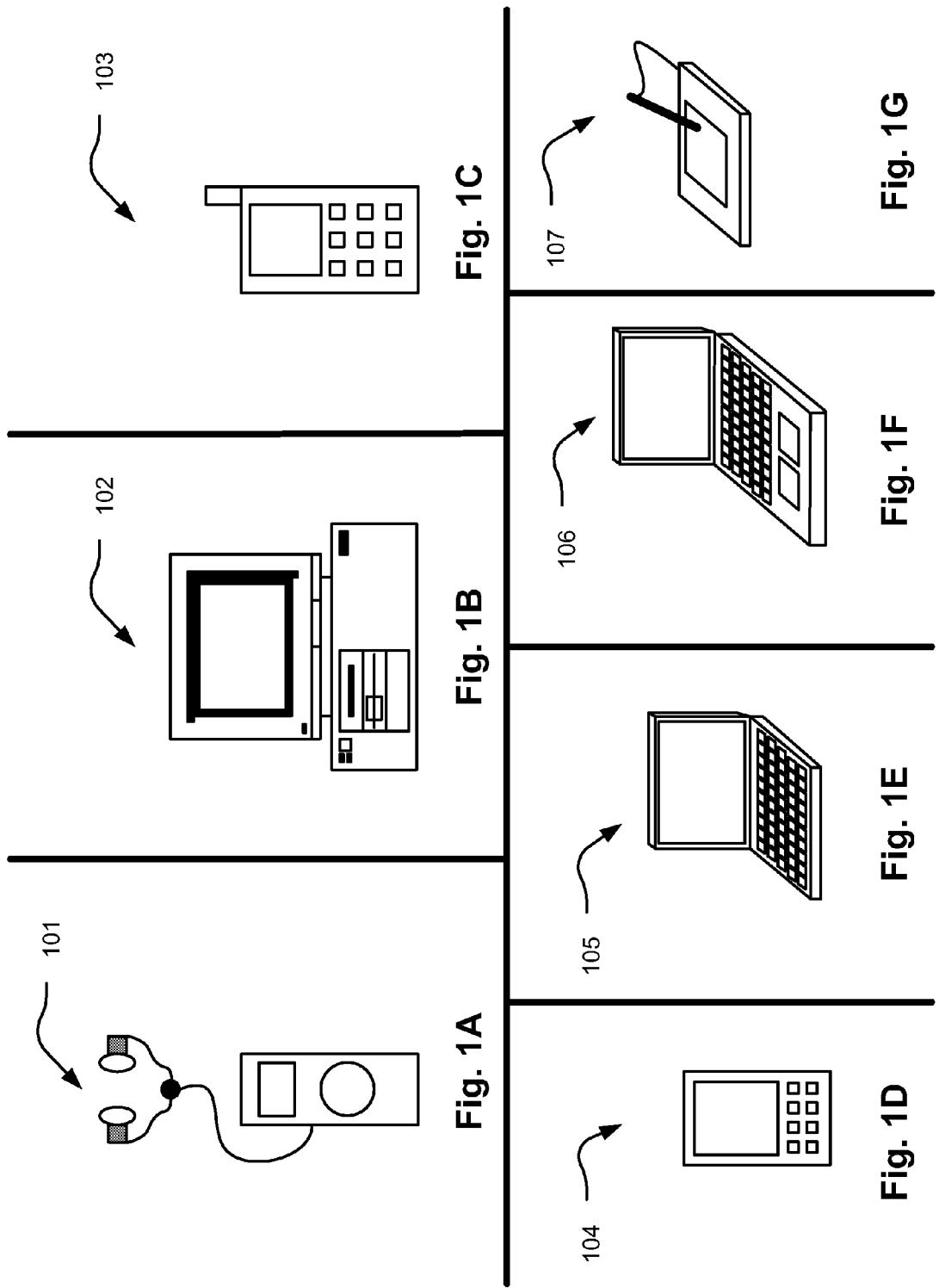
FIG. 1A illustrates an embodiment of a handheld media unit.
FIG. 1B illustrates an embodiment of a computer.
FIG. 1C illustrates an embodiment of a wireless communication device.
FIG. 1D illustrates an embodiment of a personal digital assistant (PDA).
FIG. 1E illustrates an embodiment of a laptop computer.
FIG. 1F illustrates an embodiment of a laptop computer with an integrated touchscreen (e.g., a tablet) on the palm rest.
FIG. 1G illustrates an embodiment of an electronic tablet.

Devices that include some form of man to machine interface (MMI) are employed in a wide variety of contexts. There are a variety of types of MMIs that allow a user to provide information to and retrieve information from a device (e.g., keyboard of a device such as a computer, an interactive panel/touchscreen on any number of devices such as a self-service gas pump, a self-service check in terminal at an airport, etc.). Some MMIs that are implemented using touchscreens in which a user interacts with the touchscreen using a finger or some other implement (e.g., a stylus or other means by which a location on the touchscreen is selected by the user) are increasing in their prevalence. Any of a wide variety of devices may include a MMI having at least a portion of which is implemented with a touchscreen.

In such a touchscreen, a conductive pattern (that includes multiple conductors) is implemented within at least one layer of a touchscreen. The conductive pattern may be implemented using indium tin oxide (ITO) as may be deposited on a substrate composed of polyester or some other appropriate material.

In one embodiment, a plurality of first conductors is axially aligned in a first direction across the touchscreen, and a plurality of second conductors is aligned in a second direction across the touchscreen. The first and second conductors may be implemented to be orthogonal to one another (e.g., first conductors in rows, and second conductors in columns, or vice versa), or some other arrangement may be employed (e.g., in which they are not orthogonal to one another). These first and second conductors may be disposed or arranged such that they do not directly electrically couple to one another (e.g., using an air gap, a dielectric layer of any type including one that comprises a material such as $SiO_2$, a polymer substrate, a bond material, etc.). They may be disposed on the same plane or layer or they may be disposed on different planes or layers.

To determine a location of a user's interaction with a touchscreen, a signal may be applied to one of the first or second conductors of the conductive pattern. Either that same signal may be monitored to help determine the location of a user's interaction with the touchscreen or a signal received from another conductor of the conductive pattern may be used to help determine the location of a user's interaction. In some embodiments, a combination of these two detection approaches may be employed.

In prior art systems, designers have tended to increase, perhaps proportionally, the size of the shaped touch areas of conductors to match increases in screen size so as to not increase the number of possible touch locations that require monitoring. Increasing the size of the shaped areas reduces the number of rows and columns that must be used which advantageously reduces power and resource consumption. Using larger touch areas, however, reduces touch coordinate resolution thereby resulting, for a smooth diagonal movement across a screen, in a stair step pattern that reflects the movement. A novel conductive pattern is presented herein, however, in which adjacent conductors are meshed and interlaced with one another in a manner that allows for a significant increase in the active surface area of a touchscreen. Prior art conductive patterns within prior art touchscreens generally do not provide for a great degree of scalability to provide desired touchscreen resolution without unduly increasing the number of scan points that must be scanned to detect a touch.

In some embodiments, the edges of at least some of the first and second conductors include spurs that taper to points. The tapered spurs are sized, shaped and meshed with spurs of adjacent conductors to effectuate a much improved interaction of signals between adjacent conductors in relation to prior art approaches for conductor patterns for touchscreens. By using such a novel conductive pattern architecture, a significant meshing and interlacing of conductors may be made so that the pitch between conductors can be greatly increased to yield a smooth, linear transition of the energy as a user's interaction with the touchscreen (e.g., a finger touch) across the first and second conductors that are arranged in the first and second directions. Without this meshing, prior art conductive patterns have no contact from one conductor to the other resulting in the described "stair stepping" (e.g., a non-linear effect) that becomes increasing prevalent as touchscreen touch areas increase in size. With the meshing that is provided by the various embodiments of the invention, however, a smoother and more linear display that corresponds to the user's movement across a touchscreen.

Moreover, the meshing of the conductive pattern allows a user's interaction with the touchscreen (e.g., a user's finger) to couple more evenly to the first conductors and second conductors at any given pitch (e.g., between the first conductors and/or second conductors). Prior art conductive patterns only work when the areas (e.g., diamonds) are very small relative to the contact pad of the user. At about an 8 millimeter (mm) pitch, the diamonds are too large for the typical user and the output data begins to show non-uniform output "stair stepping" based on the position of the contact patch to the location of the diamond.

In some embodiments, the first conductors are aligned in the first direction and are disposed on a first layer of a touchscreen (e.g., an upper and/or top layer), and the second conductors are aligned in the second direction and are disposed on a second layer of a touchscreen (e.g., a lower and/or bottom layer). In such an embodiment, the respective spacing between the first conductors may be greater than the respective spacing between the second conductors. This may be achieved by aligning the first conductors apart from one another. It may also be achieved by having holes or windows within at least some of the first conductors to allow the coupling of an energized signal via capacitance to the first conductors at an intersection of at least one of the first conductors and at least one of the second conductors.

In addition, as one of the second conductors are energized or charged (e.g., with a signal), the other of the second conductors may be grounded making the second conductors to serve as an effective electromagnetic interference (EMI) shield limiting injected noise from any of a number of sources (e.g., the system, an LCD backlight, any noise source under and/or behind the touchscreen, etc.) from undesirably affecting the first conductors. This effective solid back-layer of the conductive pattern (e.g., the second conductors) effectively shields the upper layer or layers from noises produced under or behind the touchscreen.

This EMI shield created by the plurality of second conductors on the second or bottom layer or plane may also operate to remove changes in any capacitive coupling due to the flexing of a substrate of the touchscreen (e.g., such as when the touchscreen gets bowed or bent a bit due to some stress such as a user's interaction with the touchscreen). This elimination and/or reduction of such effects can allow for a variety of substrates to be used within a touchscreen. In one instance, it particularly allows for the use of non-rigid materials within a touchscreen. As is known, the rigidity required within many touchscreens prohibits their implementation within certain applications.

FIG. 1A illustrates an embodiment of a handheld unit 101. A handheld media unit 101 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format. Historically, such handheld media units were primarily employed for storage and playback of audio media; however, such a handheld media unit 101 may be employed for storage and playback of virtual any media (e.g., audio media, video media, photographic media, etc.). Moreover, such a handheld media unit 101 may also include other functionality such as integrated communication circuitry for wired and wireless communications.

To allow a user to provide commands to and select certain functions via the touchscreen of the handheld media unit 101, the handheld media unit 101 includes at least one touchscreen. Certain selections on the touchscreen may be made by a user's finger or other bodily portion; alternatively, the handheld media unit 101 may include some user-provided implement (e.g., a stylus or other implement) that the user may employ to provide commands to and select certain functions via the touchscreen of the handheld media unit 101.

FIG. 1B illustrates an embodiment of a computer 102. The computer 102 can be a desktop computer, or an enterprise storage devices such a server, of a host computer that is attached to a storage array such as a redundant array of independent disks (RAID) array, storage router, edge router, storage switch and/or storage director.

The actual monitor of the computer 102 may have touchscreen capability (or only a portion of the monitor may have touchscreen capability). Alternatively, a peripheral device of the computer 102 (e.g., a keyboard or other peripheral device) may include a touchscreen disposed thereon. A user may provide commands to and select certain functions via the touchscreen of the computer 102. Certain selections on the touchscreen may be made by touching indicated areas of the touchscreen with a user's finger (or other bodily portion), a user-provided implement (e.g., a stylus or other implement), etc., that the user may employ to provide commands to and select certain functions via the touchscreen of the computer 102. Herein, all references to a user touching a touchscreen includes all methods for touching the touchscreen.

FIG. 1C illustrates an embodiment of a wireless communication device 103. Wireless communication device 103 is capable of communicating via a wireless network such as a cellular, personal communications service (PCS), general packet radio service (GPRS), global system for mobile communications (GSM), and integrated digital enhanced network (iDEN) or other wireless communications network capable of sending and receiving wireless communications. Further, wireless communication device 103 is capable to communicate via the Internet to access email, download content, access websites, and provide steaming audio and/or video programming. In this fashion, wireless communication device 103 can place and receive calls, text messages such as emails, short message service (SMS) messages, pages and other data messages that can include attachments such as documents, audio files, video files, images and other graphics.

The wireless communication device 103 includes a touchscreen that allows a user of the communication device 103 to provide commands to and select certain functions of the communication device 103. A user may interact with the touchscreen of communication device 103 touching the touchscreen to provide commands and/or to select certain functions via the touchscreen of communication device 103. For example, a user may touch the touchscreen in a specified location to indicate selection or, alternatively, a user may touch the touchscreen in a specified manner to indicate a specified command (e.g., two rapid taps on the touchscreen).

FIG. 1D illustrates an embodiment of a personal digital assistant (PDA) 104. The PDA 104 includes a touchscreen that allows a user of PDA 104 to provide commands to and select certain functions of the PDA 104. A user may interact with the touchscreen of PDA 104 touching the touchscreen to provide commands and/or to select certain functions via the touchscreen of PDA 104. For example, a user may touch the touchscreen in a specified location to indicate selection or, alternatively, a user may touch the touchscreen in a specified manner to indicate a specified command.

FIG. 1E illustrates an embodiment of a laptop computer 105. The actual monitor of the laptop computer 105 may have touchscreen capability (or only a portion of the monitor may have touchscreen capability). Alternatively, a peripheral device of the laptop computer 105 (e.g., an external keyboard or other peripheral device) may include a touchscreen thereon. A user may provide commands to and select certain functions via the touchscreen of the laptop computer 105. A user may interact with the touchscreen of laptop computer 105 by touching the touchscreen to provide commands and/or to select certain functions via the touchscreen of laptop computer 105. For example, a user may touch the touchscreen in a specified location to indicate selection or, alternatively, a user may touch the touchscreen in a specified manner to indicate a specified command.

FIG. 1F illustrates an embodiment of a laptop computer 106 with an integrated touchscreen (e.g., a tablet) on the palm rest. A user may provide commands to and select certain functions via the integrated touchscreen (e.g., tablet) of the laptop computer 106. A user may interact with the touchscreen of laptop computer 106 by touching the touchscreen to provide commands and/or to select certain functions via the touchscreen of laptop computer 106. For example, a user may touch the touchscreen in a specified location to indicate selection or, alternatively, a user may touch the touchscreen in a specified manner to indicate a specified command via the integrated touchscreen (e.g., tablet) of the laptop computer 106.

FIG. 1G illustrates an embodiment of an electronic tablet 107. The electronic tablet 107 includes a stylus that a user employs to provide commands to and select certain functions of the electronic tablet 107. The electronic tablet 107 may also include capabilities to support integrated computing, data storage, etc. that allow the electronic tablet 107 to operate, at least in some respects, like a computer or laptop computer. However, the electronic tablet 107 includes no integrated keyboard. It is noted, however, that a virtual keyboard may be displayed on the electronic tablet 107, and buttons thereof may be selected by the stylus that the user employs. Of course, it is noted that am alternatively, embodiment of such an electronic tablet may include no stylus and certain selections on such an electronic tablet may be made by a user's touch.

As can be seen, a wide variety of devices may employ a touchscreen to effectuate at least one part of an MMI thereto. There are various means by which a user's interaction with such a touchscreen can be detected.

Figure 2:
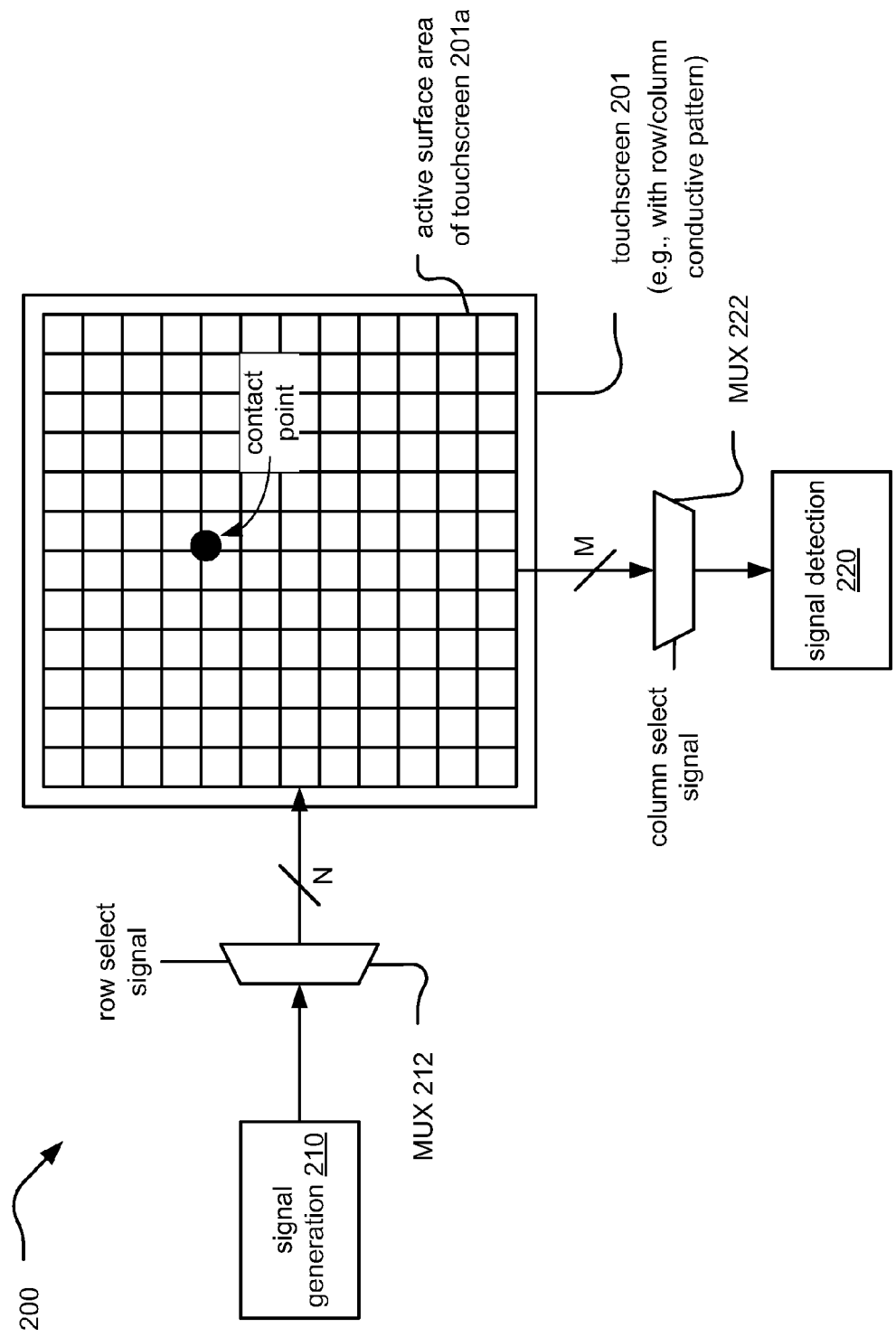
FIG. 2 illustrates an embodiment of a touchscreen in which cross point detection is performed to location a user's interaction with the touchscreen.

FIG. 2 illustrates an embodiment 200 of a touchscreen 201 in which cross point detection is performed to locate a user's interaction with the touchscreen. In some embodiments, an active surface area of the touchscreen 201a covers a slightly smaller portion of the touchscreen 200. For example, a border or perimeter around the active surface area of the touchscreen 201a may be employed.

A number of conductors forming rows and columns of a conductive pattern (e.g., indium tin oxide (ITO) as may be deposited on a substrate composed of polyester or other material) on one or more layers of the touchscreen. In some embodiments, a first portion of the conductive pattern (e.g., the columns) is disposed on a first layer, and a second portion of the conductive pattern (e.g., the rows) is disposed on a second layer; the first and second layer may be separated by a dielectric material in some embodiments. Alternatively, the row and column oriented conductors may be disposed on the same layer and may utilize known techniques for connecting elements including traces, vias, bond wires, etc. to ensure that the first portion of conductive pattern (e.g., the columns) do not directly come into contact with the second portion of conductive pattern (e.g., the rows). While this and other embodiments depict rows and columns that are inherently perpendicular to one another, there may be other embodiments in which a plurality of first conductors are aligned in a first direction and a plurality of second conductors are aligned in a second direction that is different to the first direction wherein there is no particular requirements for the orientation of the first and second directions. In other words, the conductors need not necessarily be perpendicular to one another (though they may be perpendicular in one referred embodiment). Moreover, the conductors need not be oriented in vertical and horizontal axis though such orientation is shown in the described embodiments.

In the embodiment 200, a signal generation module 210 provides a signal to a multiplexor (MUX) 212 that selectively applies the signal from the signal generation module 210 to one element of a first conductor (e.g., to a selected row) of the conductive pattern. The MUX 212 ensures that the signal is applied, at different times, to each of the first conductors (e.g., to each of the rows) of the conductive pattern.

A signal detection module 220 receives a signal from MUX 222 that is selectively coupled to each of the second conductors (e.g., to selected columns) of the conductive pattern. The MUX 222 ensures that the signal detection module 220 samples and detects (or tries to detect) a signal from each of the second conductors (e.g., to selected columns) of the conductive pattern. In one embodiment, the signal that is produced into a first conductor is coupled to a second conductor at a touch location and is received by the signal detection module.

In an alternate embodiment, a user's touch increases capacitance between first and second conductors at a touch location thereby increasing an input signal magnitude at the conductor to which the signal is produced and an output signal magnitude (due to the increased capacitance) that is detected by the signal detection module at the second conductor(s) affected by the user's touch at the touch location. Thus, a direct coupling does not occur between the first and second conductors in this alternate embodiment. Generally, by applying a signal to each row and testing for a signal at each column of the touchscreen, a touch can be detected when a user interacts with the touchscreen (e.g., as shown by contact point) with a reasonably high degree of certainty as to where the user has interacted with the touchscreen (e.g., as limited by the granularity and/or proximity of the rows and columns).

For example, when a user does interact with the touchscreen, the increased capacitance will be introduced in the conductive pattern corresponding to the location of the user's interaction. This increased capacitance introduces a reduced impedance path due to the increased capacitance between a row and column (e.g, first and second conductors) as caused by the user or the implement (e.g., stylus) employed by the user. Because capacitive reactance, $Z_C$, scales inversely with capacitance (i.e., because $Z_C=1/j\omega C$, where $\omega$ is frequency in radiance per second, and C is capacitance in farads), the impedance decreases as capacitance increases with a user's touch at the touch location. Therefore, by detecting a change in a signal provided to a particular row and detected at a particular column, an estimate of the location of the user's interaction with the touchscreen may be made.

Figure 3:
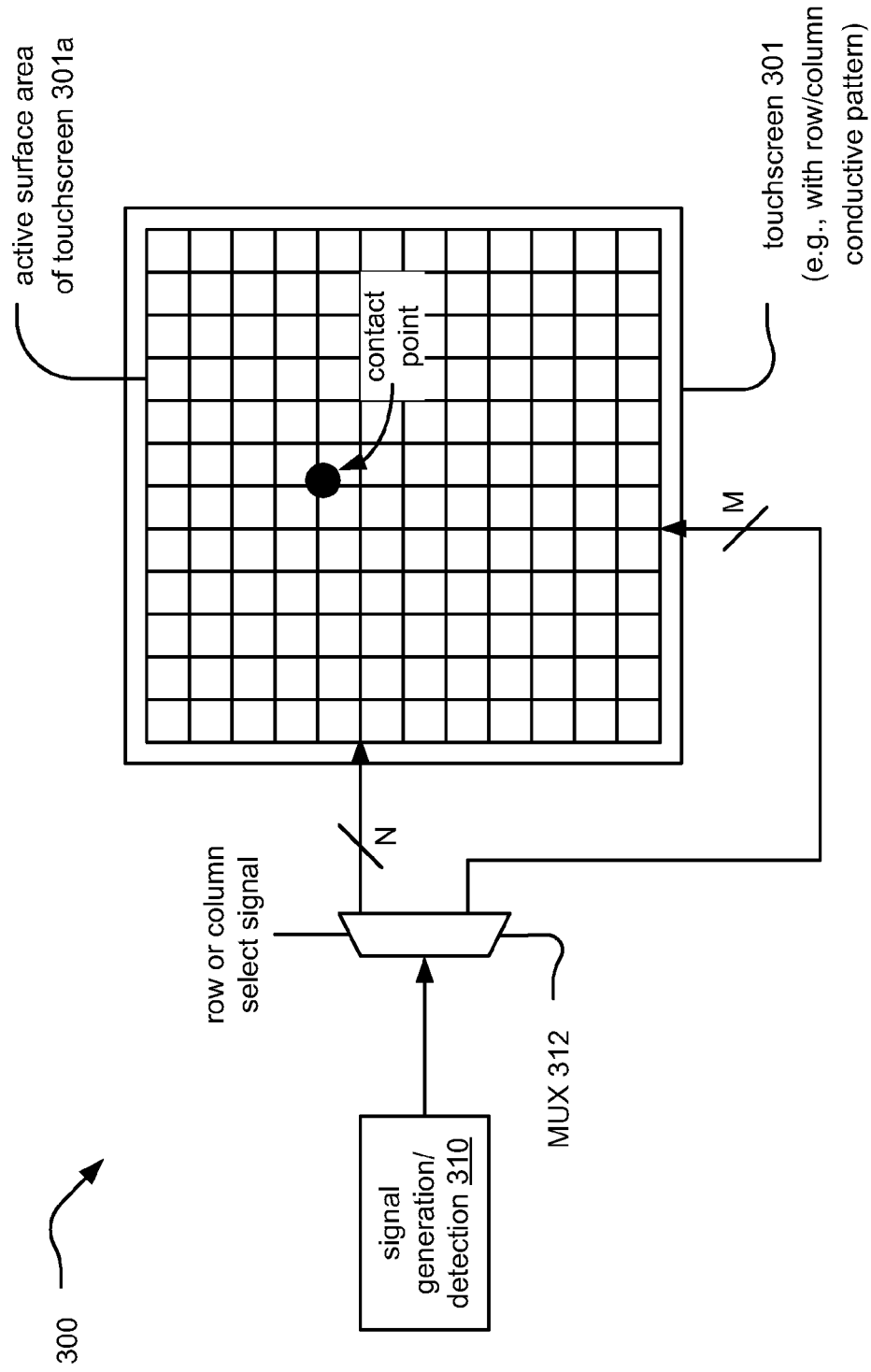
FIG. 3 illustrates an embodiment of a touchscreen in which zone detection is performed to location a user's interaction with the touchscreen.

FIG. 3 illustrates an embodiment 300 of a touchscreen 301 in which zone detection is performed to locate a user's interaction with the touchscreen. As with the previous embodiment, in some embodiments, an active surface area of the touchscreen 301a covers a slightly smaller portion of the touchscreen 300. For example, a border or perimeter around the active surface area of the touchscreen 301a may be employed.

This embodiment 300 differs from the previous embodiment, at least in that, a signal generation/detection module 310 is employed both to provide a signal to a particular row and to detect a change in the signal being provided to that particular row. The signal generation/detection module 310 operates cooperatively with a MUX 312 to apply a signal and detect that signal being applied to each of the rows and columns of the conductive pattern of the touchscreen.

When a user does interact with the touchscreen, an increased capacitance will be introduced corresponding to the location of the user's interaction. This increased capacitance introduces a reduced impedance path at the location of the user's interaction and will incur a change in the signal being provided to a particular row or column. By providing a signal to each of the rows and columns of the conductive pattern of the touchscreen and by detecting for any change in those successively applied signals, then the location of the user's interaction with the touchscreen may be made.

Therefore, by detecting a change in a signal provided to a particular row and also by detecting a change in a signal provided to a particular column, an intersection of the identified row and column can provide a calculated estimate of the location of the user's interaction with the touchscreen.

For each of the cross point detection and the zone detection approaches of the previous embodiments, the application of signals need not be purely successive in nature. For example, a signal need not necessarily be applied to row 1, then to row 2, then to row 3, etc. Alternatively, a signal may be applied to row 1, then to row 8, then to row 2, etc. In even another embodiments, a signal may be applied initially to every Nth row (where N is an integer), and then the signal may be applied to every row between 1 and N−1, then to rows N+1 to 2N−1, etc. A wide variety of scanning techniques may be performed in accordance with either of the cross point detection and the zone detection approaches of the previous embodiments.

As referenced above, prior art conductive patterns as employed within a touchscreen are often composed of discrete diamond shaped touch areas that are connected together. A linear movement of a user's interaction with a touchscreen across the active area of the touchscreen with the prior art conductive patterns inherently introduces non-linearity in the signal response of signals used to detect such user's interaction. Ideally, the signal response would be as smooth and linear as possible, but prior art conductive patterns simply cannot provide for such a smooth and linear response. Because larger the pitch typically exists between conductors within a prior art conductive pattern, the number of different pads below the contact point is reduced and thus provides a "stair step" response in relation to the user's movement or location identification. This further exacerbates the deleterious effects inherent to the prior art discrete diamond shaped patterns employed within prior art touchscreens. This "stair stepping" of the output of a signal employed to detect such a user's interaction with the touchscreen thus is a function, with prior art designs, of the size of the diamond shaped touch areas. Increasing touch area size to correspond with the increases in pitch also produces an energy non-uniformity (e.g., extending normal to the surface of the touchscreen or in the z-axis direction if the x and y axes are deemed to be the touchscreen surface) between rows and columns that makes it more difficult to set touch/no-touch thresholds within a touchscreen system.

Embodiments of the novel touchscreen architecture presented herein, and equivalents thereof, provide a smoother and more linear response to a user's interaction with a touchscreen including the instance when the user's interaction moves across the surface of the touchscreen even in a diagonal direction. In one embodiment, such a novel touchscreen uses an elongated intermeshed pattern in which a conductor has extensions or protrusions into an adjacent conductor thereby increasing the affect of linear meshing between those conductors.

Also, a spacing or window in conductors of an upper and/or top layer (e.g., those closest to the user's interaction with the touchscreen) allow for increased meshing under the touch. The windows, protrusions, and/or extensions can be formed from any desired shape (e.g., diamonds, triangles, circles, etc.). In one preferred embodiment, elongated diamonds produce a good linear meshing between the horizontal and vertical axes. If desired, the extensions or protrusions from one conductor into another conductor can be implemented using a symmetrical design to allow for a highly linear area under the touch as a user's interaction with the touchscreen (e.g., a user's finger) transitions from a first conductor aligned in a first direction to a second conductor aligned in a second direction. Moreover, as the number of protrusions and/or extensions (e.g., which may be referred to as child components of a conductor) increases, so does the coupling, intermeshing, and interlacing increase between those conductors. Thus, FIG. 2 and FIG. 3 exemplify scanning methodologies that may be employed with the conductive patterns and embodiments of the invention.

FIGS. 4-14 illustrates embodiments of meshed conductive patterns (e.g., indium tin oxide (ITO) as may be deposited on a substrate composed of polyester or other material) as employed in a touchscreen.

Figure 4:
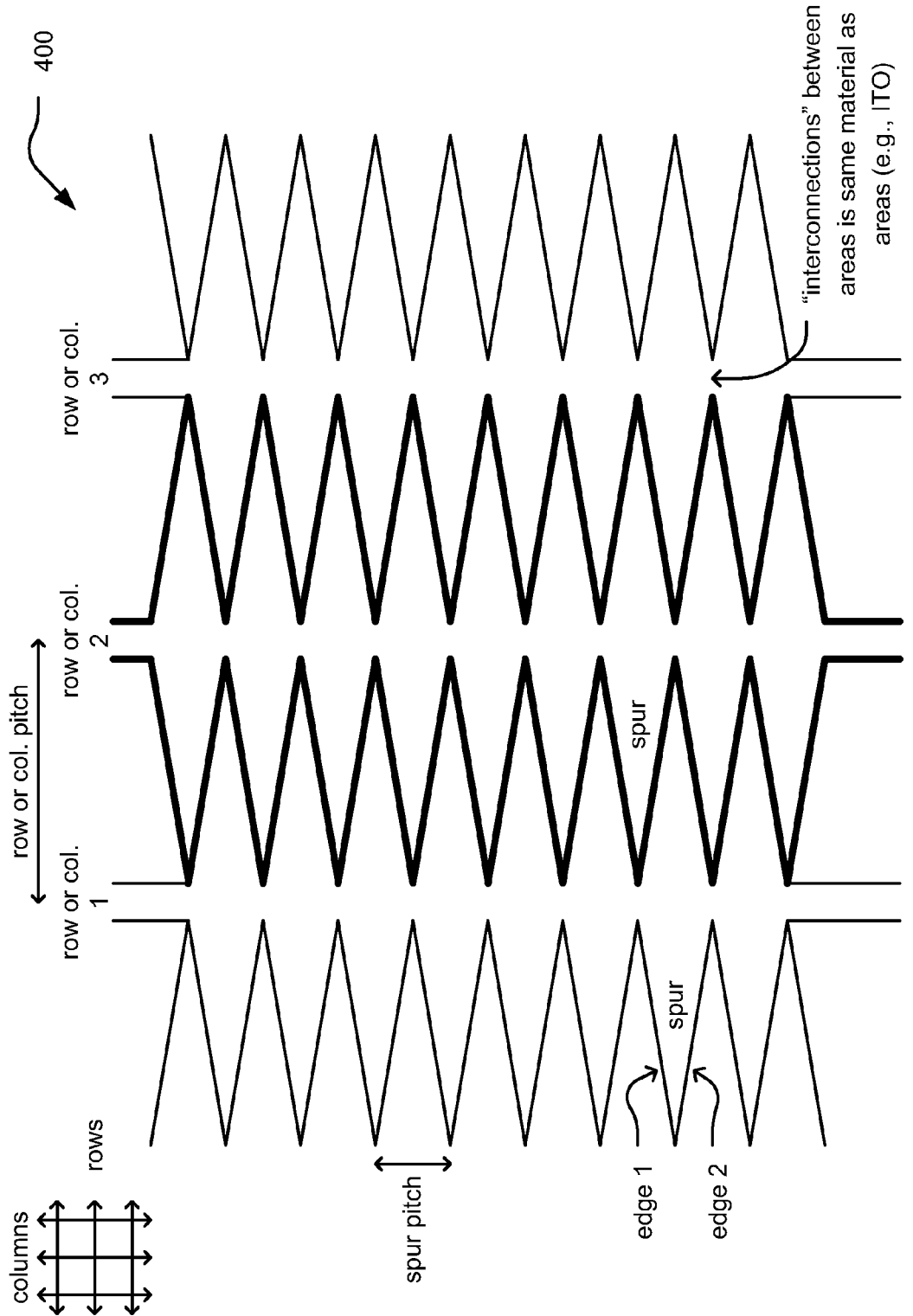
FIGS. 4-14 illustrates embodiments of meshed conductive patterns (e.g., indium tin oxide (ITO) as may be deposited on a substrate composed of polyester or other material) as employed in a touchscreen.

Referring to embodiment 400 of FIG. 4, this diagram shows substantially complementary conductors aligned in a direction such that the conductors are spaced as closely to one another as allowed by the processing and manufacturing processes employed to make the touchscreen (i.e., placing adjacent conductors as close to one another as possible). The conductors may be viewed as being implemented in an active surface area of a touchscreen (e.g., where a user has the capability to interact with the touchscreen). The complementary alignment of these conductors indicates that they substantially cover the active surface area of a touchscreen. Of course, the conductors do have sufficient spacing or isolation between them so that they do not directly and electrically contact each other.

The spacing between the axial centers of adjacent conductors is referred to as the pitch (e.g., row pitch or column pitch when the conductors are aligned in rows or columns, respectively). Also, the sides of the conductors, that contain a number of spurs, are designed such that they provide for significant inter-meshing with adjacent conductors. The axial spacing between the various spurs is referred to as the spur pitch.

These spurs interface with the spurs of an adjacent conductor to effectuate a much improved degree of inter-lacing, inter-meshing, and/or inter-digital (e.g., considering the spurs of adjacent conductors as being digits) interfacing when compared to prior art designs.

The interconnections of the conductors from one area to another may be composed of the very same material as the areas (e.g., indium tin oxide (ITO) or some other conductive material as may be deposited on a substrate composed of polyester). As opposed to employing discrete areas of a conductor that are coupled together using only traces on a board, jumpers, and/or wires, this architecture of embodiment 400 helps ensure that the conductors have a significantly reduced overall impedance when compared to prior art designs, in that, small and tight choke points within the conductor path are effectively reduced and/or eliminated.

Considering a side of one of the conductors that includes spurs, each spur can be viewed as having a first edge and a second edge that taper to a point in embodiment 400. A spur can be viewed, from one perspective, as being a tapered and extending to a point. However, it is noted that some spurs need not precisely extend to a point (e.g., see spurs of FIG. 8 as just one possibility). Generally, the more elongation and/or tapering of a spur of a conductor will allow that spur to intermesh with spurs of an adjacent conductor. The spurs of this embodiment 400 show that they are aligned symmetrically around a central axis of each conductor.

Figure 5:
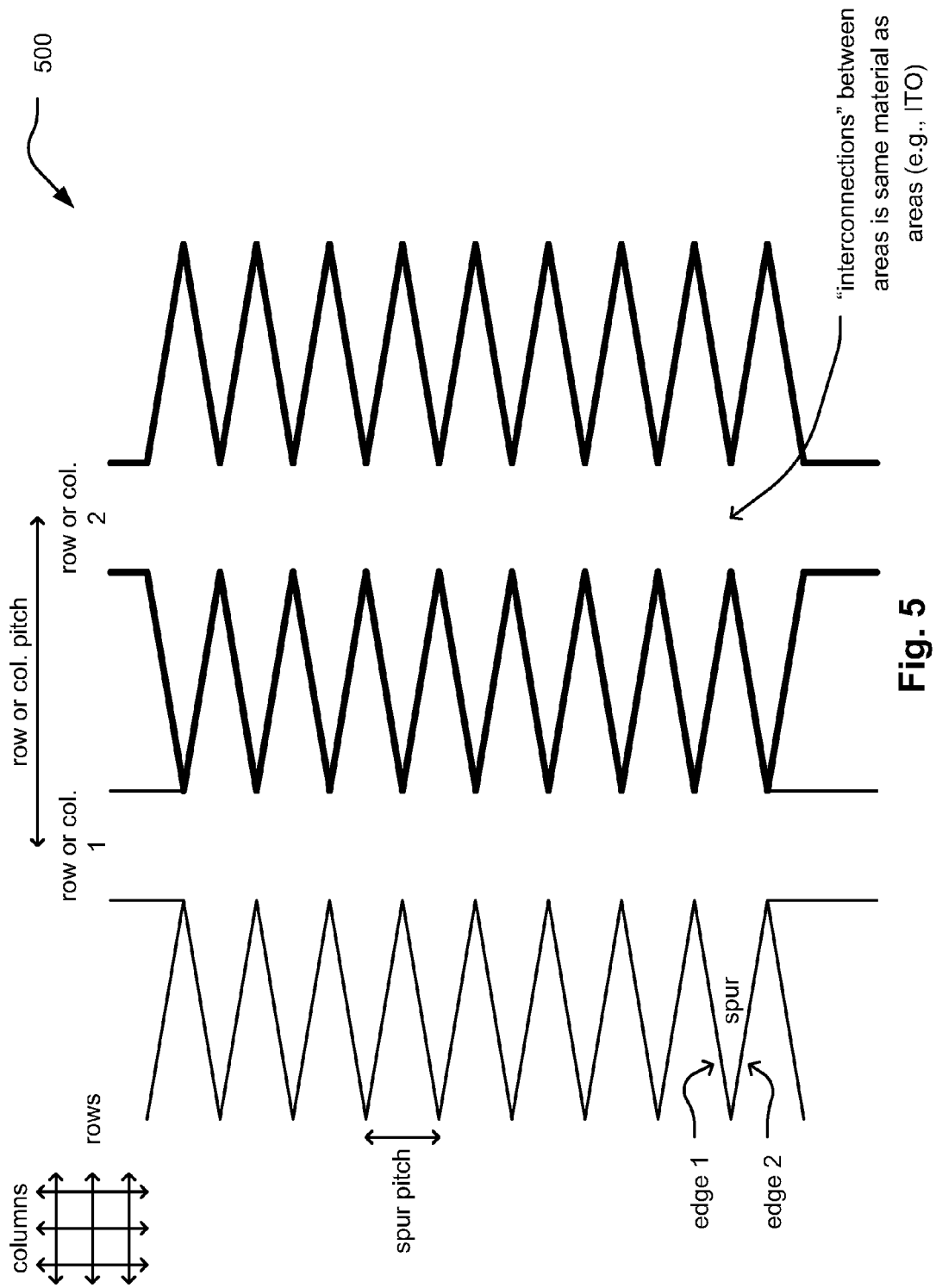

Referring to embodiment 500 of FIG. 5, this diagram also shows substantially complementary conductors aligned in a direction such that the conductors are spaced as closely to one another as allowed by manufacturing processing techniques employed to make the touchscreen. This diagram shows the interconnections between the areas of the conductors are wider than in the previous embodiment. Alternatively, this may be viewed as including conductors having an even wider central axis. This wider central axis provides a wide conductive path that further reduces the impedance of the conductor. If desired, the spur pitch may be the same as in the previous embodiment 400, or it may be different. This diagram shows a larger conductor pitch (e.g., row pitch or column pitch, or otherwise, as the particular embodiment may be) than in the previous embodiment 400.

Figure 6:
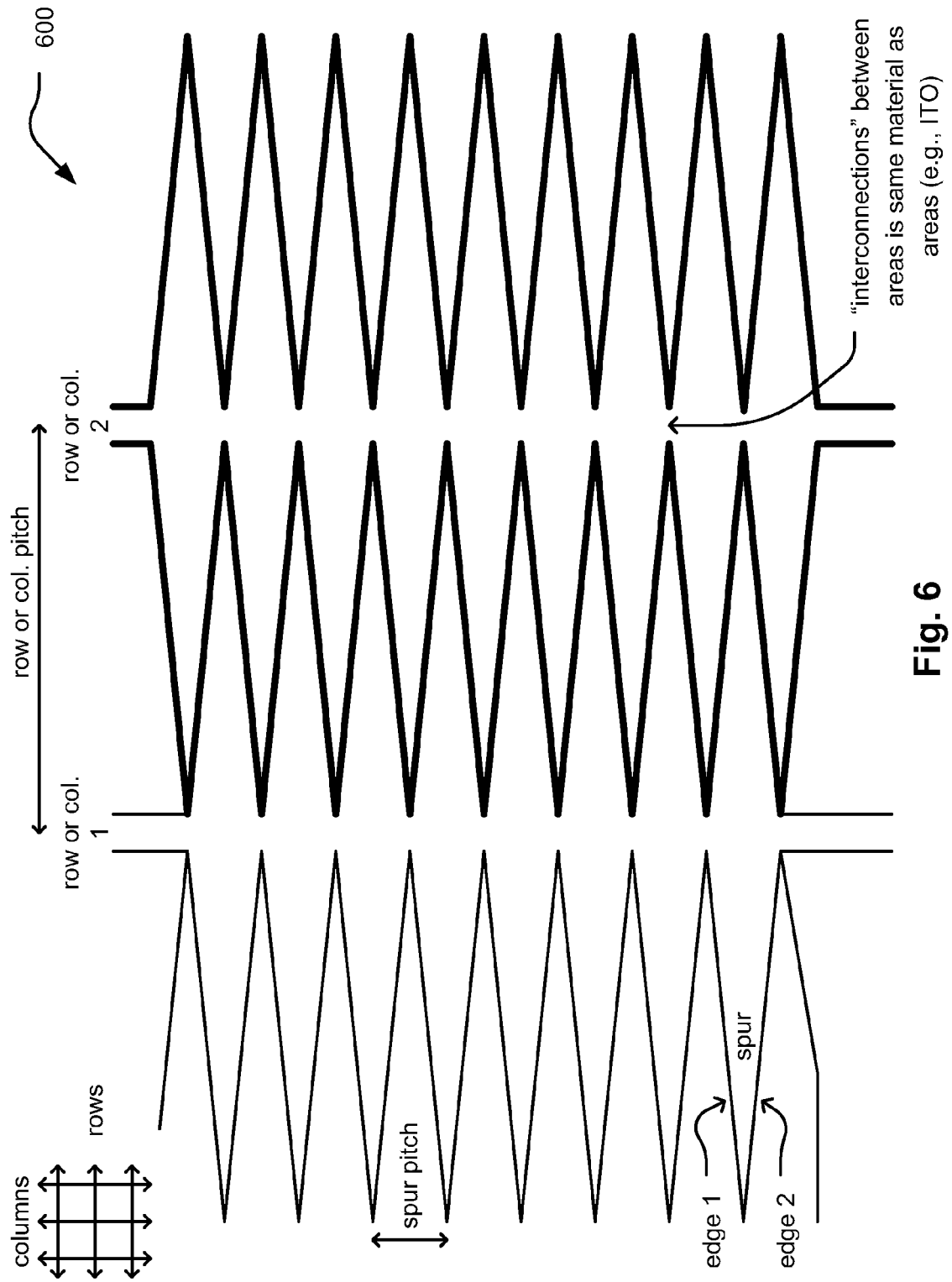

Referring to embodiment 600 of FIG. 6, this diagram also shows substantially complementary conductors aligned in a direction such that the conductors are spaced as closely to one another as allowed by the processing and manufacturing means employed to make the touchscreen. This diagram shows the spurs therein being significantly more elongated than in other embodiments. The spurs of one conductor protrude and/or extend much further into the spurs an adjacent conductor. This can allow for very effectively intermeshing between adjacent conductors while also allowing for a much increased conductor pitch (e.g., row pitch or column pitch, or otherwise, as the particular embodiment may be).

Figure 7:
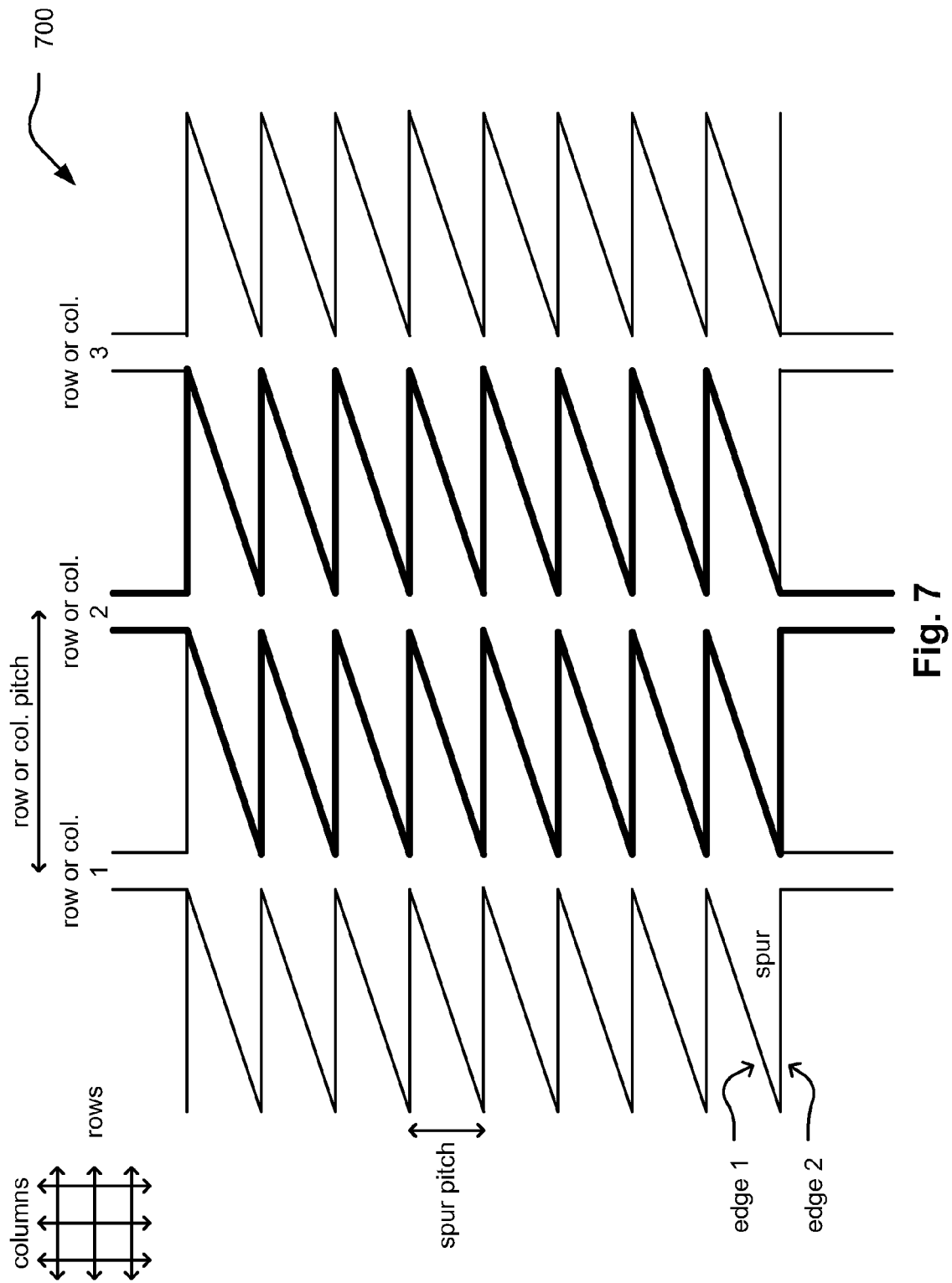

Referring to embodiment 700 of FIG. 7, this diagram also shows substantially complementary conductors aligned in a direction such that the conductors are spaced as closely to one another as allowed by the processing and manufacturing means employed to make the touchscreen. The spurs of this diagram are somewhat tilted with respect to the central axis of the conductor. As can be seen, one edge of a spur is perpendicularly aligned with an axis of its corresponding conductor, and the other edge of that spur is diagonally aligned relative to the axis of the conductor.

Figure 8:
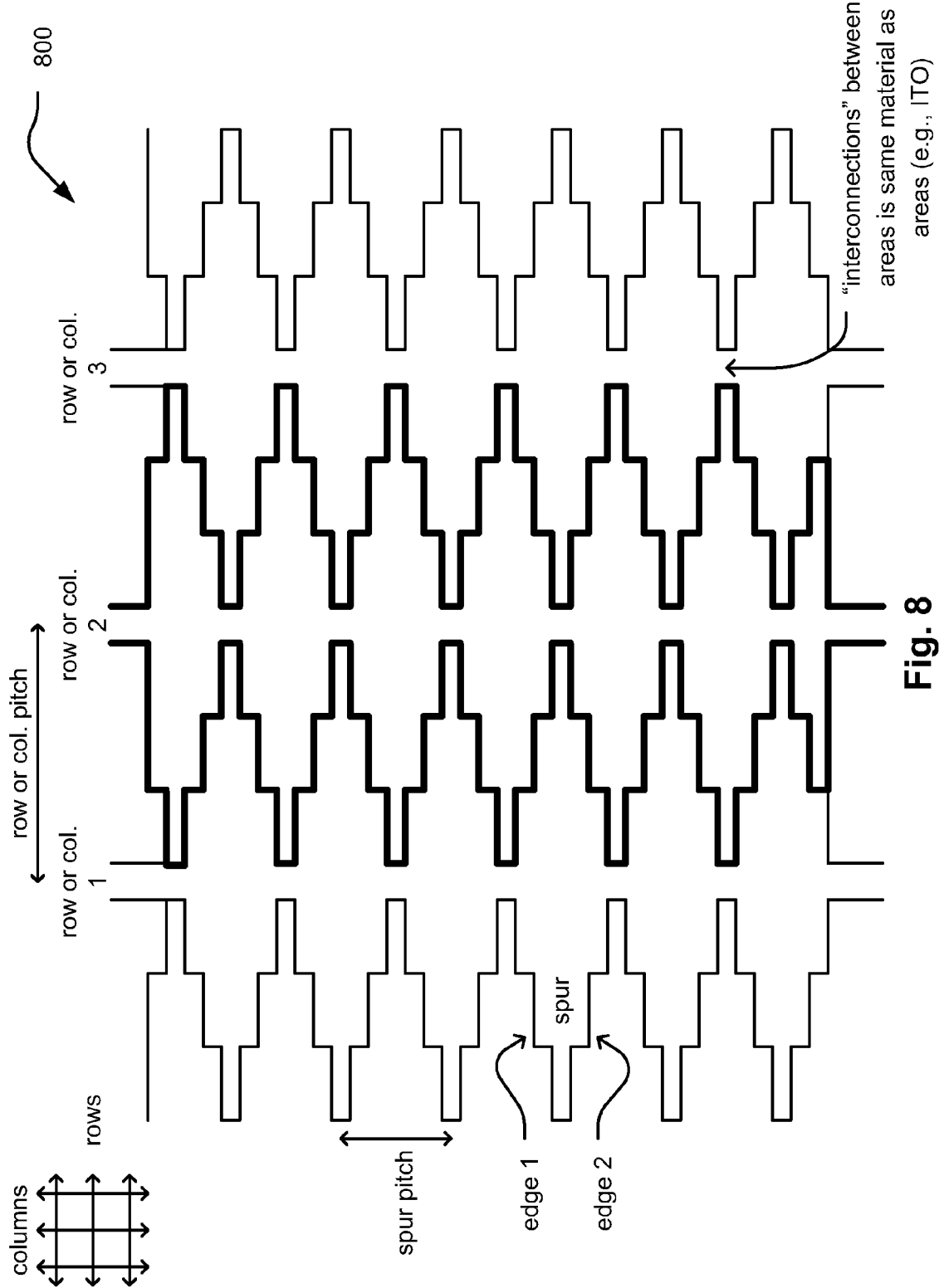

Referring to embodiment 800 of FIG. 8, this diagram also shows substantially complementary conductors aligned in a direction such that the conductors are spaced as closely to one another as allowed by the processing and manufacturing means employed to make the touchscreen. The spurs of this diagram include non-triangular shapes; they may be described as being stair-step shaped spurs. The spurs of this diagram have more than two edges (e.g., as shown for the triangular shaped spurs of the prior described embodiments of FIGS. 4-7). Also, these spurs do not elongate and/or taper directly to a point (e.g., as can be seen, the very edge of these spurs is flat and includes an edge aligned with the axis of its corresponding conductor).

Figure 9:
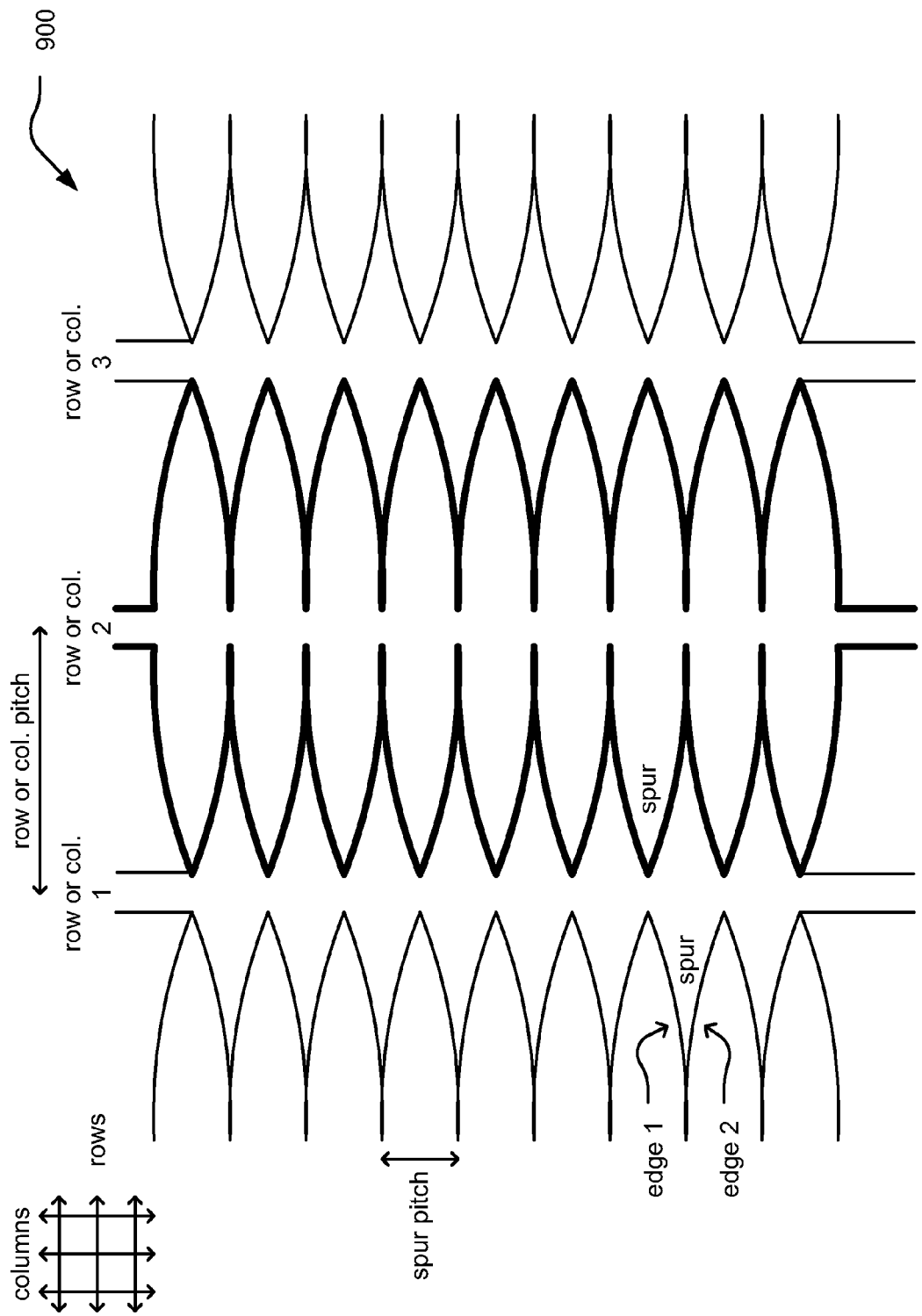

Referring to embodiment 900 of FIG. 9, this diagram also shows substantially complementary conductors aligned in a direction such that the conductors are spaced as closely to one another as allowed by the processing and manufacturing means employed to make the touchscreen. The spurs of this diagram also include non-triangular shapes; they may be described as being parabolic shaped spurs. Again, a designer has great latitude in selecting the shape of the particular spurs employed within a given embodiment.

Figure 10:
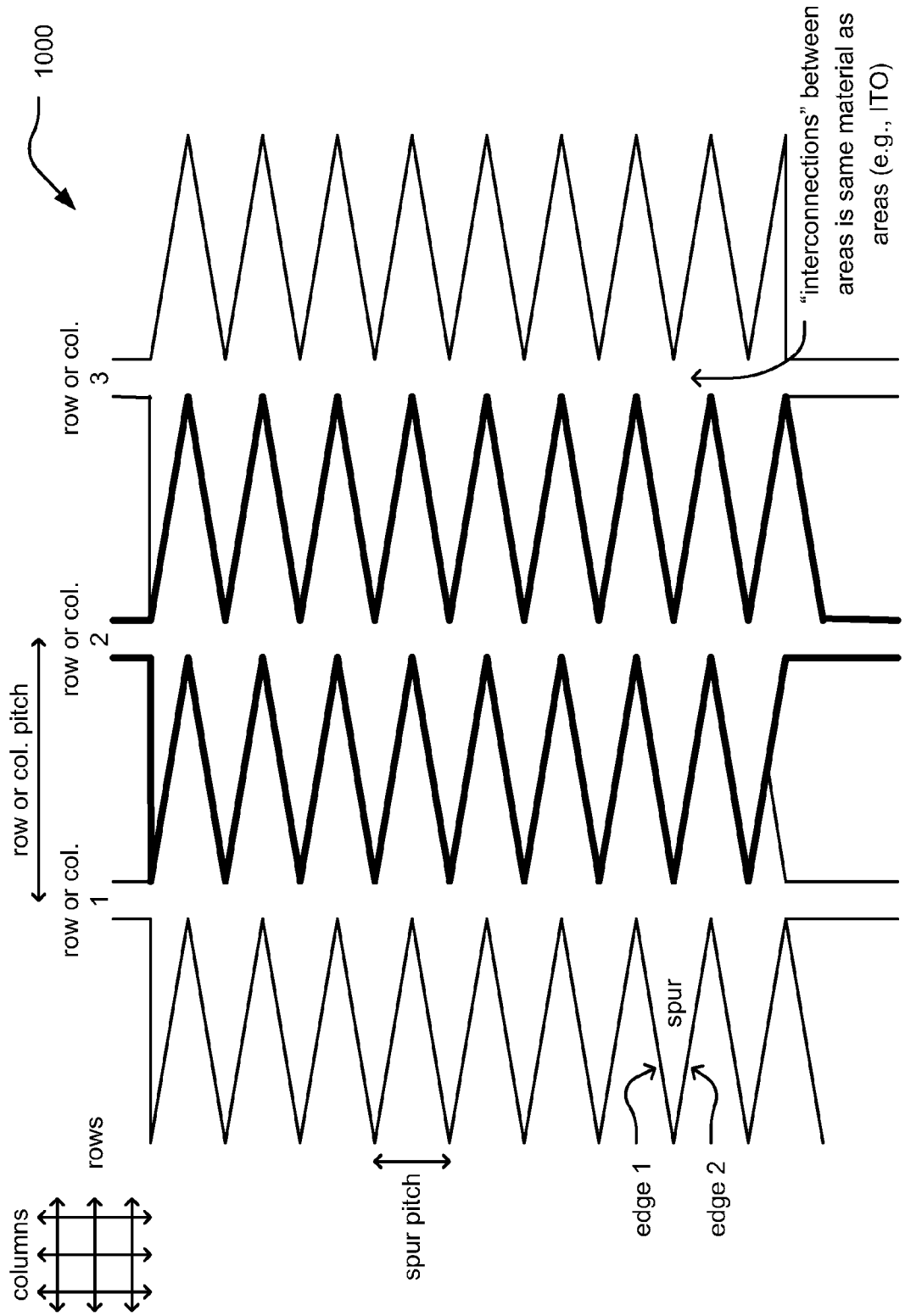

Referring to embodiment 1000 of FIG. 10, this diagram also shows substantially complementary conductors aligned in a direction such that the conductors are spaced as closely to one another as allowed by the processing and manufacturing means employed to make the touchscreen. Generally, the conductors of this diagram may be described as having a zig-zag type pattern, in that, the conductors intermesh with one another in an alternating manner with respect to the alignment of their respective spurs. In this embodiment, the spurs of one conductor do not necessarily overlap and pass beyond the axis of an adjacent conductor. This diagram shows that the spurs of one conductor extend right to the edge of the axis of an adjacent conductor. The spurs on one side of a conductor are axially offset in relation to the spurs from the opposite side of the same conductor.

Figure 11:
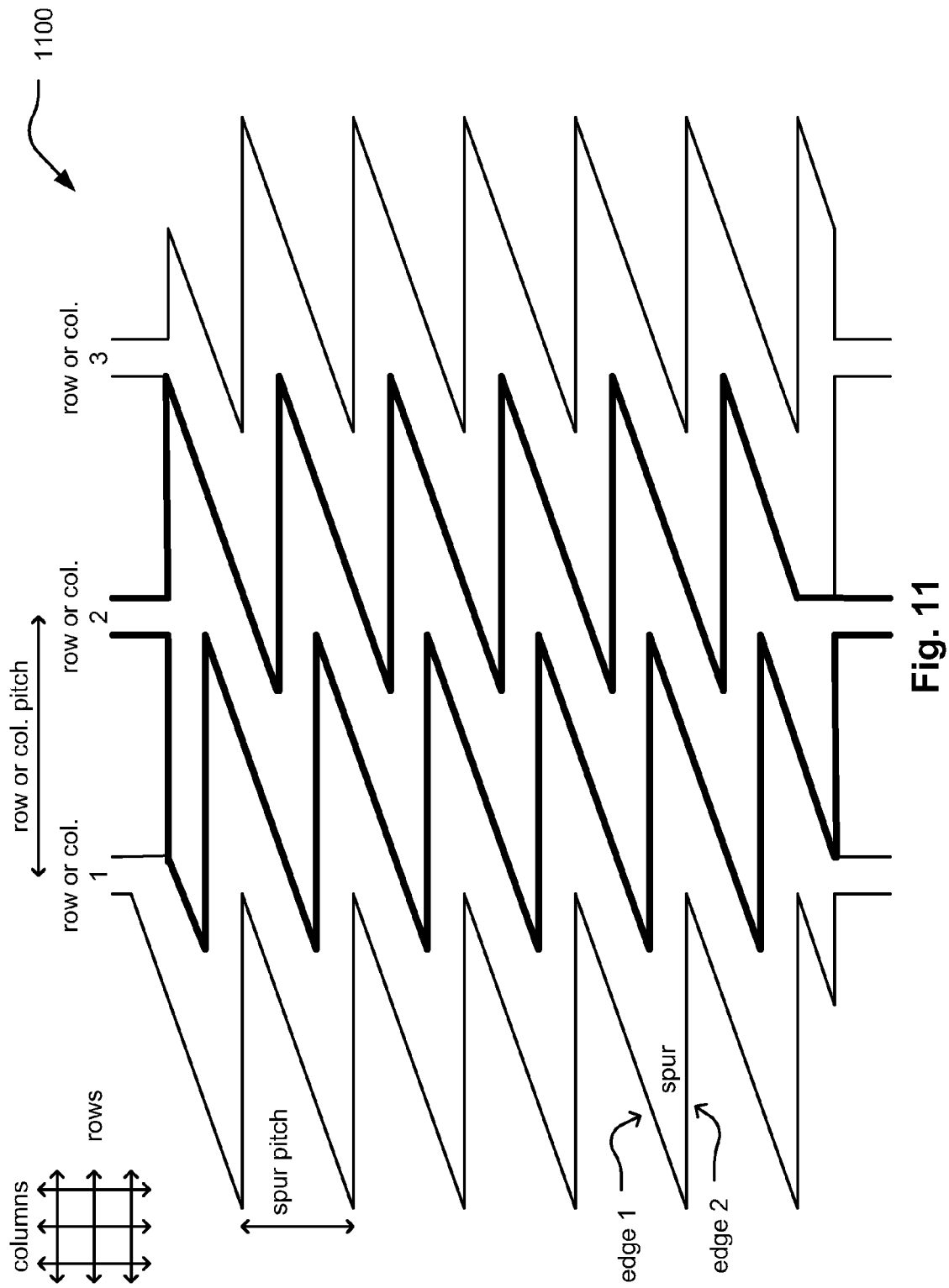

Referring to embodiment 1100 of FIG. 11, this diagram also shows substantially complementary conductors aligned in a direction such that the conductors are spaced as closely to one another as allowed by the processing and manufacturing means employed to make the touchscreen. The conductors of this diagram may also generally be described as having a zig-zag type pattern, in that, the conductors intermesh with one another in an alternating manner with respect to the alignment of their respective spurs. However, in this embodiment, the spurs of one conductor do in fact largely overlap and pass beyond the axis of an adjacent conductor.

Figure 12:
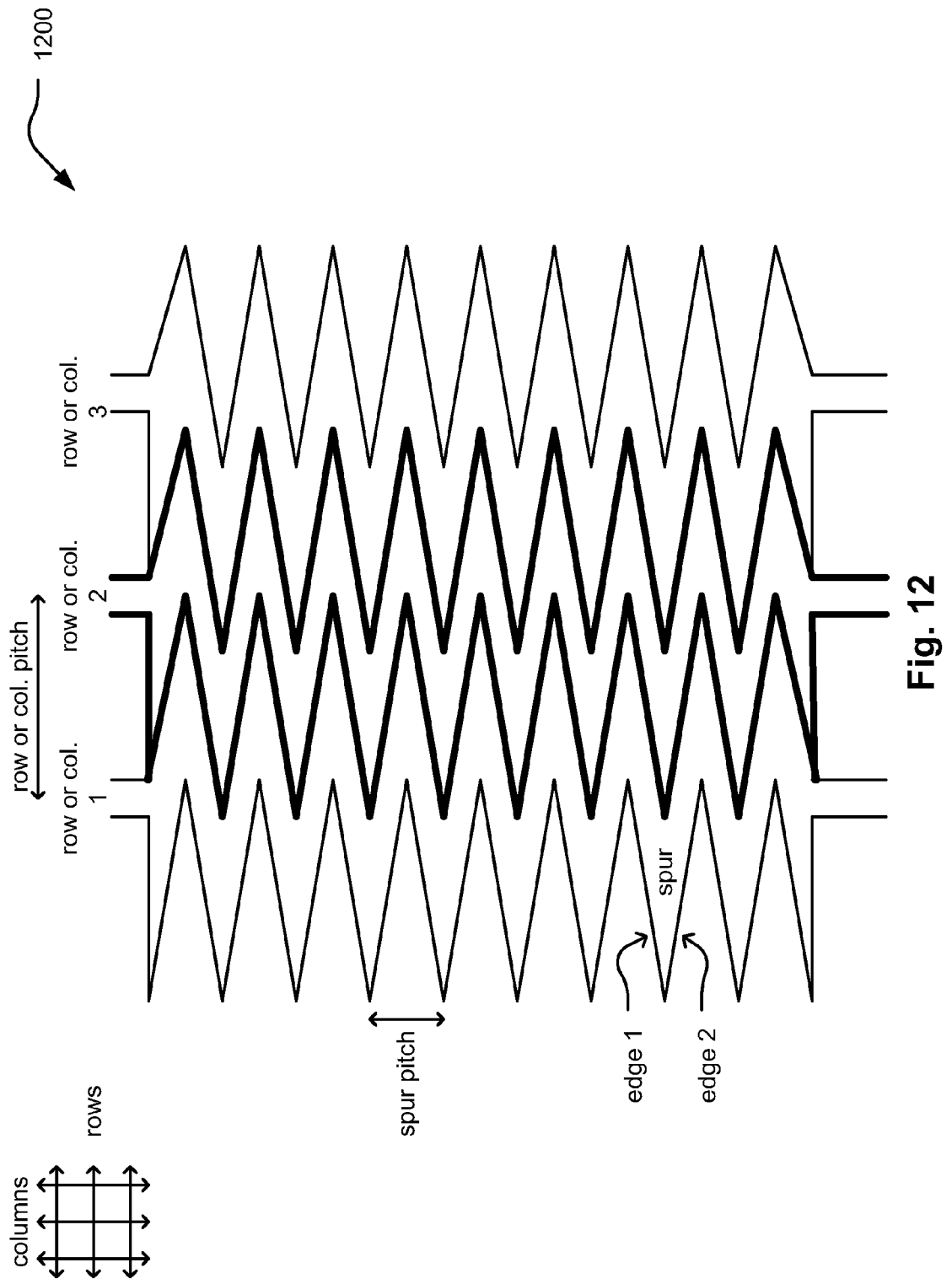

Referring to embodiment 1200 of FIG. 12, this diagram also shows substantially complementary conductors aligned in a direction such that the conductors are spaced as closely to one another as allowed by the processing and manufacturing means employed to make the touchscreen. The conductors of this diagram may also generally be described as having a zig-zag type pattern, in that, the conductors intermesh with one another in an alternating manner with respect to the alignment of their respective spurs. In this embodiment, the spurs of one conductor barely overlap and pass beyond the axis of an adjacent conductor (e.g., when compared to the large overlap of the previous embodiment).

As can also be seen in these various zig-zag type embodiments (e.g., FIG. 10, FIG. 11, and FIG. 12), the conductor pitch and spur pitch may be selected and implemented as desired. Additionally, a benefit of embodiments 1000, 1100 and 1200 is that they have substantially wide conductor paths relative to the embodiments 400-900 and thus can have lower impedance.

Figure 13:
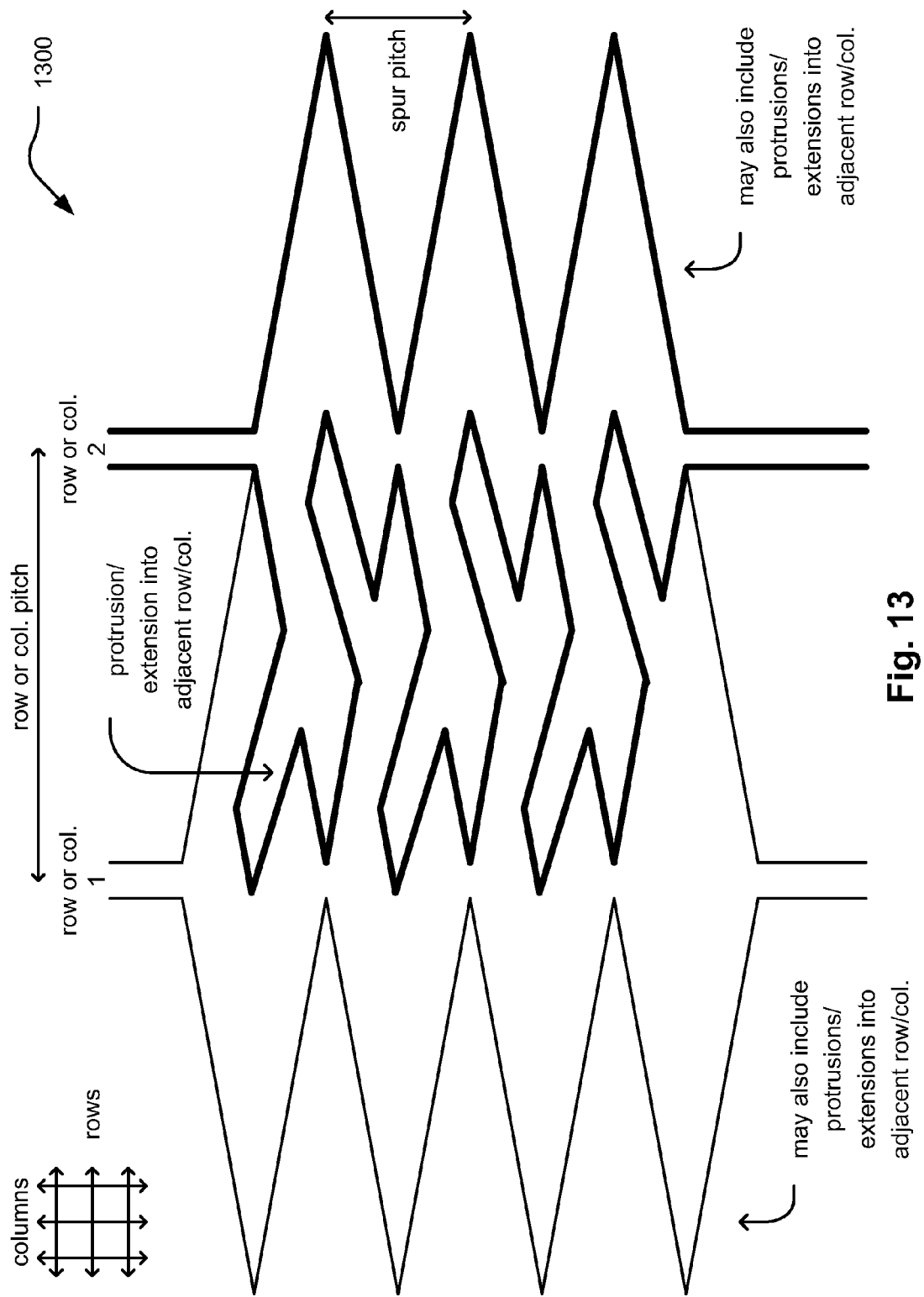

Referring to embodiment 1300 of FIG. 13, this diagram also shows substantially complementary conductors aligned in a direction such that the conductors are spaced as closely to one another as allowed by the processing and manufacturing means employed to make the touchscreen. The spurs of this diagram may include more than simply two edges, and they may also include multiple protrusions and/or extensions into an adjacent conductor. These protrusions and/or extensions may be viewed as being child-extensions, sub-spurs, or some other terminology without departing from the scope and spirit of certain aspects of the invention. An even greater degree of intermeshing/interlacing may be achieved by using spurs having such shapes. From certain perspectives, this use of additional protrusions and/or extensions (e.g., child encroachment portions) or a spur may be referred to as a fractal design and implementation.

Figure 14:
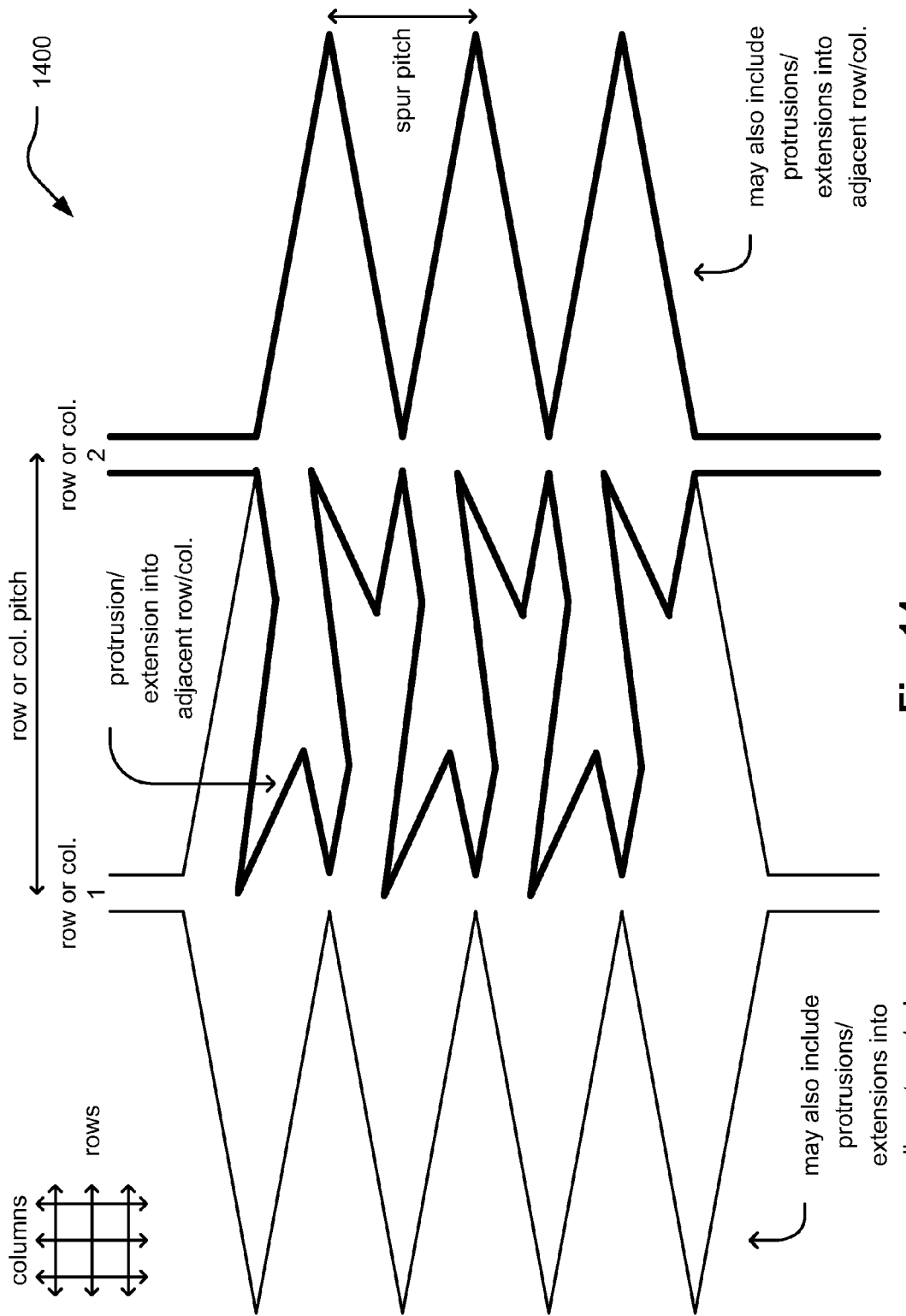

Referring to embodiment 1400 of FIG. 14, this diagram also shows substantially complementary conductors aligned in a direction such that the conductors are spaced as closely to one another as allowed by the processing and manufacturing means employed to make the touchscreen. Again, the spurs of this diagram may include more than simply two edges, and they may also include multiple protrusions and/or extensions into an adjacent conductor. The additional protrusions and/or extensions (e.g., child encroachment portions) from a spur in this embodiment are triangular shaped. Clearly, any desired shape of such additional protrusions and/or extensions (e.g., child encroachment portions) from a spur may be employed without departing from the scope and spirit of the invention.

Generally speaking, a designer is provided a great degree of latitude in selecting spur shapes, elongation, spur pitch, conductor pitch, and/or other parameters in designing a conductive pattern as may be employed within a touchscreen in accordance with the various principles presented herein and equivalents thereof.

These various examples of shapes of spurs, alignment of spurs and their respective conductors, zig-zag type alignment, etc. are exemplary. The reader is reminded that various changes and modifications to any of them may be practiced without departing from the scope and spirit of certain aspects of the invention.

The principles described above with respect to complementary arrangement of conductors disposed on a common layer or plane (e.g., variability and selectivity of conductor pitch, spur pitch, spur shape, protrusion shape, conductor axial width, title of spurs, and/or any other parameter) are also extendable to a non-complementary arrangement of conductors disposed on different planes or layers. That is to say, in certain other of the embodiments presented herein, a conductive pattern may include conductors of a layer that are not non-complementary, in that, spaces exist within the conductors of such a layer. These spaces may be implemented in a variety of ways. There may be a window and/or opening within conductor, spacing between adjacent conductors, etc.

In some embodiments, the respective spacing between first conductors (e.g., as aligned in a first direction and implemented in a first layer of a touchscreen) is greater than respective spacing between second conductors (e.g., as aligned in a second direction and implemented in a second layer of a touchscreen). In even other embodiments, it is also noted that such first conductors may be complementary with respect to one another, and yet be non-complementary with respect to such second conductors. The use of the intermeshing and interlacing of conductors in accordance with the principles presented herein allows for a smooth, linear transition of the energy as a user's interaction with the touchscreen (e.g., a finger touch) across the first and second conductors that are arranged in the first and second directions.

FIG. 15A and FIG. 15B illustrate embodiments 1500a and 1500b of top and bottom conductive patterns, respectively, as employed in a touchscreen. Generally, FIG. 15A shows a pair of axially aligned conductors having a conductor pattern in which a plurality of conductors are formed and arranged to have a minimal space between adjacent conductors. FIG. 15B generally shows a pair of axially aligned conductors having a conductor pattern in which a plurality of conductors are formed and arranged to have a substantially greater amount of space between the conductors to create "windows" of non-conductive area. The windows allow the capacitive coupling of the top layer conductors to interact with bottom layer conductors with a user touch. Generally, a signal is produced to a conductor to detect a touch by monitoring signal responses in the conductors for first and second conductors whether arranged on the same plane or layer or arranged on different planes or layers. The interaction in at least one embodiment is capacitive in nature where a touch location capacitance is increased to either change a signal characteristic of the produced signal based on the changed capacitance for a zone touch detection system or to change a received signal characteristic for a cross-point touch detection system. The signal is merely a signal produced into a conductor to detect a touch on either the conductor to which the signal is produced or from which a signal response is detected. Alternately, a touch can result in a conduction path being created to produce an output signal at one or more conductors disposed in a different layer from a layer into which a signal is injected to detect a touch.

For purposes of consistency, the conductors disposed on a first layer of a touchscreen (e.g., or an upper and/or top layer) of FIG. 15B shall referenced as first conductors. Thus, the top layer of conductors comprises a plurality of first conductors. Similarly, the bottom layer of conductors of FIG. 15A may be referred to as a plurality of second conductors (e.g., or a lower and/or bottom layer).

Referring to embodiment 1500a of FIG. 15A, the second conductors of the plurality of second conductors are arranged to have very little spacing in between adjacent second conductors (e.g., in one embodiment, as close as the processing and manufacturing means employed to make the touchscreen allow).

In embodiment 1500a, the spacing between adjacent second conductors is a minimal amount of space that is required to separate the adjacent second conductors electrically. Referring to embodiment 1500b of FIG. 15B, however, it may be seen that the spacing or windows between the adjacent conductors is notably greater than in embodiment 1500a. In one embodiment, the ratio of spacing to conductive material (space to ITO) for an active area of the top layer is approximately 1:1 (e.g., a 50%/50% ratio). Generally, the spacing between adjacent conductors of the top layer as shown in embodiment 1500b is greater than the spacing between adjacent conductors of the bottom layer as shown in embodiment 1500a. The spacing of embodiment 1500a may be greater than shown in alternative embodiments. For example, the spacing may range from 1% to a value that is less than 50% relative to an active surface area of the touchscreen (e.g., the area in which a user's interaction with the touchscreen is detectable).

Other aspects to note regarding embodiments 1500a and 1500b of the first and second layers of conductors (e.g., upper and lower and/or top and bottom layers) include the axial orientation of the second conductors in relation to the first conductors of embodiments 1500a and 1500b, respectively. As may be seen by referencing the coordinate references in the upper left hand side of the Figures, the first conductors of embodiment 1500b are aligned with the x-axis while the second conductors of embodiment 1500a are aligned with the y-axis. Additionally, each of the first and second conductors include spurs that extend outwardly from the conductor axis wherein the spurs are tapered from a relatively wide base to a point. Further, as described in relation to earlier Figures including FIG. 4, the spurs have a spur pitch that is substantially greater than a conductor pitch (e.g., a row or column pitch) of the adjacent first or second conductors such that a total width of two opposing spurs is substantially greater than a height of the spurs. Additionally, as may be seen, a conductive channel exists in the axial center (e.g., axis) of the second conductors thereby providing for reduced impedance when compared to prior art approaches. The conductive channel is characterized by a width that is substantially greater than a typical line or trace width that is typically used in prior art patterns to couple surface touch areas.

To the extent that a diamond shape is created by the opposing spurs (e.g., triangular shaped spurs extending in opposite directions), the diamond shapes of the conductive areas are substantially elongated in contrast to prior diamond shaped conductive areas of a conductor wherein the width of the diamond shaped conductive areas is similar to the height of the diamond shaped conductive areas. Moreover, the spurs of the plurality of first and second conductors extend to be intermeshed or interlaced with spurs of adjacent conductors. In embodiment 1500a, the spurs extend very nearly to an axial center of the adjacent conductors. In embodiment 1500b, the spurs extend sufficiently to create a substantially meshed pattern. In the example of embodiment 1500b, the spurs are at least fifty percent interlaced with spurs of adjacent conductors disposed on the same layer or plane. Referring back to embodiment 1500a, it may be seen that the conductive area of the plurality of conductors substantially cover the "active surface area" on the bottom layer of the touchscreen.

In one embodiment, the conductive area of the plurality of second conductors covers at least 99% of the active surface area of the bottom layer. In another embodiment, the plurality of second conductors covers at least 95% of the active surface area of the bottom layer. By having a plurality of second conductors that cover a large percentage of the active surface area of the bottom layer, shielding is provided by the plurality of second conductors to minimize or reduce interference. Prior art systems have typically included a shield below the touchscreen to reduce interference. In embodiment 1500a, the pattern of the bottom layer conductors, however, reduces the need for such a shield. Additionally, the plurality of second conductors that are not being used to conduct or receive a signal to detect a touch are operably coupled to circuit common to reduce or eliminate system noise or interference. Thus, the EMI properties of the second conductors of the bottom layer are negligible because of the grounding of the second conductors thereby further reducing a need for a shield as is used in the prior art.

One aspect of having interlaced spurs as shown in embodiments 1500a and 1500b of FIGS. 15A and 15B, respectively, is that meshing of interlaced spurs is increased under a finger touching the touchscreen to greatly reduce "stair stepping" for a smooth continuous movement of the finger across the touchscreen. Large "steps" are eliminated because an effective resolution for touch locations is substantially increased when a conductor pattern with some of the characteristics of embodiments 1500a and 1500b are used in a touchscreen. Stair stepping is greatly reduced as the amount of surface area of the adjacent row or column intrudes into the closest adjacent conductor in a row or column. The meshing under the finger is increased to eliminate the "large steps" in the pattern itself and therefore in the tracking of touch movement.

Generally, the embodiments 1500a and 1500b, when used for the top and bottom layers of conductors of a touchscreen, can be adjusted to adjust the touch area by increasing or decreasing the windows and extensions. In the described embodiment 1500b, the spacing or windows comprise approximately 50% of the active surface area of the top layer. Having substantially meshed conductors in the bottom layer increases precision of location identification based on an evaluation of signal response when a touch of the touchscreen occurs.

The embodiments of the invention shown in FIGS. 15A, 15B and subsequent Figures increase the meshing which will allow row and/or column pitch to approximately range from 6.6 mm to 24 mm. Larger sized touchscreen displays may utilize the illustrated patterns and variants thereof to increase resolution of contact detection without increasing lines and points that must be monitored for a touch. These patterns allow more row to row interaction and column to column interaction than prior art designs by adjacent conductors that are on the same layer or plane.

FIG. 16A and FIG. 16B illustrate alternative embodiments of top and bottom conductive patterns, respectively, as employed in a touchscreen.

Referring to embodiment 1600a of FIG. 16A, the second conductors are arranged similarly to embodiment 1500a of FIG. 15A. Referring to embodiment 1600b of FIG. 16B, the first conductors are arranged so that tapered points of the spurs are substantially adjacent and wherein the spurs are disposed to be axially aligned or substantially aligned. Opposing spurs from adjacent conductors define a diamond shaped window or space to allow the capacitive coupling of the top layer conductors to interact with bottom layer conductors with a user touch.

FIG. 17A and FIG. 17B illustrate alternative embodiments of top and bottom conductive patterns, respectively, as employed in a touchscreen. Referring to embodiment 1700a of FIG. 17A, as with embodiments 1500a and 1600a, minimal spacing exists between the coplanar second conductors and the spacing may vary as described in relation to embodiment 1500a. One aspect to note about embodiment 1700a, however, is that the outwardly extending spurs are axially offset in relation to opposing spurs of the same conductor to create an axially un-symmetric pattern that is similar to a zig-zag in shape. Otherwise, aspects discussed in relation to embodiment 1500a apply here as well. Referring to embodiment 1700b of FIG. 17B, it may be seen that embodiment 1700b is similar to 1500b. As discussed for similar embodiments, a substantially wider current path is created by the conductor pattern of embodiment 1700a to reduce impedance.

FIG. 18A and FIG. 18B illustrate alternative embodiments of top and bottom conductive patterns, respectively, as employed in a touchscreen. Referring to embodiment 1800a of FIG. 18A, it may be seen that embodiment 1800a is also similar to embodiment 1600a. FIG. 18B, however, illustrates embodiment 1800b which comprises a top layer with conductors that have spurs that are rectangular in shape instead of having a tapered shape that culminates in a point as with the prior embodiments. As with other embodiments for the top layer conductors, windows of space are defined by the pattern of conductive material. The prior discussions regarding spacing and windows apply here as they do for any top layer pattern of conductors. In embodiment 1800b, for example, the space that does not have conductive material consumes about 50% of the active surface area of the top layer. One notable aspect of FIGS. 18A and 18B is that the conductors of the top and bottom layers may have substantially different shapes relative to each other.

FIG. 19A and FIG. 19B illustrate alternative embodiments of top and bottom conductive patterns, respectively, as employed in a touchscreen. Referring to embodiment 1900a of FIG. 19A, it may be seen that embodiment 1900a is also similar to embodiment 1600a. Referring to embodiment 1900b of FIG. 19B, however, it may be seen that the outer perimeters of the second conductors of embodiment 1900a define a shape that is similar to the shape of the outer perimeter of the first conductors of FIG. 19B. The outward extending spurs are axially aligned and opposing spurs define a window or space having a diamond shape. It is also noted that other shaped windows or spaces may alternatively be employed without departing from the scope and spirit of the invention (e.g., circles, triangles, or other shapes). As such, the conductive paths follow the perimeters of the outwardly extending spurs. The windows or space allow a user's touch to reach a bottom layer conductor as previously discussed.

FIG. 20A and FIG. 20B illustrate alternative embodiments of top and bottom conductive patterns, respectively, as employed in a touchscreen. In FIG. 20A, embodiment 2000a shows parallel aligned conductors having no spurs thereon that intermesh with adjacent conductors. In FIG. 20B, embodiment 2000b shows conductors formed from a checkered pattern that include discrete areas that are coupled together using vias, bond wires, etc. The areas of the conductors in FIG. 20B may be of any desired shape (e.g., square, diamond, circle, etc.).

Considering the analogy to a checker board, these conductors in FIG. 20B may be viewed as being one of the colors of squares on the checker board (e.g., either the red or the black squares). The other colored squares are removed (e.g., if the red squares are to remain, the black squares would be removed, or vice versa).

In this instance, the windows from the top layer down to the bottom layer would be viewed as being the 'missing' squares, with only a minimal overlap being attributed by the vias, bond wires, etc. that couple the various areas of the conductors in FIG. 20B.

FIG. 21A and FIG. 21B illustrate alternative embodiments of top and bottom conductive patterns, respectively, as employed in a touchscreen. In FIG. 21A, embodiment 2100a shows parallel aligned conductors having no spurs thereon that intermesh with adjacent conductors. In FIG. 21B, embodiment 2100b shows conductors formed by continuous placed material (e.g., ITO) forming a checkered pattern somewhat analogous to the previous embodiments, with at least one difference being that the interconnections between areas of the conductors in FIG. 21B are the same material as that of areas (e.g., all ITO). As with the previous embodiment, the areas of the conductors in FIG. 21B may be of any desired shape (e.g., square, diamond, circle, etc.).

FIG. 22A and FIG. 22B illustrate alternative embodiments of top and bottom conductive patterns, respectively, as employed in a touchscreen. In FIG. 22A, embodiment 2200a shows conductors that are arranged to have very little spacing in between adjacent second conductors (e.g., in one embodiment, as close as the processing and manufacturing means employed to make the touchscreen allow). Any desired pattern for intermeshing may be employed.

FIG. 22B is similar to FIG. 20B, in that, in FIG. 22B, embodiment 2200b shows conductors formed from a checkered pattern that include discrete areas that are coupled together using vias, bond wires, etc. The areas of the conductors in FIG. 22B may be of any desired shape (e.g., square, diamond, circle, etc.).

FIG. 23A and FIG. 23B illustrate alternative embodiments of top and bottom conductive patterns, respectively, as employed in a touchscreen. FIG. 23A is similar to FIG. 22A, in that, in FIG. 23A, embodiment 2300a shows conductors that are arranged to have very little spacing in between adjacent second conductors (e.g., in one embodiment, as close as the processing and manufacturing means employed to make the touchscreen allow). Again, any desired pattern for intermeshing may be employed.

FIG. 23B is similar to FIG. 21B, in that, in FIG. 23B, embodiment 2300b shows conductors formed by continuous placed material (e.g., ITO) forming a checkered pattern such that the interconnections between areas of the conductors in FIG. 23B are the same material as that of areas (e.g., all ITO). As with previous embodiments, the areas of the conductors in FIG. 23B may be of any desired shape (e.g., square, diamond, circle, etc.).

With these various embodiments presented above in FIG. 20A, FIG. 20B, FIG. 21A, FIG. 21B, FIG. 22A, FIG. 22B, FIG. 23A, and FIG. 23B, any desired shapes of conductors (e.g., with various spur shapes, meshing, etc.) may be employed for the bottom layer, and any desired shape may be employed for the checkered-type pattern for the top layer. In addition, combination of types of shapes may be employed within a checkered-type pattern for the top layer (e.g., including squares, circles, and/or other shaped areas mixed together, etc.) without departing from the scope and spirit of the invention.

FIG. 24A and FIG. 24B illustrate alternative embodiments of top and bottom conductive patterns, respectively, as employed in a touchscreen. In FIG. 24A, embodiment 2400a shows parallel aligned conductors having no spurs thereon that intermesh with adjacent conductors. In FIG. 24B, embodiment 2400b also shows parallel aligned conductors having no spurs thereon that intermesh with adjacent conductors. However, while the parallel aligned conductors in embodiment 2400b of FIG. 24A implemented to be as close to one another as the processing and manufacturing means employed to make the touchscreen allows, space is intentionally left between the parallel aligned conductors in FIG. 24B to allow coupling of a user's touch to the touchscreen through the top layer and to the parallel aligned conductors of the bottom layer of the touchscreen. A designer has full latitude in selecting how much spacing is provided between the parallel aligned conductors of the top layer so that sufficient coupling is effectuated to the parallel aligned conductors of the bottom layer.

FIG. 25A and FIG. 25B illustrate alternative embodiments of top and bottom conductive patterns, respectively, as employed in a touchscreen. In FIG. 25A, embodiment 2500a shows conductors having spurs thereon that intermesh with adjacent conductors in a manner similar to that of some previous embodiments (e.g., FIG. 15A, FIG. 16A, FIG. 18A, FIG. 19A).

While the conductors in embodiment 2500a of FIG. 25A are implemented to be as close to one another as the processing and manufacturing means employed to make the touchscreen allows, space is intentionally left between the parallel aligned conductors in embodiment 2500b of FIG. 25B to allow coupling of a user's touch to the touchscreen through the top layer and to the conductors of the bottom layer of the touchscreen. Again, a designer has full latitude in selecting how much spacing is provided between the parallel aligned conductors of the top layer so that sufficient coupling is effectuated to the parallel aligned conductors of the bottom layer.

FIG. 26A and FIG. 26B illustrate alternative embodiments of top and bottom conductive patterns, respectively, as employed in a touchscreen. In FIG. 26A, embodiment 2600a shows conductors having spurs thereon that intermesh with adjacent conductors in a manner similar to that of some previous embodiments (e.g., FIG. 15A, FIG. 16A, FIG. 18A, FIG. 19A, FIG. 25A).

In FIG. 26A, embodiment 2600a shows conductors having holes therein to functions as windows through which coupling of a user's touch to the touchscreen may pass through to the conductors of the bottom layer of the touchscreen. In this embodiment 2600b, considering again the analogy to a checker board, each of the individual conductors in FIG. 26B may be viewed as including conductive material corresponding to one of the colors of squares on the checker board (e.g., either the red or the black squares). The conductive material corresponding to locations of the other colored squares is removed (e.g., if the red squares are to remain, the black squares would be removed, or vice versa). However, it is noted that, to maintain electrical conductivity across an individual conductor, a finite amount of conductive material does remain between the holes, so that signals may still pass along the conductor and so that the conductor still has acceptably low impedance.

While the pattern of the holes in the individual conductors of this embodiment 2600b are shown using a check board type pattern (e.g., generally where the red or block shaped squares are removed), it is noted that the size, shape, and pattern/arrangement of such holes in the top layer of the touchscreen may be of any desired size, shape, and pattern/arrangement in accordance with a designer desire or need. The holes could be different shapes within a single conductor as well without departing from the scope and spirit of the invention (e.g., a single conductor may include square-shaped holes, triangle-shaped holes, diamond-shaped holes, etc.). The pattern/arrangement need also not be substantially uniform (e.g., using a checker board pattern/arrangement).

Moreover, a designer may also select any first desired combination of conductor parameters for a bottom layer (e.g., spur shape, elongation, spur pitch, conductor pitch, and/or other parameters) and any second desired combination of conductor parameters for a bottom layer (e.g., spur shape, elongation, spur pitch, conductor pitch, and/or other parameters). The various embodiments presented herein are exemplary, and not exhaustive. The reader is reminded that combinations and variations (e.g., such a top layer depicted in one diagram and a bottom layer depicted in another diagram) may be implemented within a touchscreen without departing from the scope and spirit of certain aspects of the invention as well.

Figure 27:
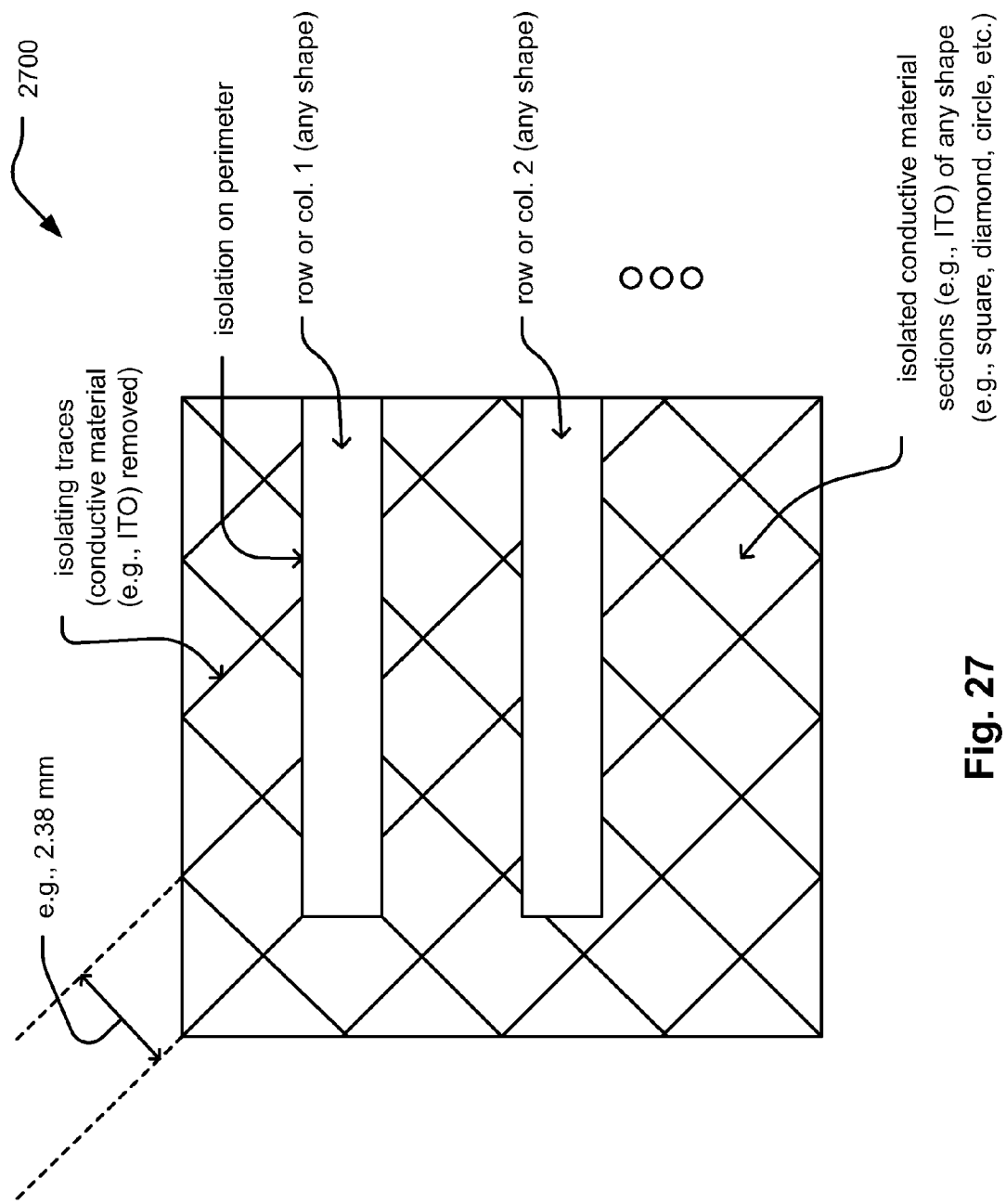
FIG. 27 illustrates an embodiment of a layer of a touchscreen having additional conductive material besides only conductors.

FIG. 27 illustrates an embodiment 2700 of a layer of a touchscreen having additional conductive material besides only conductors. In this diagram, it can be seen that conductors are disposed on the layer of material that also includes conductive material (e.g., ITO) disposed thereon. For illustration, the conductors are shown in very simply manner as being straight and parallel aligned, but it is noted that the conductors may alternatively be implemented in accordance with any desired manner (e.g., using spurs, zig-zag shape, etc.).

The remainder of the area of this layer of the touchscreen is also covered with the sections of the same conductive material (e.g., ITO) of which the conductors are composed. However, these sections of the conductive material are each separated from one another eclectically (e.g., isolating traces are achieved by removing some a sufficient amount of conductive material between these sections). In one embodiment, the width of these isolating traces is approximately 40 microns; however, any desired width of such isolating traces may be employed without departing from the scope and spirit of the invention. While the electrically floating sections of conductive material (e.g., floating plates) are illustrated in this diagram as having diamond shaped, it is noted that are desired shaped of such sections may be employed (e.g., squares, circles, etc.), and any desired combination of such shapes may alternatively be employed. In one embodiment, when employing diamond shaped sections, the size of the sections is 2.38 mm×2.38 mm. Clearly other sized sections may alternatively be employed, and each section need not necessarily be of the same size.

One embodiment employs the embodiment 2700 as a top layer within a touchscreen, and the windows of such an embodiment 2700 are formed through the areas of which the conductive material has been removed (e.g., the isolating traces in this embodiment 2700). In such an embodiment, the windows may be viewed as being these lines of the missing conductive material.

The implementation of conductive material across a majority (e.g., 90%, 95%, or some other value as desired) of this touchscreen layer, especially when it is the top layer visible to a user of the touchscreen, can significantly improve the visual effect of the touchscreen. This may be referred to as improving the optical characteristics of the touchscreen. The use of these various floating sections or floating plates can provide for a better visual impression of the touchscreen to a user, in that, the distinction of the conductors with respect to the rest of the touchscreen layer are less perceptible.

Figure 28:
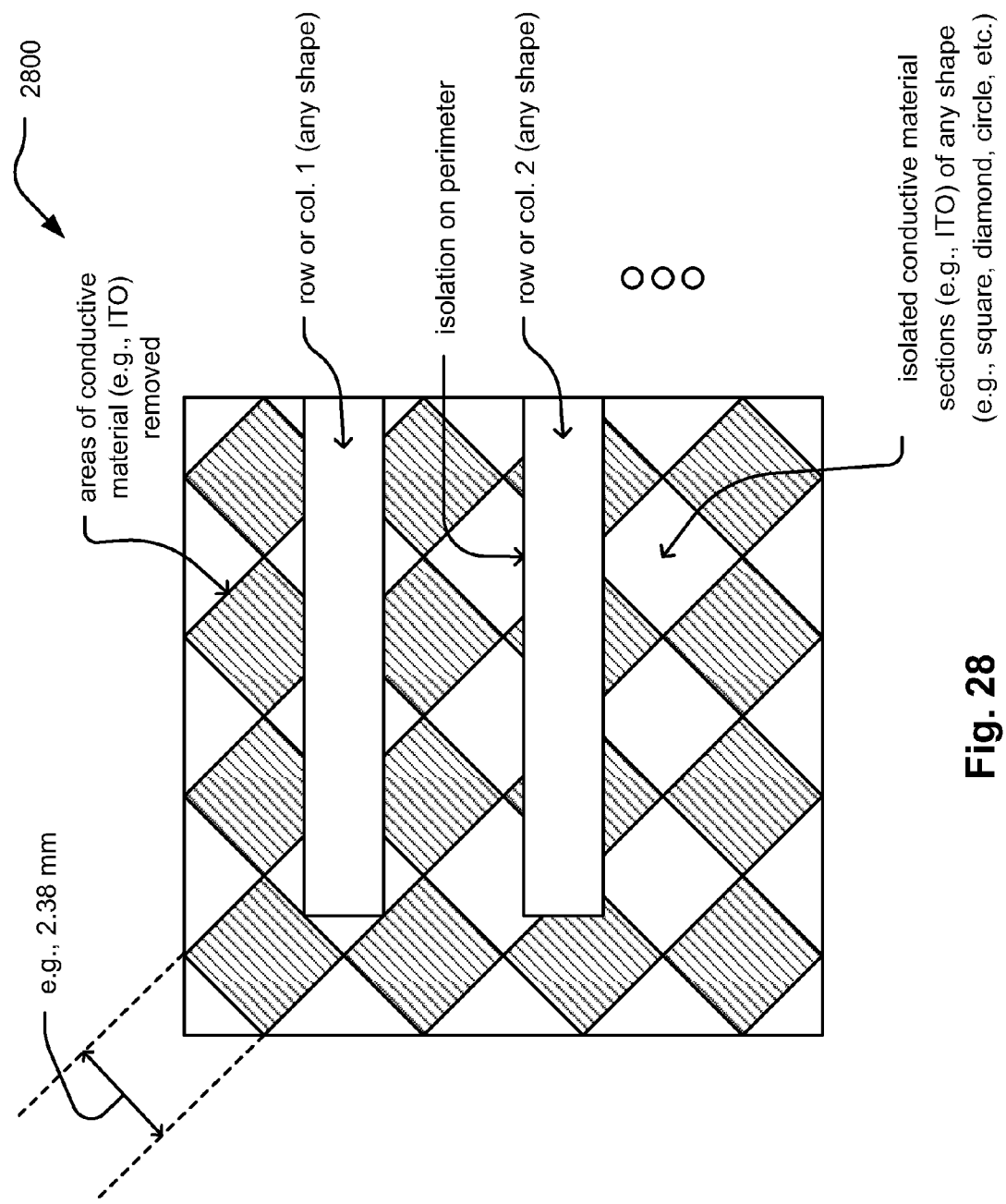
FIG. 28 illustrates an alternative embodiment of a layer of a touchscreen having some additional conductive material besides only conductors.

FIG. 28 illustrates an alternative embodiment 2800 of a layer of a touchscreen having some additional conductive material besides only conductors. This embodiment 2800 has some similarity to the previous embodiment; however, at least one difference in that instead of removing only isolating lines of conductive material, entire areas of conductive material are removed in the embodiment 2800.

This diagram shows a check-board type pattern in which areas of conductive material are removed. While the check-board type pattern showing sections of conductive material removed are illustrated in this diagram as having diamond shaped, it is noted that are desired shaped of such sections may be employed (e.g., squares, circles, etc.), and any desired combination of such shapes may alternatively be employed. In one embodiment employing diamond shaped sections having a size of 2.38 mm×2.38 mm, the conductive material of alternating diamond shaped sections may be removed in some embodiments.

One embodiment employs the embodiment 2800 as a top layer within a touchscreen, and the windows of such an embodiment 2800 are formed through the areas of which the conductive material has been removed (e.g., alternating diamonds in this diagram). In such an embodiment, the windows may be viewed as being these alternating diamonds of the missing conductive material.

There are embodiments when the implementation of conductive material across much less than a majority (e.g., only 50%, 65%, or some other value that is greater or larger as desired) of this touchscreen layer can sufficiently improve the visual effect of the touchscreen. As mentioned above, by implementing conductive material across the touchscreen, even when that conductive material is electrically isolating and not actually part of any conductors, it may improve the visually perceptible optical characteristics of the touchscreen. In some embodiments, such a large majority as 90%, 95%, etc. may not be needed to effectuate the better visual impression of the touchscreen to a user. A designer has full latitude in deciding which percentage of the touchscreen should include conductive material. However, it is noted that having some desired number of electrically isolated sections of conductive material may be employed to improve the visually perceptible optical characteristics of the touchscreen.

FIG. 29A illustrates an embodiment 2900a of placement of conductive patterns within a touchscreen. As may be seen, the top layer of first conductors (e.g., as disposed as a top layer of the touchscreen) may be directly touched by a user when interacting with the touchscreen. As may further be seen, a dielectric layer separates the first and second layers of conductors (plurality of first and second conductors, respectively). The dielectric layer may be implemented any known dielectric including but not limited to air, semiconductor materials including $SiO_2$, polymer substrate materials, bond materials, etc.

FIG. 29B illustrates an alternative embodiment 2900b of placement of conductive patterns within a touchscreen. Specifically, an additional touchscreen surface layer (e.g., a polymer layer, a protective layer, or otherwise) is disposed on top of the top layer of conductors such that a user does not directly touch the top layer of conductors. Any known material for forming a touchscreen surface that allows user interaction with the plurality of first and second conductors as described herein may be used.

Figure 30:
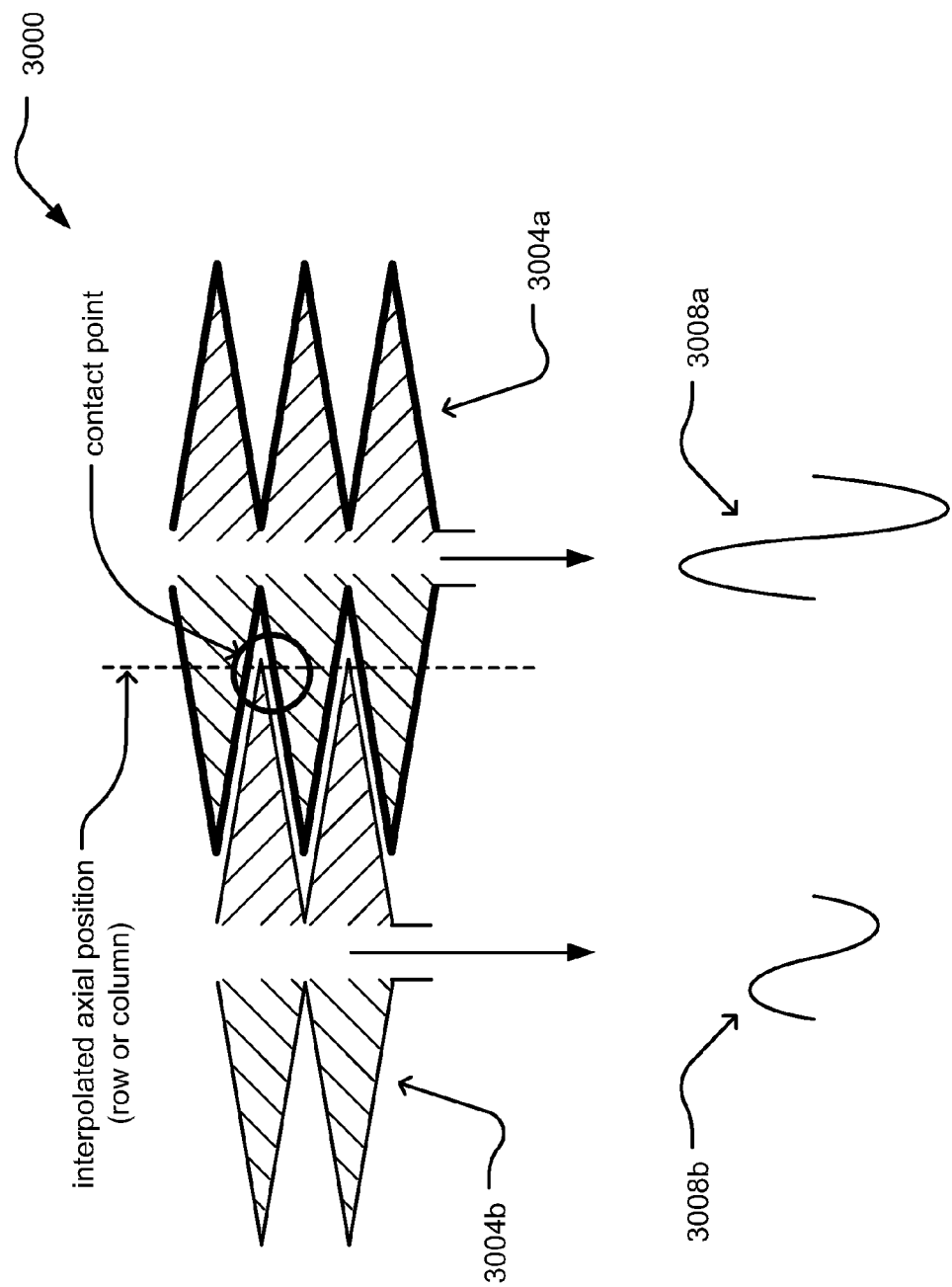
FIG. 30 illustrates an embodiment of a pair of conductors and associated signal responses from adjacent conductors of a conductive pattern.

FIG. 30 illustrates an embodiment 3000 of a pair of conductors and associated signal responses from adjacent conductors of a conductive pattern. For exemplary purposes, FIG. 30 illustrates meshed spurs of adjacent second conductors of a bottom layer though the principles discussed herein apply equally to interaction between adjacent first conductors of a top layer. Each conductor includes outwardly extending spurs that are interlaced with and mesh with spurs of the adjacent conductor. In prior art systems, an axial position corresponds to the axis of a contacted conductor. Here, however, because the outwardly extending spurs are tapered and become increasing smaller as they extend from the conductor axial center, a user's interaction with the touchscreen (e.g., contact point) can provide differing amounts of contact with the meshed spurs. As may be seen in FIG. 30, the contact point illustrates that the contacted area of the spur of conductor 3004a is substantially greater than the contacted area of the spur of conductor 3004b. Accordingly, a signal response of conductor 3004a as shown at 3008a is substantially greater than a signal response of conductor 3004b as shown at 3008b. As will be discussed below, the signal responses 3008a can be compared to 3008b to determine an interpolated axial position as shown in FIG. 30.

Figure 31:
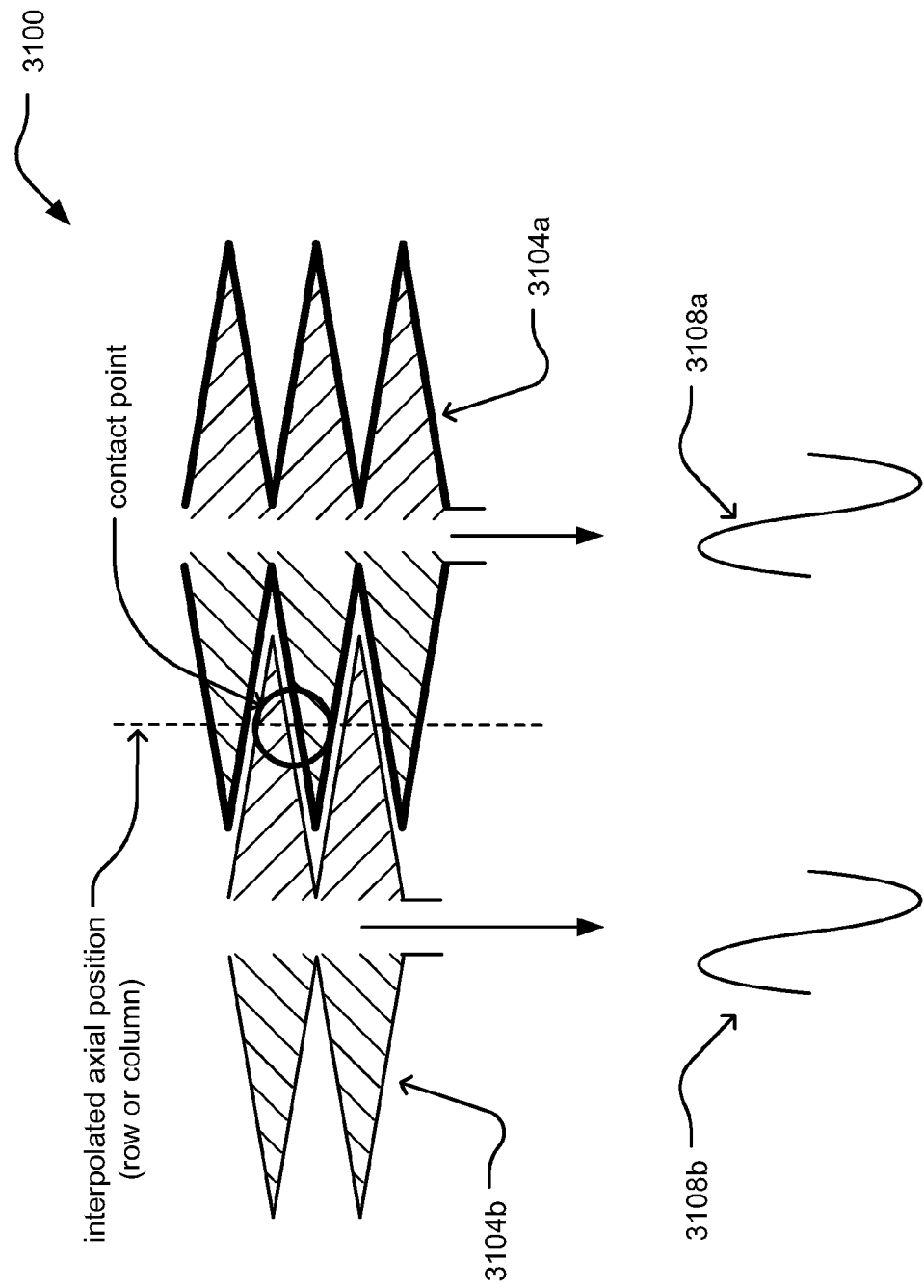
FIG. 31 illustrates an alternative embodiment of signal responses from adjacent conductors of a conductive pattern.

FIG. 31 illustrates an alternative embodiment 3100 of a pair of conductors and associated signal responses from adjacent conductors of a conductive pattern. As may be seen, the contact point illustrates that the contacted area of the spur of conductor 3104a is substantially equal to the contacted area of the spur of conductor 3104b. Accordingly, a signal response of conductor 3104a as shown at 3108a is substantially equal to a signal response of conductor 3104b as shown at 3108b. As will be discussed below, the signal responses 3108a can be compared to 3108b to determine an interpolated axial position as shown in FIG. 31. As is suggested in FIG. 31, the interpolated axial position is the middle of the separation between the axial centers of conductors 3104a and 3104b.

Figure 32:
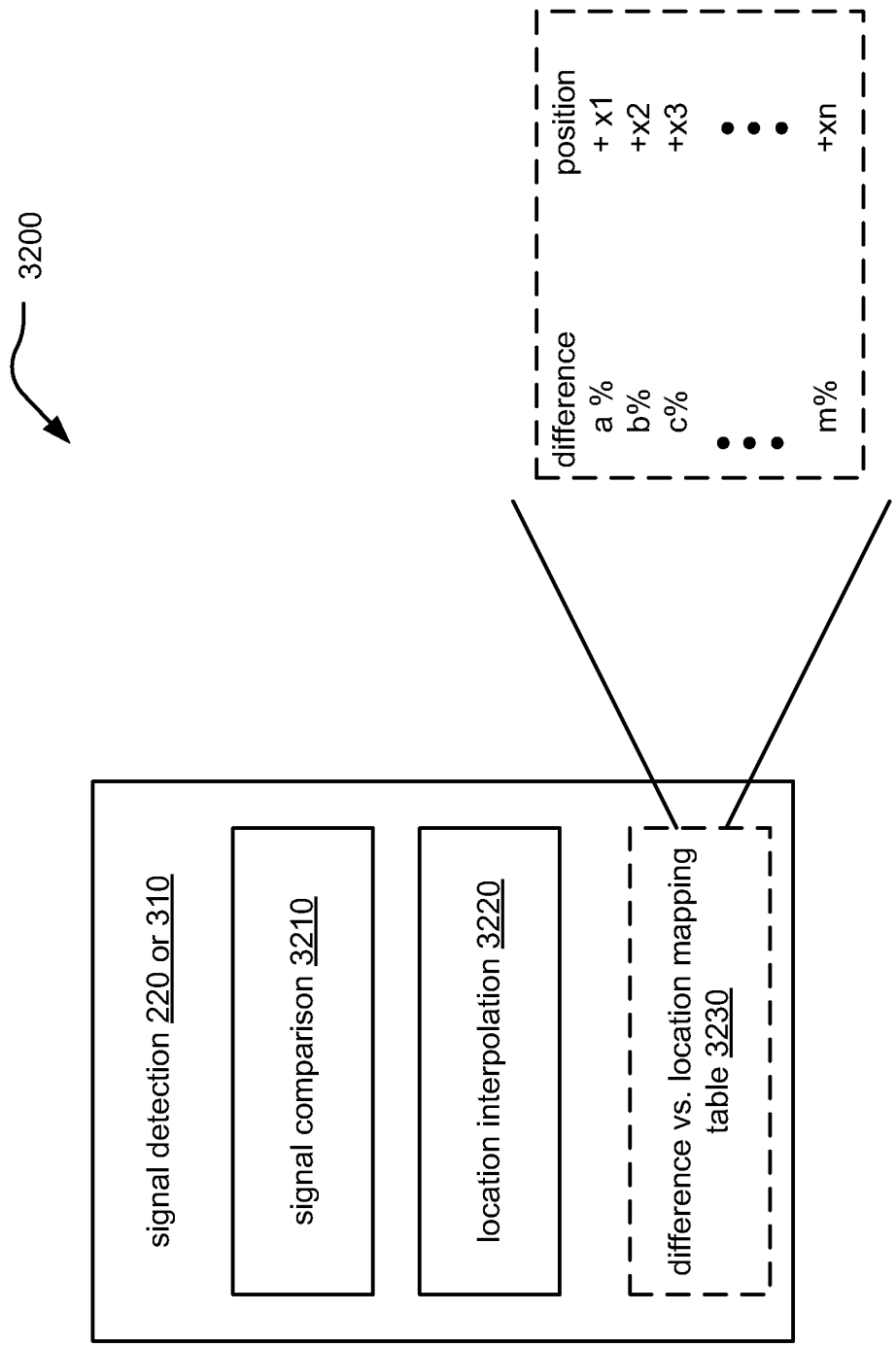
FIG. 32 illustrates an embodiment of a signal detection module.

FIG. 32 illustrates an embodiment 3200 of a signal detection module. In this embodiment 3200, the signal detection module can be implemented using any of the previous embodiments described herein (e.g., as depicted by reference numeral 220 in FIG. 2 or 310 in FIG. 3). Generally, the signal detection module of embodiment 3200 include a signal comparison module 3210, a location interpolation module 3220 and a mapping table 3230 that includes a mapping if response signal differences in relation to axial positions. The axial positions are the interpolated axial positions. Generally, signal comparison module 3210 compares the signal responses as illustrated in FIGS. 30 and 31 and determines a difference. For example, a difference may be described in terms of a percentage of the signal response of one conductor in relation to the other conductor. The differences may also be described in terms of absolute measurements (e.g., volts or amps).

Based on the determination of signal comparison module 3210, location interpolation module is operable to determine the interpolated axial position of a touch. This may be done through an algorithm that computes the position or by communicating with mapping table 3230 to obtain a mapped result for a detected difference in signal responses. In one embodiment, table 3230 specifies a range of differences for each interpolated position value. Thus, for example, if there are two hundred interpolated positions, each position may define a range of ½ of 1% of difference values. The different ranges may be specified in numerical values of a device or signal characteristic or in terms of relative differences (e.g., percentages as shown).

FIG. 33A and FIG. 33B illustrate embodiments of substantially complementary and substantially non-complementary overlap of conductors within a conductive pattern, respectively. Referring to embodiment 3300a of FIG. 33A, it may be seen that a first conductor overlaps a second conductor by an amount shown as the overlap area. The amount of area for which there is no overlap between the first and second conductors is substantially greater than the overlap area. Accordingly, it may be stated that the first and second conductors are substantially complementary. If there is no overlap area (e.g., they first and second conductors are perfectly aligned, then they are complementary). Generally, the overlap is kept to a minimal amount to minimize capacitive coupling between the first and second conductors.

Referring to embodiment 3300b of FIG. 33B, however, the amount of overlap area therein is much greater and the overlapped space of embodiment 3300a, and it may be stated that the first and second conductors are substantially non-complementary. Generally, the first and second conductors are complimentarily aligned when the overlap area is approximately 10 percent or less of an area of a first or second conductor. A non-complementary overlap or alignment is one in which the overlap is greater than the complementary overlap (e.g., greater than 10 percent overlap). Clearly, other percentages and definitions may be employed to define constraints of non-complementary overlap and complementary overlap (e.g., greater than or less than 5%, 3%, etc.).

FIG. 34A and FIG. 34B illustrate alternative embodiments of substantially complementary and substantially non-complementary overlap of conductors within a conductive pattern, respectively. Referring to embodiment 3400a of FIG. 34A, it may be seen that a first conductor is separate from a second conductor by an amount shown as the small gap area. The amount of area for which there is a small gap area between the first and second conductors may be as small as the processing means employed to place the conductors on layers of the touchscreen. Accordingly, it may be stated that the first and second conductors are substantially complementary. If there is no gap area at all (e.g., they first and second conductors are perfectly aligned, then they are complementary).

Referring to embodiment 3400b of FIG. 34B, however, the size of the gap area is relatively large than that of the previous embodiment, and it may be stated that the first and second conductors are substantially non-complementary. Again, generally, the first and second conductors are complimentarily aligned when the overlap area is approximately 10 percent or less of an area of a first or second conductor. A non-complementary overlap or alignment is one in which the overlap is greater than the complementary overlap (e.g., greater than 10 percent overlap). Clearly, other percentages and definitions may be employed to define constraints of non-complementary overlap and complementary overlap (e.g., greater than or less than 5%, 3%, etc.).

FIG. 35 illustrates an embodiment 3500 of a method for determining an interpolated axial position. The method operates by receiving a first signal or signal response from a first conductor, as depicted in block 3510 and receiving a second signal or signal response from a second conductor 3520. Thereafter, the method includes processing the first and second signal or signal responses to identify a user's relative interaction with the first and second conductors to determine an interpolated axial position in block 3530. Such processing can be as illustrated, for example, in either approach suggested in FIG. 35 such that the interpolated position is calculated or is determined by evaluating a detected difference in relation to a mapping table.

Each of the described embodiments in FIGS. 4-26A/26B illustrates either two or three aligned conductors. It should be understood that a touchscreen will have substantially greater numbers of first and second conductors aligned in first and second directions. The figures only show a few conductors in each figure to simply the explanation for the reader and to all the conductors to be drawn in a larger scale to support the associated descriptions.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, thermal noise, and/or other parameters. Moreover, references substantially covering an active surface area of a touchscreen can be as much as that which is allowed by the processing and manufacturing means employed to make the touchscreen (i.e., placing adjacent conductors as close to one another as possible using such means). In one embodiment, the closest that conductors are placed together is 40 microns using one presently available technology.

Alternatively, it is noted that a particular designer selected value (e.g., 90%, 95%, or other value) may correspond to substantially covering an active surface area of a touchscreen. Analogously, references to substantially complementary overlap and/or substantially non-complementary overlap may be likewise understood by the reader to be within such or tighter tolerances. For example, the substantially complementary overlap may be that which is limited by the processing and manufacturing means employed to make the touchscreen. Alternatively, a particular designer selected value (e.g., 1%, 5%, or other value) may correspond to substantially complementary overlap. As such, substantially non-complementary overlap may be any overlap that is different than substantially complementary overlap (e.g., greater than a value associated with substantially complementary overlap). Moreover, such references herein to approximately may also be construed in accordance with such principles.

It is noted that the various modules, blocks, elements or circuit devices described herein (e.g., signal generation module, signal detection module, signal generation/detection module, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
   a touchscreen including a plurality of first conductors aligned in a first direction and a plurality of second conductors aligned in a second direction; and wherein:
   respective spacing between the plurality of first conductors is substantially constant and greater than respective spacing between the plurality of second conductors;
   plural spurs are provided on each side of each of the plurality of first conductors such that the spurs on adjacent ones of the plurality of first conductors are interleaved.

2. The apparatus of claim 1, wherein:
   the plurality of first conductors are disposed on a top layer of the touchscreen; and
   the plurality of second conductors are disposed on a bottom layer of the touchscreen.

3. The apparatus of claim 1, wherein:
the plurality of first conductors occupy an active surface area percentage of the touchscreen having a value in a range of 25% to 75%.

4. The apparatus of claim 3, wherein:
the plurality of second conductors occupy an active surface area percentage of the touchscreen that is greater than the active surface area percentage of the touchscreen occupied by the plurality of first conductors.

5. The apparatus of claim 1, wherein:
the plurality of second conductors occupy at least 90% of an active surface area of the touchscreen.

6. The apparatus of claim 1, wherein:
the plurality of first conductors and the plurality of second conductors are non-complementary.

7. The apparatus of claim 1, wherein:
the plurality of second conductors includes a first conductor and a second conductor;
the first conductor has a first plurality of spurs; and
the second conductor has a second plurality of spurs that interlace with the first plurality of spurs.

8. The apparatus of claim 7, wherein:
a spur pitch of at least one of the first plurality of spurs and the second plurality of spurs is less than an estimated human finger width of 12 milli-meters.

9. The apparatus of claim 1, wherein:
the spurs have a spur pitch; and
the plurality of first conductors has a conductor pitch that is at least twice as large as the spur pitch.

10. The apparatus of claim 1, wherein:
a conductor of the plurality of second conductors includes a plurality of spurs that define a sawtooth pattern.

11. The apparatus of claim 10, wherein:
the plurality of spurs includes a first spur on a first side of the conductor and a second spur on a second side of the conductor; and
the first spur and the second spur are axially offset relative to one another with respect to an axis of the conductor.

12. The apparatus of claim 10, wherein:
the plural spurs includes a first spur on a first side of a select conductor of the first plurality of conductors and a second spur on a second side of the select conductor; and
the first spur and the second spur are axially aligned relative to one another with respect to an axis of the select conductor.

13. The apparatus of claim 10, wherein:
one spur of the plurality of spurs includes a first edge and a second edge that are convergent such that:
the first edge is perpendicularly aligned with an axis of the conductor and the second edge is diagonally aligned relative to the first edge; or
the first edge and second edge are diagonally aligned relative to the axis of the conductor.

14. The apparatus of claim 10, wherein:
one spur of the plurality of spurs includes a first edge and a second edge such that:
at least one of the first edge and the second edge defines a stair-step pattern; or
at least one of the first edge and the second edge has a parabolic shape.

15. The apparatus of claim 1, further comprising:
a circuitry that provides a signal to a first conductor of the plurality of first conductors; and
a detection circuitry that:
detects a signal received from a second conductor of the plurality of second conductors;
based on the received signal, identifies a location of a user's interaction with the touchscreen corresponding to an intersection of the first conductor and the second conductor.

16. The apparatus of claim 1, further comprising:
a circuitry that provides a signal to a first conductor of the plurality of first conductors and detects a change in the signal caused by a user's interaction with the touchscreen.

17. The apparatus of claim 1, further comprising:
a circuitry that provides a first signal to a first conductor of the plurality of first conductors; and
a detection circuitry that:
detects a second signal received from a second conductor of the plurality of second conductors;
detects a third signal received from a third conductor of the plurality of second conductors; and
processes the second signal and the third signal to identify a user's relative interaction with the second conductor of the plurality of second conductors and the third conductor of the plurality of second conductors to determine an interpolated axial position.

18. The apparatus of claim 1, further comprising:
a circuitry that:
provides a first signal to a first conductor of the plurality of first conductors and detects a first change in the first signal caused by a user's interaction with the touchscreen;
provides a second signal to a second conductor of the plurality of first conductors and detects a second change in the second signal caused by a user's interaction with the touchscreen; and
processing the first change and the second change to identify a user's relative interaction with the first conductor of the plurality of first conductors and the second conductor of the plurality of first conductors to determine an interpolated axial position.

19. An apparatus, comprising:
a touchscreen including a plurality of first conductors aligned in a first direction and a plurality of second conductors aligned in a second direction; and wherein:
the plurality of first conductors and the plurality of second conductors are separated by a dielectric layer;
the plurality of second conductors substantially occupies an active surface area of the touchscreen;
the plurality of second conductors are complementary with respect to each other and non-complementary with respect to the plurality of first conductors;
respective spacing between the plurality of first conductors is substantially constant and greater than respective spacing between the plurality of second conductors; and
plural spurs are provided on each side of each of the plurality of first conductors such that the spurs on adjacent ones of the plurality of first conductors are interleaved.

20. The apparatus of claim 19, wherein:
the plurality of first conductors are disposed on a top layer of the touchscreen; and
the plurality of second conductors are disposed on a bottom layer of the touchscreen.

21. The apparatus of claim 19, wherein:
the plurality of first conductors occupy an active surface area percentage of the touchscreen having a value in a range of 25% to 75%.

22. The apparatus of claim 19, further comprising:
a circuitry that provides at least one signal to the plurality of second conductors to shield interference from passing through the plurality of second conductors to the plurality of first conductors within the active surface area of the touchscreen.

23. The apparatus of claim 19, wherein:
the plurality of second conductors substantially non-complementarily overlap with the first plurality of first conductors.

24. The apparatus of claim 19, wherein:
the plurality of second conductors includes a first conductor and a second conductor;
the first conductor has a first plurality of spurs; and
the second conductor has a second plurality of spurs that interlace with the first plurality of spurs.

25. The apparatus of claim 24, wherein:
a spur pitch of at least one of the first plurality of spurs and the second plurality of spurs is less than an estimated human finger width of 12 milli-meters.

26. The apparatus of claim 19, wherein:
the spurs have a spur pitch; and
the plurality of first conductors has a conductor pitch that is at least twice as large as the spur pitch.

27. The apparatus of claim 19, wherein:
a conductor of at least one of the plurality of second conductors includes a plurality of spurs that define a saw-tooth pattern.

28. The apparatus of claim 19, further comprising:
a circuitry that provides a signal to a first conductor of the plurality of first conductors; and
a detection circuitry that:
    detects a signal received from a second conductor of the plurality of second conductors;
    based on the received signal, identifies a location of a user's interaction with the touchscreen corresponding to an intersection of the first conductor and the second conductor.

29. The apparatus of claim 19, further comprising:
a circuitry that provides a signal to a first conductor of the plurality of first conductors and detects a change in the signal caused by a user's interaction with the touchscreen.

30. The apparatus of claim 19, further comprising:
a circuitry that provides a first signal to a first conductor of the plurality of first conductors; and
a detection circuitry that:
    detects a second signal received from a second conductor of the plurality of second conductors;
    detects a third signal received from a third conductor of the plurality of second conductors; and
    processes the second signal and the third signal to identify a user's relative interaction with the second conductor of the plurality of second conductors and the third conductor of the plurality of second conductors to determine an interpolated axial position.

31. The apparatus of claim 19, further comprising:
a circuitry that:
    provides a first signal to a first conductor of the plurality of first conductors and detects a first change in the first signal caused by a user's interaction with the touchscreen;
    provides a second signal to a second conductor of the plurality of first conductors and detects a second change in the second signal caused by a user's interaction with the touchscreen; and
    processing the first change and the second change to identify a user's relative interaction with the first conductor of the plurality of first conductors and the second conductor of the plurality of first conductors to determine an interpolated axial position.

32. An apparatus, comprising:
a circuitry; and
a touchscreen including a plurality of first conductors aligned in a first direction and a plurality of second conductors aligned in a second direction; and wherein:
the plurality of first conductors and the plurality of second conductors are separated by a dielectric layer;
respective spacing between the plurality of first conductors is substantially constant and greater than respective spacing between the plurality of second conductors;
plural spurs are provided on each side of each of the plurality of first conductors such that the spurs on adjacent ones of the plurality of first conductors are interleaved;
the plurality of second conductors includes a first conductor and a second conductor;
the first conductor has a first plurality of spurs;
the second conductor has a second plurality of spurs that interlace with the first plurality of spurs;
the circuitry detects a first signal on the first conductor and a second signal on the second conductor; and
the circuitry processes the first signal and the second signal to identify a user's relative interaction with the first conductor and the second conductor to determine an interpolated axial position.

33. The apparatus of claim 32, wherein:
the circuitry determines at least one additional interpolated axial position;
the circuitry processes the interpolated axial position and the at least one additional interpolated axial position to identify a location of the user's interaction with the touchscreen.

34. The apparatus of claim 32, wherein:
the plurality of second conductors substantially occupies an active surface area of the touchscreen.

35. The apparatus of claim 32, wherein:
the plurality of first conductors are disposed on a top layer of the touchscreen; and
the plurality of second conductors are disposed on a bottom layer of the touchscreen.

36. The apparatus of claim 32, wherein:
the plurality of first conductors occupy an active surface area percentage of the touchscreen having a value in a range of 25% to 75%.

37. The apparatus of claim 32, further comprising:
at least one additional circuitry that provides at least one signal to the plurality of second conductors to shield interference from passing through the plurality of second conductors to the plurality of first conductors within the active surface area of the touchscreen.

38. The apparatus of claim 37, wherein:
the at least one additional circuitry is the circuitry.

39. The apparatus of claim 32, wherein:
the plurality of first conductors and the plurality of second conductors are non-complementary.

40. The apparatus of claim 32, wherein:
the plurality of second conductors substantially non-complementarily overlap with the plurality of first conductors.

41. The apparatus of claim 32, wherein:
a spur pitch of at least one of the first plurality of spurs and the second plurality of spurs is less than an estimated human finger width of 12 milli-meters.

42. The apparatus of claim 32, wherein:
at least one of the first plurality of spurs and the second plurality of spurs has a spur pitch; and
the plurality of first conductors has a conductor pitch that is at least twice as large as the spur pitch.

43. The apparatus of claim 32, wherein:
at least one of the first plurality of spurs and the second plurality of spurs defines a sawtooth pattern.

* * * * *